(12) United States Patent
Kozuka et al.

(10) Patent No.: US 9,178,702 B2
(45) Date of Patent: Nov. 3, 2015

(54) REVOCATION LIST GENERATION DEVICE, REVOCATION LIST GENERATION METHOD, AND CONTENT MANAGEMENT SYSTEM

(75) Inventors: Masayuki Kozuka, Osaka (JP); Takahiro Yamaguchi, Osaka (JP); Toshihisa Nakano, Osaka (JP); Kaoru Murase, Nara (JP); Motoji Ohmori, Osaka (JP); Makoto Morise, Osaka (JP); Masataka Minami, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/702,137

(22) PCT Filed: Apr. 17, 2012

(86) PCT No.: PCT/JP2012/002645
§ 371 (c)(1),
(2), (4) Date: Dec. 5, 2012

(87) PCT Pub. No.: WO2012/144193
PCT Pub. Date: Oct. 26, 2012

(65) Prior Publication Data
US 2013/0077791 A1 Mar. 28, 2013

Related U.S. Application Data

(60) Provisional application No. 61/478,221, filed on Apr. 22, 2011.

(51) Int. Cl.
*H04L 9/32* (2006.01)
*H04L 9/08* (2006.01)
*H04L 29/06* (2006.01)

(52) U.S. Cl.
CPC ............ *H04L 9/0891* (2013.01); *H04L 9/3268* (2013.01); *H04L 63/062* (2013.01); *H04L 2463/101* (2013.01)

(58) Field of Classification Search
None
See application file for complete search history.

(56) References Cited

U.S. PATENT DOCUMENTS 7,137,012 B1  11/2006  Kamibayashi et al.
7,991,832 B2   8/2011  Hatanaka et al.
(Continued)

FOREIGN PATENT DOCUMENTS

EP  1 067 447   1/2001
EP  1 605 462   12/2005
(Continued)

OTHER PUBLICATIONS

International Search Report issued May 29, 2012 in corresponding International Application No. PCT/JP2012/002645.
(Continued)

*Primary Examiner* — Harunur Rashid
*Assistant Examiner* — Andrew Steinle
(74) *Attorney, Agent, or Firm* — Wenderoth, Lind & Ponack, L.L.P.

(57) ABSTRACT

Provided is a revocation list generation device that can suppress an increase in the amount of data of a revocation list. A revocation list generation device that generates a revocation list includes an acquisition unit that acquires, for a content, a revocation identifier identifying a revoked public key certificate allocated to an apparatus related to use of the content, a revocation list generation unit that generates a revocation list including the acquired revocation identifier associated with the content, and an output unit that outputs the revocation list.

11 Claims, 37 Drawing Sheets

(56) References Cited

U.S. PATENT DOCUMENTS

| | | |
|---|---|---|
| 2002/0076204 A1 | 6/2002 | Nakano et al. |
| 2002/0169960 A1 | 11/2002 | Iguchi et al. |
| 2003/0217265 A1* | 11/2003 | Nakano et al. ............ 713/158 |
| 2004/0003239 A1 | 1/2004 | Ohmori et al. |
| 2004/0098579 A1 | 5/2004 | Nakano et al. |
| 2004/0205345 A1 | 10/2004 | Ripley et al. |
| 2004/0243814 A1 | 12/2004 | Nakano et al. |
| 2006/0155855 A1 | 7/2006 | Hamai |
| 2006/0168357 A1 | 7/2006 | Nakano et al. |
| 2007/0112685 A1 | 5/2007 | Yamamichi |
| 2008/0032668 A1 | 2/2008 | Alvarado et al. |
| 2008/0244263 A1 | 10/2008 | Lindemann |
| 2008/0250100 A1* | 10/2008 | Hatanaka et al. .......... 709/203 |
| 2008/0253567 A1 | 10/2008 | Nakano et al. |
| 2009/0172825 A1* | 7/2009 | Yi et al. .................... 726/33 |
| 2009/0228913 A1 | 9/2009 | Sato |

FOREIGN PATENT DOCUMENTS

| | | |
|---|---|---|
| JP | 2000-357126 | 12/2000 |
| JP | 2002-229861 | 8/2002 |
| JP | 2002-281013 | 9/2002 |
| JP | 2003-115838 | 4/2003 |
| JP | 2004-32706 | 1/2004 |
| JP | 2004-266652 | 9/2004 |
| JP | 2005-020703 | 1/2005 |
| JP | 2006-526934 | 11/2006 |
| JP | 2007-37197 | 2/2007 |
| JP | 2007-519994 | 7/2007 |
| JP | 2009-212893 | 9/2009 |

OTHER PUBLICATIONS

Kato, Taku et al., "Content Protection Technology Applied to HD DVD", Toshiba Review, Jul. 1, 2007, vol. 62, No. 7, pp. 11-14 (with English language Abstract).

International Search Report issued Jun. 26, 2012 in International Application No. PCT/JP2012/002656.

Office Action mailed May 14, 2014 in U.S. Appl. No. 13/817,045.

Extended European Search Report issued Mar. 25, 2015 in European Application No. 12776540.2.

Office Action issued Sep. 9, 2014 in U.S. Appl. No. 13/817,045.

* cited by examiner

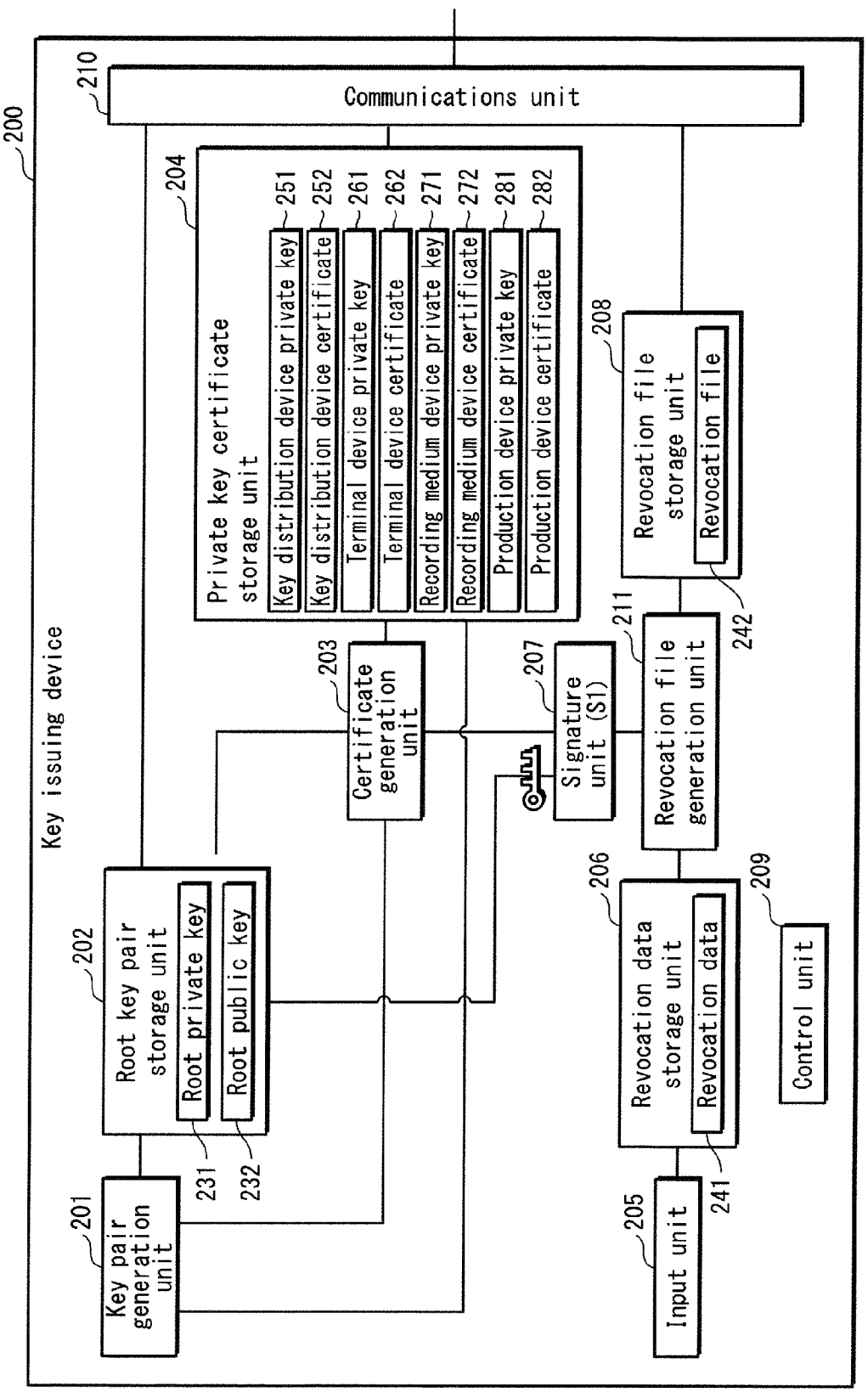

FIG. 8

541 Content information registration data

| | |
|---|---|
| 542 — Content provider ID: 01 | |
| 543 — Content ID: 0001 | |
| 544 — Genre information: action | |
| 545 — Quality level: SD | |
| 546 — Title key: XXXX | |
| 547 — Usage condition information: usable through December 2012 | |
| 548 — Authentication condition information: confirm connection once every three times | |
| 549 — Revocation information | Terminal device ID: 0005 — 550 |
| | Terminal device ID: 0006 — 551 |
| 552 — Revocation approval flag: ON | |

FIG. 9

541a Content information registration data

| |
|---|
| 542a — Content provider ID: 01 |
| 543a — Content ID: 0001 |
| 544a — Genre information: action |
| 545a — Quality level: HD |
| 546a — Title key: XXXX |
| 547a — Usage condition information: usable through December 2012 |
| 548a — Authentication condition information: confirm connection once every three times |
| 552a — Revocation approval flag: OFF |

FIG. 18

Content information list 131c

| | Content information | | | | Content related information | | |
|---|---|---|---|---|---|---|---|
| | Content provider ID 133 | Content ID 134 | Genre information 135 | Quality level 136 | Title key 137 | Revocation information 138 | Authentication condition information 139 | Usage condition information 140 |
| Line 1 | 01 | 0001 | action | SD | XXXX | — | confirm connection once every three times | playable up to 10 times |
| Line 2 | 01 | 0002 | drama | HD | XXXX | — | confirm connection once every three times | usable through December 31, 2012 |
| Line 3 | 01 | 0003 | anime | SD | XXXX | — | confirm connection once every three times | playable up to 10 times |
| Line 4 | 01 | 0004 | anime | HD | XXXX | — | confirm connection once every three times | playable up to 10 times |
| Line 5 | 02 | 0001 | drama | SD | XXXX | — | confirm connection once every three times | usable through December 31, 2012 |
| Line 6 | 02 | 0002 | action | HD | XXXX | — | confirm connection once every three times | usable through December 31, 2012 |

FIG. 19

Content information list 131a

| | Content information | | | | Content related information | | |
|---|---|---|---|---|---|---|---|
| | Content provider ID | Content ID | Genre information | Quality level | Title key | Revocation information | Authentication condition information | Usage condition information 139 |
| Line 1 | 01 | 0001 | action | SD | XXXX | Terminal device ID:0005 Terminal device ID:0006 | confirm connection once every three times | playable up to 10 times |
| Line 2 | 01 | 0002 | drama | HD | XXXX | — | confirm connection once every three times | usable through December 31, 2012 |
| Line 3 | 01 | 0003 | anime | SD | XXXX | — | confirm connection once every three times | playable up to 10 times |
| Line 4 | 01 | 0004 | anime | HD | XXXX | — | confirm connection once every three times | playable up to 10 times |
| Line 5 | 02 | 0001 | drama | SD | XXXX | — | confirm connection once every three times | usable through December 31, 2012 |
| Line 6 | 02 | 0002 | action | HD | XXXX | — | confirm connection once every three times | usable through December 31, 2012 |

FIG. 20

Content information list 131b

| | Content information | | | | Content related information | | | |
|---|---|---|---|---|---|---|---|---|
| Content provider ID | Content ID | Genre information | Quality level | Title key | Revocation information | Authentication condition information | Usage condition information | |
| Line 1 | 01 | 0001 | action | SD | XXXX | Terminal device ID:0005 Terminal device ID:0006 | confirm connection once every three times | playable up to 10 times | 132a |
| Line 2 | 01 | 0002 | drama | HD | XXXX | Terminal device ID:0003 Terminal device ID:0004 | confirm connection once every three times | usable through December 31, 2012 | 132b |
| Line 3 | 01 | 0003 | anime | SD | XXXX | — | confirm connection once every three times | playable up to 10 times | |
| Line 4 | 01 | 0004 | anime | HD | XXXX | Terminal device ID:0003 Terminal device ID:0004 | confirm connection once every three times | playable up to 10 times | 132c |
| Line 5 | 02 | 0001 | drama | SD | XXXX | — | confirm connection once every three times | usable through December 31, 2012 | |
| Line 6 | 02 | 0002 | action | HD | XXXX | — | confirm connection once every three times | usable through December 31, 2012 | |

REVOCATION LIST GENERATION DEVICE, REVOCATION LIST GENERATION METHOD, AND CONTENT MANAGEMENT SYSTEM

This application claims the benefit of U.S. Provisional Application No. 61/478,221, filed Apr. 22, 2011.

TECHNICAL FIELD

The present invention relates to technology for generating a revocation list that can identify revoked public key certificates.

BACKGROUND ART

In recent years, as digital technology rapidly spreads, systems have emerged for distributing digitalized content (hereinafter simply referred to as content) either by recording media, such as optical discs, or over a network.

One characteristic of such content is that quality does not degrade despite duplication. In order to protect the copyright of such content, it is necessary to prevent the holder of the content from making unauthorized copies. Therefore, within the system for distributing content, a transmission device that transmits the content and a playback device that plays back the received content each confirm that the other device is a legitimate device that protects copyright. Only when such confirmation is successful does the transmission device transmit the content to the playback device. In this way, the devices that use the content can be restricted, thus allowing for protection of the copyright on the content.

Confirmation that the other device is legitimate makes use of authentication technology based on a public key cryptosystem. An example of authentication technology based on the public key cryptosystem in Patent Literature 1 is as follows.

The transmission device transmits a random number to the playback device. Next, the playback device uses a private key allocated to the playback device in order to generate a signed text by applying a digital signature to the received random number. The playback device then returns the signed text to the transmission device. Finally, the transmission device verifies the received signed text using the public key of the playback device.

In such authentication technology that uses a public key cryptosystem, it is assumed that the public key itself is valid. In order to perform authentication using a public key cryptosystem, an organization referred to as a Public Key Certificate Authority issues a public key certificate indicating that the public key corresponding to a device is legitimate. The public key certificate authority also issues a revocation list (also referred to as a Certificate Revocation List (CRL) or a Public Key Revocation List) listing information identifying the revoked public key certificates, in order to notify other devices that among the issued public key certificates, public key certificates have been revoked for a reason such as the period of validity having expired, the device to which the certificate was assigned having been operated maliciously, or the private key having been divulged.

The revocation list includes a plurality of pieces of revocation information. Each piece of revocation information includes a serial number identifying the revoked public key certificate.

CITATION LIST

Patent Literature

Patent Literature 1: Japanese Patent Application Publication No. 2004-32706

Patent Literature 2: Japanese Patent Application Publication No. 2003-115838

Patent Literature 3: Japanese Patent Application Publication No. 2002-281013

Patent Literature 4: Japanese Patent Application Publication No. 2007-519994

SUMMARY OF INVENTION

Technical Problem

As the number of revoked public key certificates rises, however, the amount of data of the revocation list increases. As a result, when commercially distributing a recording medium having recorded thereon both the content and the revocation list, the amount of data of the content is constricted by the amount of data of the revocation list. It may therefore be impossible to record the necessary content on the recording medium. A problem also occurs in that when distributing the revocation list across the network along with the content, the network load increases.

In order to solve the above problems, it is an object of an aspect of the present invention to provide a revocation list generation device, a revocation list generation method, a content management system, a recording medium, a computer program, and an integrated circuit that can suppress an increase in the amount of data of the revocation list.

Solution to Problem

An aspect of the present invention is a revocation list generation device for generating a revocation list, comprising: an acquisition unit configured to acquire, for a content, a revocation identifier identifying a revoked public key certificate allocated to an apparatus related to use of the content; a revocation list generation unit configured to generate a revocation list including the acquired revocation identifier associated with the content; and an output unit configured to output the revocation list.

Advantageous Effects of Invention

With the above structure, the revocation list does not include identifiers for all revoked public key certificates, but rather is associated with a content and includes an identifier identifying a revoked public key certificate allocated to an apparatus that uses the content. This structure therefore achieves the advantageous effect of suppressing an increase in the amount of data of the revocation list.

BRIEF DESCRIPTION OF DRAWINGS

FIG. 3 is a block diagram showing the structure of a key issuing device 200.

FIG. 4A shows an example of the data structure of a key distribution device certificate 252.

FIG. 4B shows an example of the data structure of a terminal device certificate 262.

FIG. 4C shows an example of the data structure of a recording medium device certificate 272.

FIG. 4D shows an example of the data structure of a production device certificate 282.

FIG. 8 shows an example of the data structure of content information registration data 541.

FIG. 9 shows an example of the data structure of content information registration data 541*a*.

FIG. 18 shows an example of the data structure of a content information list 131*c*.

FIG. 19 shows an example of the data structure of a content information list 131*a*.

FIG. 20 shows an example of the data structure of a content information list 131*b*.

DESCRIPTION OF EMBODIMENTS

Figure 1:
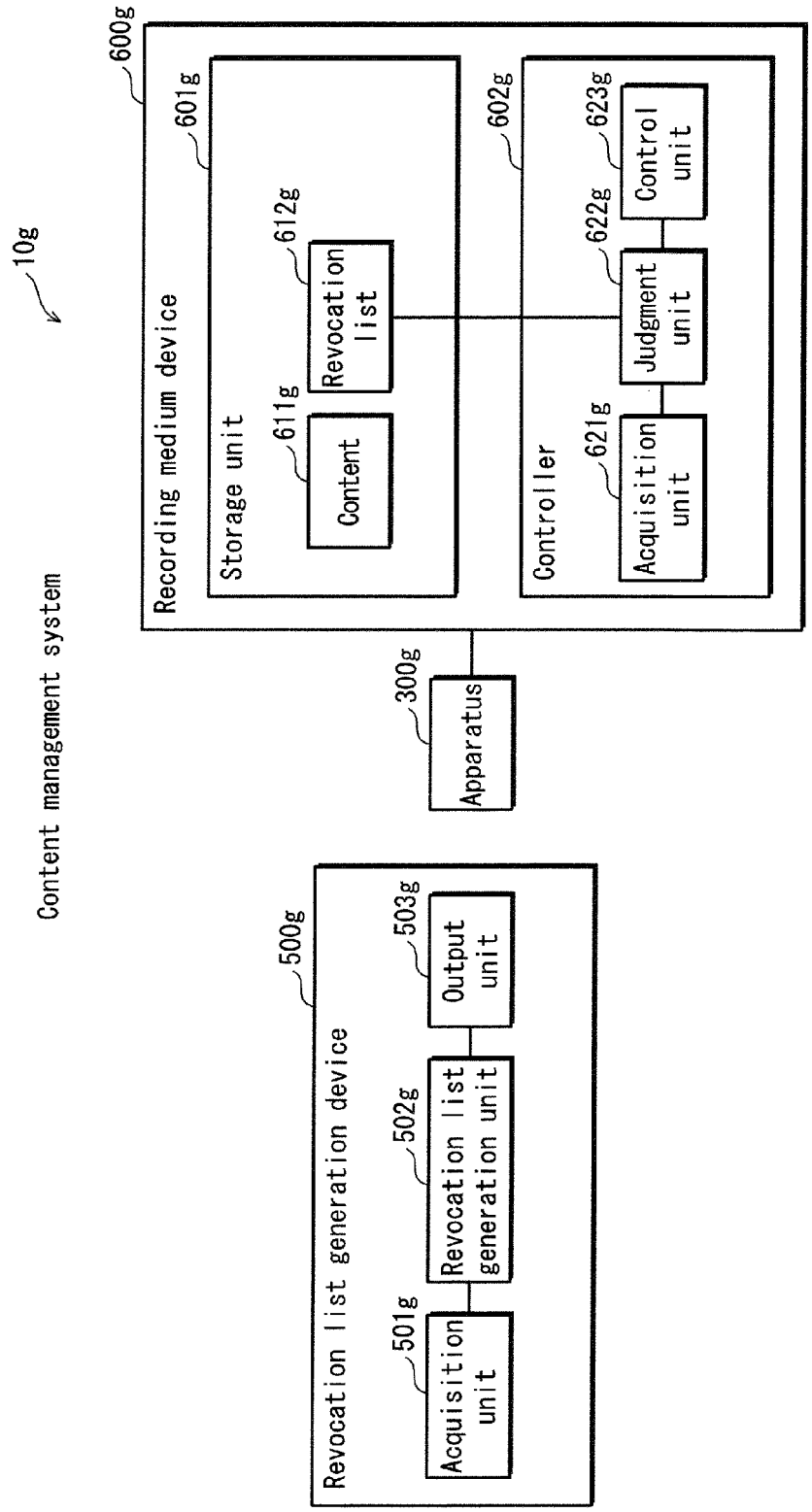
FIG. 1 is a configuration diagram showing an overall configuration of a content management system 10g according to Embodiment 1.

An aspect of the present invention is a revocation list generation device for generating a revocation list, comprising an acquisition unit configured to acquire, for a content, a revocation identifier identifying a revoked public key certificate allocated to an apparatus related to use of the content; a revocation list generation unit configured to generate a revocation list including the acquired revocation identifier associated with the content; and an output unit configured to output the revocation list.

The acquisition unit may acquire the revocation identifier identifying the revoked public key certificate allocated to a playback device as the apparatus, the playback device being capable of playing back the content.

The revocation list generation device may be a content production device for producing a content by editing material, and the output unit may output the produced content along with the revocation list.

The revocation list generation device may further comprise a content information generation unit configured to generate content information including a title key used to encrypt the content, wherein the output unit outputs the generated content information along with the content and the revocation list.

The revocation list generation device may further comprise a signature unit configured to generate signature data by applying a digital signature to the title key and the revocation list, wherein the content information generation unit generates the content information by including the generated signature data.

The content information generation unit may generate the content information by including one of a content identifier identifying the content, genre information indicating a genre into which the content is categorized, and quality information indicating quality of the content.

The revocation list generation device may further comprise a condition information generation unit configured to generate usage condition information indicating conditions for use of the content by a user and including entry information indicating a storage position of the revocation identifier in the revocation list, wherein the output unit outputs the generated usage condition information along with the content and the revocation list.

Another aspect of present invention is a content management system comprising a revocation list generation device, a recording medium device, and an apparatus into which the recording medium device is loaded. The revocation list generation device generates a revocation list and includes an acquisition unit configured to acquire, for a content, a revocation identifier identifying a revoked public key certificate allocated to an apparatus related to use of the content; a revocation list generation unit configured to generate a revocation list associated with the content and including the acquired revocation identifier; and an output unit configured to output the revocation list. The recording medium device includes a storage unit and a tamper-resistant controller. The storage unit stores a content and a revocation list including a revocation identifier associated with the content and identifying a revoked public key certificate of an apparatus related to use of the content. The controller includes an acquisition unit configured to acquire an acquisition request specifying the content from the apparatus into which the recording medium device is loaded and to acquire an apparatus identifier identifying a public key certificate allocated to the apparatus; a judgment unit configured to judge whether the acquired apparatus identifier matches the revocation identifier associated with the content specified by the acquisition request; and a control unit configured to prohibit output of the content to the apparatus when the judgment unit judges that the apparatus identifier and the revocation identifier match.

Another aspect of the present invention is a revocation list generation method used in a revocation list generation device for generating a revocation list, comprising the steps of: acquiring, for a content, a revocation identifier identifying a revoked public key certificate allocated to an apparatus related to use of the content; generating a revocation list including the acquired revocation identifier associated with the content; and outputting the revocation list.

Another aspect of the present invention is a computer-readable recording medium having recorded thereon a computer program for revocation list generation used in a revocation list generation device for generating a revocation list. The revocation list generation device is a computer, and the computer program causes the computer to perform the steps of acquiring, for a content, a revocation identifier identifying a revoked public key certificate allocated to an apparatus related to use of the content; generating a revocation list including the acquired revocation identifier associated with the content; and outputting the revocation list.

Another aspect of the present invention is a computer program for revocation list generation used in a revocation list generation device for generating a revocation list. The revocation list generation device is a computer, and the computer program causes the computer to perform the steps of acquiring, for a content, a revocation identifier identifying a revoked public key certificate allocated to an apparatus related to use of the content, generating a revocation list including the acquired revocation identifier associated with the content, and outputting the revocation list.

Another aspect of the present invention is an integrated circuit implementing a revocation list generation device for generating a revocation list, comprising an acquisition circuit configured to acquire, for a content, a revocation identifier identifying a revoked public key certificate allocated to an apparatus related to use of the content; a revocation list generation circuit configured to generate a revocation list including the acquired revocation identifier associated with the content; and an output circuit configured to output the revocation list.

Another aspect of the present invention is a recording medium device including a storage unit and a tamper-resistant controller. The storage unit stores a content and a revocation list including a revocation identifier associated with the content and identifying a revoked public key certificate of an apparatus related to use of the content. The controller includes an acquisition unit configured to acquire an acquisition request specifying the content from the apparatus into which the recording medium device is loaded and to acquire an apparatus identifier identifying a public key certificate allocated to the apparatus; a judgment unit configured to judge whether the acquired apparatus identifier matches the revocation identifier associated with the content specified by the acquisition request; and a control unit configured to prohibit output of the content to the apparatus when the judgment unit judges that the apparatus identifier and the revocation identifier match.

The storage unit may also store, in association with the content, usage condition information indicating conditions for use of the content by a user and including entry information indicating a storage position of the apparatus identifier in the revocation list. The judgment unit may read the entry information from the usage condition information stored in the storage unit, read the apparatus identifier from the storage position in the revocation list as indicated by the read entry information, and perform the judgment using the read apparatus identifier.

The acquisition unit may acquire the revocation identifier identifying the revoked public key certificate allocated to a playback device as the apparatus, the playback device being capable of playing back the content.

When the judgment unit judges that the acquired apparatus identifier does not match the revocation identifier, the control unit may permit output of the content to the apparatus.

When the control unit permits output of the content to the apparatus, the control unit may perform control so that the title key for decoding the content is output to the apparatus.

Another aspect of the present invention is a system comprising a recording medium device and an apparatus into which the recording medium device is loaded, the recording medium device including a storage unit and a tamper-resistant controller. The storage unit stores a content and a revocation list including a revocation identifier associated with the content and identifying a revoked public key certificate of an apparatus related to use of the content. The controller includes an acquisition unit configured to acquire an acquisition request specifying the content from the apparatus into which the recording medium device is loaded and to acquire an apparatus identifier identifying a public key certificate allocated to the apparatus; a judgment unit configured to judge whether the acquired apparatus identifier matches the revocation identifier associated with the content specified by the acquisition request; and a control unit configured to prohibit output of the content to the apparatus when the judgment unit judges that the apparatus identifier and the revocation identifier match.

Another aspect of the present invention is a control method used in a tamper-resistant controller that, along with a storage unit, constitutes a recording medium device. The storage unit stores a content and a revocation list. The revocation list includes a revocation identifier associated with the content and identifying a revoked public key certificate of an apparatus related to use of the content. The control method includes the steps of acquiring an acquisition request specifying the content from the apparatus into which the recording medium device is loaded and to acquire an apparatus identifier identifying a public key certificate allocated to the apparatus; judging whether the acquired apparatus identifier matches the revocation identifier associated with the content specified by the acquisition request; and prohibiting output of the content to the apparatus when the judgment unit judges that the apparatus identifier and the revocation identifier match.

Another aspect of the present invention is a computer-readable recording medium having recorded thereon a computer program for control used in a tamper-resistant controller that, along with a storage unit, constitutes a recording medium device. The storage unit stores a content and a revocation list. The revocation list includes a revocation identifier associated with the content and identifying a revoked public key certificate of an apparatus related to use of the content. The controller is a computer, and the recording medium stores a computer program for causing the computer to perform the steps of acquiring an acquisition request specifying the content from the apparatus into which the recording medium device is loaded and to acquire an apparatus identifier identifying a public key certificate allocated to the apparatus; judging whether the acquired apparatus identifier matches the revocation identifier associated with the content specified by the acquisition request; and prohibiting output of the content to the apparatus when the judgment unit judges that the apparatus identifier and the revocation identifier match.

Another aspect of the present invention is a computer program for control used in a tamper-resistant controller that, along with a storage unit, constitutes a recording medium device. The storage unit stores a content and a revocation list. The revocation list includes a revocation identifier associated with the content and identifying a revoked public key certificate of an apparatus related to use of the content. The controller is a computer, and the computer program causes the computer to perform the steps of acquiring an acquisition request specifying the content from the apparatus into which the recording medium device is loaded and to acquire an apparatus identifier identifying a public key certificate allocated to the apparatus; judging whether the acquired apparatus identifier matches the revocation identifier associated with the content specified by the acquisition request; and prohibiting output of the content to the apparatus when the judgment unit judges that the apparatus identifier and the revocation identifier match.

Another aspect of the present invention is a tamper-resistant controller that, along with a storage unit, constitutes a recording medium device. The storage unit stores a content and a revocation list. The revocation list includes a revocation identifier associated with the content and identifying a revoked public key certificate of an apparatus related to use of the content. The controller includes an acquisition unit configured to acquire an acquisition request specifying the content from the apparatus into which the recording medium device is loaded and to acquire an apparatus identifier identifying a public key certificate allocated to the apparatus; a judgment unit configured to judge whether the acquired apparatus identifier matches the revocation identifier associated with the content specified by the acquisition request; and a control unit configured to prohibit output of the content to the apparatus when the judgment unit judges that the apparatus identifier and the revocation identifier match.

1. Embodiment 1

As Embodiment 1 of the present invention, a content management system $10g$ is described with reference to the drawings.

(1) As shown in FIG. 1, the content management system $10g$ includes a revocation list generation device $500g$, an apparatus $300g$, and a recording medium device $600$.

The revocation list generation device $500g$ includes an acquisition unit $501g$, a revocation list generation unit $502g$, and an output unit $503g$.

The acquisition unit $501g$ acquires, for a content, a revocation identifier identifying a revoked public key certificate allocated to an apparatus related to use of the content.

The revocation list generation unit $502g$ generates a revocation list including the acquired revocation identifier associated with the content.

The output unit $503g$ outputs the revocation list.

The recording medium device $600$ includes a storage unit $601g$ and a tamper-resistant controller $602g$.

The storage unit $601g$ stores a content $611g$ and a revocation list $612g$. The revocation list $612g$ includes a revocation identifier, associated with the content $611g$, that identifies a revoked public key certificate and is allocated to an apparatus related to use of the content $611g$.

The controller $602g$ includes an acquisition unit $621g$, a judgment unit $622g$, and a control unit $623g$.

The acquisition unit $621g$ acquires an acquisition request specifying a content from the apparatus $300g$ into which the recording medium device $600g$ is loaded and acquires an apparatus identifier identifying a public key certificate allocated to the apparatus $300g$.

The judgment unit $622g$ judges whether the acquired apparatus identifier matches the revocation identifier associated with the content specified by the acquisition request.

The control unit $623g$ prohibits output of the content to the apparatus $300g$ when the judgment unit $622g$ judges that the apparatus identifier and the revocation identifier match.

(2) The acquisition unit $501g$ may acquire the revocation identifier identifying the revoked public key certificate allocated to a playback device as the apparatus, the playback device being capable of playing back the content.

(3) The revocation list generation device $500g$ may be a content production device for producing a content by editing material, and the output unit $503g$ may output the produced content along with the revocation list.

(4) The revocation list generation device $500g$ may further include a content information generation unit (not shown in the figures) that generates content information including a title key used to encrypt the content, and the output unit $503g$ may output the generated content information along with the content and the revocation list.

(5) The revocation list generation device $500g$ may further include a signature unit (not shown in the figures) that generates signature data by applying a digital signature to the title key and the revocation list, and the content information generation unit may generate the content information by including the generated signature data.

(6) The content information generation unit generates the content information by including one of a content identifier identifying the content, genre information indicating a genre into which the content is categorized, and quality information indicating quality of the content.

(7) The revocation list generation device $500g$ may further include a condition information generation unit (not shown in the figures) that generates usage condition information indicating conditions for use of the content by a user and including entry information indicating a storage position of the revocation identifier in the revocation list, and the output unit $503g$ may output the generated usage condition information along with the content and the revocation list.

(8) The storage unit $601g$ may also store, in association with the content $611g$, usage condition information indicating conditions for use of the content by a user and including entry information indicating a storage position of the apparatus identifier in the revocation list $612g$. The judgment unit $622g$ may read the entry information from the usage condition information stored in the storage unit $601g$, read the apparatus identifier from the storage position in the revocation list $612g$ as indicated by the read entry information, and perform the judgment using the read apparatus identifier.

(9) The acquisition unit $621g$ may acquire the revocation identifier identifying the revoked public key certificate allocated to a playback device as the apparatus, the playback device being capable of playing back the content.

(10) When the judgment unit 622g judges that the acquired apparatus identifier does not match the revocation identifier, the control unit 623g may permit output of the content to the apparatus 300g.

(11) When the control unit 623g permits output of the content to the apparatus, the control unit 623g may perform control so that the title key for decoding the content is output to the apparatus 300g.

2. Embodiment 2

As Embodiment 2 of the present invention, a content management system 10a is described with reference to the drawings.

2.1 Overall Configuration of Content Management System 10a

Figure 2:
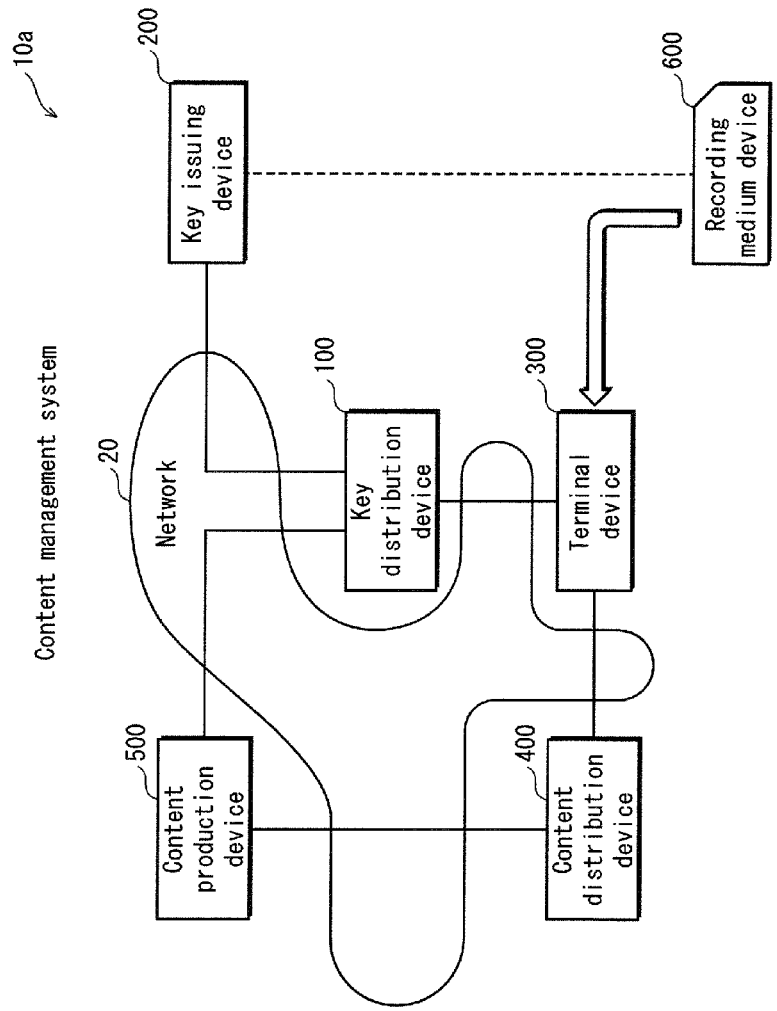
FIG. 2 is a configuration diagram showing an overall configuration of a content management system 10a according to Embodiment 2.

As illustrated in FIG. 2, the content management system 10a includes a key distribution device 100, a key issuing device 200, a terminal device 300, a content distribution device 400, a content production device 500, and a recording medium device 600.

The key distribution device 100, the key issuing device 200, the terminal device 300, the content distribution device 400, and the content production device 500 are connected to each other over a network 20.

The network 20 is, for example, the Internet. The recording medium device 600 is, for example, a memory card.

2.2 Detailed Configuration of Key Issuing Device 200

As illustrated in FIG. 3, the key issuing device 200 includes a key pair generation unit 201, a root key pair storage unit 202, a certificate generation unit 203, a private key certificate storage unit 204, an input unit 205, a revocation data storage unit 206, a signature unit 207, a revocation file storage unit 208, a control unit 209, a communications unit 210, and revocation file generation unit 211.

The key issuing device 200 is a computer system composed of a CPU, memory, a secondary storage unit, a network connection unit, a keyboard, and the like. The root key pair storage unit 202, the private key certificate storage unit 204, the revocation data storage unit 206, and the revocation file storage unit 208 are each constituted by the secondary storage unit. The key pair generation unit 201, the certificate generation unit 203, the signature unit 207, the control unit 209, and the revocation file generation unit 211 are each constituted by the CPU and computer programs running on the CPU. The communications unit 210 is constituted by the network connection unit. Finally, the input unit 205 is constituted by the keyboard.

Of course, the present invention is not limited to the above structure. For example, the key pair generation unit 201, the certificate generation unit 203, and the signature unit 207 may alternatively be constituted by dedicated hardware circuits.

(1) Root Key Pair Storage Unit 202, Private Key Certificate Storage Unit 204, Revocation Data Storage Unit 206, and Revocation File Storage Unit 208

The root key pair storage unit 202 is provided with a region for storing a root private key 231 and a root public key 232. The root private key 231 and the root public key 232 are described below.

The private key certificate storage unit 204 is provided with a region for storing a key distribution device private key 251, a key distribution device certificate 252, a terminal device private key 261, a terminal device certificate 262, a recording medium device private key 271, a recording medium device certificate 272, a production device private key 281, and a production device certificate 282. The key distribution device private key 251, the key distribution device certificate 252, the terminal device private key 261, the terminal device certificate 262, the recording medium device private key 271, the recording medium device certificate 272, the production device private key 281, and the production device certificate 282 are described below.

The revocation data storage unit 206 is provided with a region for storing revocation data 241. The revocation data 241 is described below.

The revocation file storage unit 208 is provided with a region for storing a revocation file 242. The revocation file 242 is described below.

(2) Input Unit 205

By user operation, the input unit 205 receives input of a terminal device ID that identifies a revoked terminal device and a recording medium device ID that identifies a revoked recording medium device.

Alternatively, the input unit 205 may receive input of a model ID for a revoked terminal device or recording medium device. The model ID is a number identifying the type of the terminal device or recording medium device. The input unit 205 may instead receive input of identifying information that identifies the public key certificate allocated to a revoked terminal device or recording medium device.

Next, the input unit 205 writes the received terminal device ID and recording medium device ID in a revocation file 242 stored in the revocation data storage unit 206.

Figure 5:
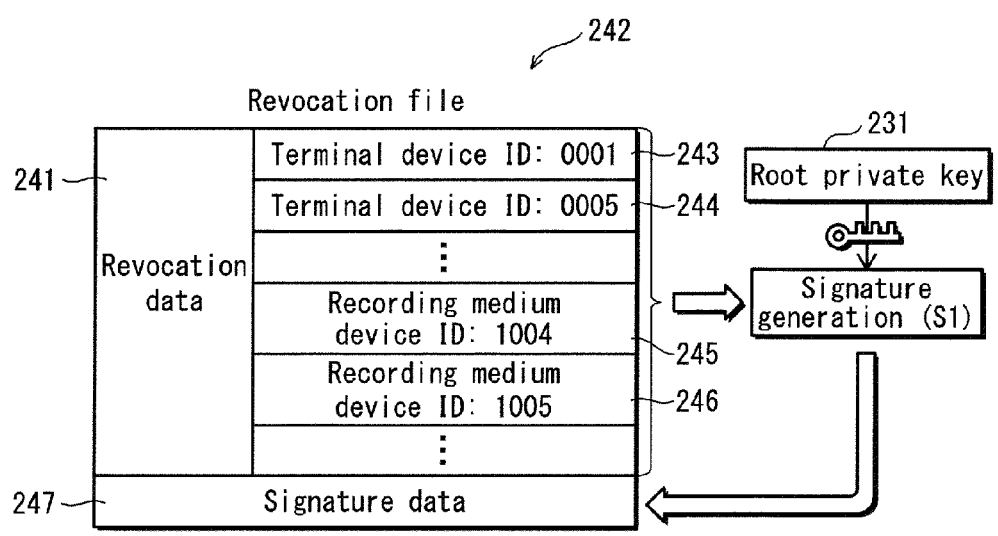
FIG. 5 shows an example of the data structure of a revocation file 242.

In the example in FIG. 5, the revocation file 242 includes a terminal device ID (243), a terminal device ID (244), . . . , a recording medium device ID (245), a recording medium device ID (246), . . .

Note that in order to distinguish between the terminal device IDs and the recording medium device IDs included in the revocation file 242, different values may be embedded at the heads of these IDs. For example, terminal device IDs may start with "00", and recording medium device IDs may start with "10".

(3) Key Pair Generation Unit 201

The key pair generation unit 201 receives a key generation instruction from the control unit 209. This key generation instruction indicates to generate the private keys and the public keys that are to be allocated respectively to the key distribution device 100, the key issuing device 200, the terminal device 300, the content production device 500, and the recording medium device 600.

Upon receiving the key generation instruction, the key pair generation unit 201 generates the private keys and the public keys to be allocated to the devices, using the key generation method described below.

The following is an example of the key generation method.

For example, when using a public key cryptosystem based on elliptic curve cryptography, the key pair generation unit 201 generates a random number x and takes the random number x to be the private key. Next, the key pair generation unit 201 calculates $Y=x*P$ and takes Y to be the public key. In this context, P is a point on an elliptic curve, and $a*B$ denotes multiplication on an elliptic curve.

Note that instead of a public key cryptosystem based on elliptic curve cryptography, the key pair generation unit 201 may generate the private key and the public key using a public key cryptosystem based on RSA encryption.

Using the above key generation method, the key pair generation unit 201 generates the root private key 231 and the root public key 232 to be allocated to the key issuing device 200. Next, the key pair generation unit 201 writes the root private key 231 and the root public key 232 in the root key pair storage unit 202.

The root private key 231 and the root public key 232 form the security core of the content management system 10a.

Using the above key generation method, the key pair generation unit 201 then generates the key distribution device private key 251 and a key distribution device public key 254 to be allocated to the key distribution device 100. Using the above key generation method, the key pair generation unit 201 then generates the terminal device private key 261 and a terminal device public key 264 to be allocated to the terminal device 300. Furthermore, using the above key generation method, the key pair generation unit 201 generates the recording medium device private key 271 and a recording medium device public key 274 to be allocated to the recording medium device 600. Finally, using the above key generation method, the key pair generation unit 201 generates the production device private key 281 and a production device public key 284 to be allocated to the content production device 500.

Next, the key pair generation unit 201 writes the key distribution device private key 251, the terminal device private key 261, the recording medium device private key 271, and the production device private key 281 in the private key certificate storage unit 204.

The key pair generation unit 201 then outputs the key distribution device public key 254, the terminal device public key 264, the recording medium device public key 274, and the production device public key 284 to the certificate generation unit 203.

(4) Certificate Generation Unit 203

The certificate generation unit 203 receives a certificate generation instruction from the control unit 209. This certificate generation instruction indicates to generate the public key certificates for the key distribution device 100, the terminal device 300, the content production device 500, and the recording medium device 600.

Upon receiving the certificate generation instruction, the certificate generation unit 203 generates the public key certificate for each of these devices as shown below.

The certificate generation unit 203 generates identifiers, described below, uniquely identifying the public key certificates.

The identifiers are generated as described below.

An identifier is a numerical value. The certificate generation unit 203 stores the identifier generated immediately before. When generating a new identifier, the certificate generation unit 203 increments the stored identifier by one to yield the new identifier.

Next, the certificate generation unit 203 receives the public key allocated to the device from the key pair generation unit 201. The certificate generation unit 203 then concatenates the generated identifier with the received public key, yielding a concatenated value.

Concatenated value=identifier∥public key

A∥B indicates a concatenated value generated by concatenating data A and data B in this order. The identifier and the public key may be further concatenated with other data to generate the concatenated value. Examples of other such data include a format version of the public key certificate, an expiration date of the certificate, and an identifier identifying the public key cryptosystem. Next, the certificate generation unit 203 outputs the generated concatenated value to the signature unit 207 and instructs the signature unit 207 to generate signature data.

Next, the certificate generation unit 203 receives the signature data from the signature unit 207.

Signature data=Sign(root private key, concatenated value)

Here, Sign(A, B) indicates signature data that is generated with a signature generation algorithm 51 by applying a digital signature to the data B using the key A. The signature generation algorithm 51 is, for example, EC-DSA (Elliptic Curve-Digital Signature Algorithm).

Upon receiving the signature data, the certificate generation unit 203 generates a public key certificate that includes the generated concatenated value and the received signature data, writing the generated public key certificate in the private key certificate storage unit 204.

Next, generation of the public key certificate for each of the key distribution device 100, the terminal device 300, the recording medium device 600, and the content production device 500 is described. Here, the public key certificate for the key distribution device 100 is the key distribution device certificate 252, and the public key certificate for the terminal device 300 is the terminal device certificate 262. The public key certificate for the recording medium device 600 is the recording medium device certificate 272, and the public key certificate for the content production device 500 is the production device certificate 282.

Generation of the Key Distribution Device Certificate 252 for the Key Distribution Device 100

The certificate generation unit 203 generates a key distribution device ID (253) that uniquely identifies the key distribution device certificate 252. Next, the certificate generation unit 203 receives the key distribution device public key 254 allocated to the key distribution device 100 from the key pair generation unit 201. The certificate generation unit 203 then concatenates the key distribution device ID (253) and the key distribution device public key 254 to generate a concatenated value. Next, the certificate generation unit 203 outputs the generated concatenated value to the signature unit 207. The certificate generation unit 203 then receives signature data 255 from the signature unit 207.

Signature data 255=Sign(root private key, key distribution device ID(253)∥key distribution device public key 254)

Figure 4A:
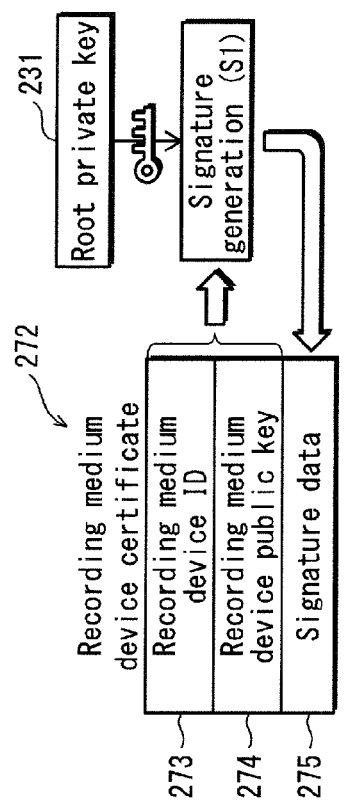
FIGS. 4A through 4D show an example of the data structure of a public key certificate.

Upon receiving the signature data 255, the certificate generation unit 203 generates the key distribution device certificate 252 to include the generated concatenated value and the received signature data 255, as illustrated in FIG. 4A. Next, the certificate generation unit 203 writes the generated key distribution device certificate 252 in the private key certificate storage unit 204.

Generation of the Terminal Device Certificate 262 for the Terminal Device 300

The certificate generation unit 203 generates a terminal device ID (263) that uniquely identifies the terminal device certificate 262. Next, the certificate generation unit 203 receives the terminal device public key 264 allocated to the terminal device 300 from the key pair generation unit 201. The certificate generation unit 203 then concatenates the terminal device ID (263) and the terminal device public key 264 to generate a concatenated value. Next, the certificate generation unit 203 outputs the generated concatenated value to the signature unit 207. The certificate generation unit 203 then receives signature data 265 from the signature unit 207.

Signature data 265=Sign(root private key, terminal device ID(263)∥terminal device public key 264)

Figure 4B:
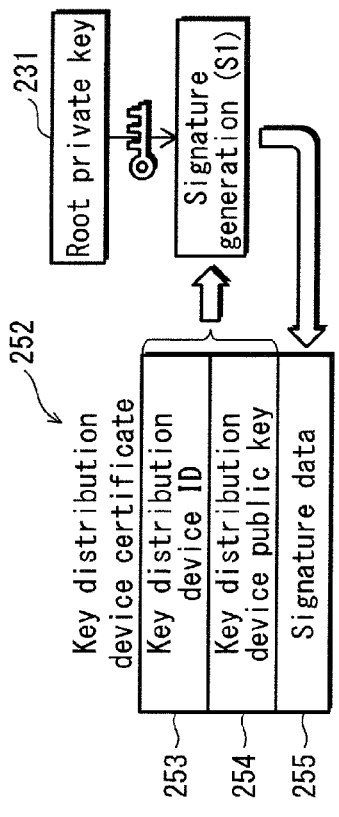

Upon receiving the signature data 265, the certificate generation unit 203 generates the terminal device certificate 262 to include the generated concatenated value and the received signature data 265, as illustrated in FIG. 4B. Next, the certificate generation unit 203 writes the generated terminal device certificate 262 in the private key certificate storage unit 204.

Generation of the Recording Medium Device Certificate 272 for the Recording Medium Device 600

The certificate generation unit 203 generates a recording medium device ID (273) that uniquely identifies the recording medium device certificate 272. Next, the certificate generation unit 203 receives the recording medium device public key 274 allocated to the recording medium device 600 from the key pair generation unit 201. The certificate generation unit 203 then concatenates the recording medium device ID (273) and the recording medium device public key 274 to generate a concatenated value. Next, the certificate generation unit 203 outputs the generated concatenated value to the signature unit 207. The certificate generation unit 203 then receives signature data 275 from the signature unit 207.

Signature data 275=Sign(root private key, recording medium device ID(273)||recording medium device public key 274)

Figure 4C:
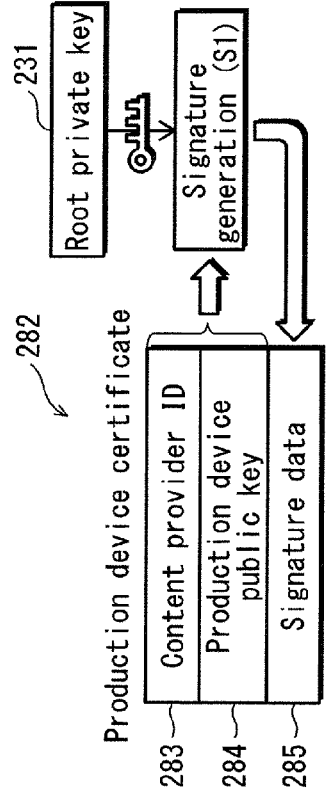

Upon receiving the signature data 275, the certificate generation unit 203 generates the recording medium device certificate 272 to include the generated concatenated value and the received signature data 275, as illustrated in FIG. 4C. Next, the certificate generation unit 203 writes the generated recording medium device certificate 272 in the private key certificate storage unit 204.

Generation of the Production Device Certificate 282 for the Content Production Device 500

The certificate generation unit 203 generates a content provider ID (283) that uniquely identifies the production device certificate 282. Next, the certificate generation unit 203 receives the production device public key 284 allocated to the content production device 500 from the key pair generation unit 201. The certificate generation unit 203 then concatenates the content provider ID (283) and the production device public key 284 to generate a concatenated value. Next, the certificate generation unit 203 outputs the generated concatenated value to the signature unit 207. The certificate generation unit 203 then receives signature data 285 from the signature unit 207.

Signature data 285=Sign(root private key, content provider ID(283)||production device public key 284)

Figure 4D:
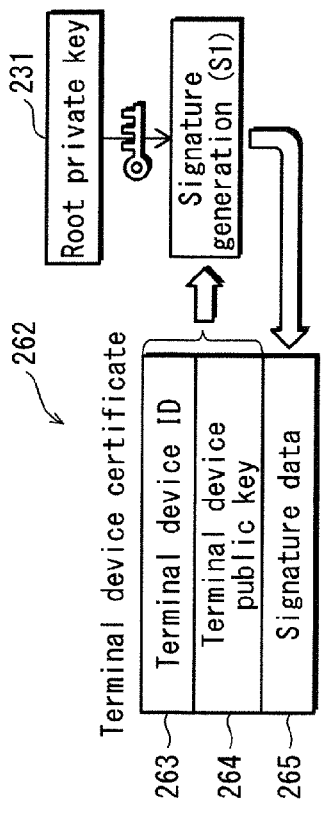

Upon receiving the signature data 285, the certificate generation unit 203 generates the production device certificate 282 to include the generated concatenated value and the received signature data 285, as illustrated in FIG. 4D. Next, the certificate generation unit 203 writes the generated production device certificate 282 in the private key certificate storage unit 204.

(5) Revocation File Generation Unit 211

The revocation file generation unit 211 is controlled by the control unit 209 to read the revocation data 241 from the revocation data storage unit 206. Next, the revocation file generation unit 211 outputs the revocation data 241 to the signature unit 207 and instructs the signature unit 207 to generate signature data 247.

The revocation file generation unit 211 then receives the signature data 247 from the signature unit 207.

Signature data 247=Sign(root private key,revocation data 241)

Next, the revocation file generation unit 211 generates the revocation file 242 to include the revocation data 241 and the signature data 247, as illustrated in FIG. 5. The revocation file generation unit 211 then writes the generated revocation file 242 in the revocation file storage unit 208.

(6) Signature Unit 207

The signature unit 207 reads the root private key 231 from the root key pair storage unit 202.

Next, the signature unit 207 receives the concatenated value from the certificate generation unit 203. The signature unit 207 also receives the revocation data 241 from the revocation file generation unit 211.

Upon receiving the concatenated value, the signature unit 207 generates signature data by applying a digital signature with the signature generation algorithm 51 to the received concatenated value using the read root private key 231.

Signature data=Sign(root private key 231,concatenated value)

Next, the signature unit 207 outputs the generated signature data to the certificate generation unit 203.

Upon receiving the revocation data 241, the signature unit 207 generates signature data by applying a digital signature with the signature generation algorithm 51 to the received revocation data 241 using the read root private key 231.

Signature data=Sign(root private key 231,revocation data 241)

Next, the signature unit 207 outputs the generated signature data to the revocation file generation unit 211.

(7) Communications Unit 210

The communications unit 210 is controlled by the control unit 209 to read the root public key 232 from the root key pair storage unit 202. Next, the communications unit 210 transmits the read root public key 232 over the network 20 to the key distribution device 100, the terminal device 300, and the recording medium device 600.

The communications unit 210 also reads the pair of the key distribution device private key 251 and the key distribution device certificate 252 from the private key certificate storage unit 204. Next, the communications unit 210 transmits the read pair of the key distribution device private key 251 and the key distribution device certificate 252 over the network 20 to the key distribution device 100.

The communications unit 210 is also controlled by the control unit 209 to read the pair of the terminal device private key 261 and the terminal device certificate 262 from the private key certificate storage unit 204. Next, the communications unit 210 transmits the read pair of the terminal device private key 261 and the terminal device certificate 262 over the network 20 to the terminal device 300.

The communications unit 210 is also controlled by the control unit 209 to read the pair of the recording medium device private key 271 and the recording medium device certificate 272 from the private key certificate storage unit 204. Next, the communications unit 210 outputs the pair of the recording medium device private key 271 and the recording medium device certificate 272 to the terminal device 300 via a manufacturer's device, not shown in the figures, possessed by the recording medium device manufacturer.

The communications unit 210 is also controlled by the control unit 209 to read the pair of the production device private key 281 and the production device certificate 282 from the private key certificate storage unit 204. Next, the communications unit 210 transmits the read pair of the production device private key 281 and the production device certificate 282 over the network 20 to the content production device 500.

The communications unit 210 is also controlled by the control unit 209 to read the revocation file 242 from the revocation file storage unit 208. Next, the communications unit 210 transmits the revocation file 242 over the network 20 to the key distribution device 100.

(8) Control Unit 209

The control unit 209 generates a key generation instruction. As described above, this key generation instruction indicates to generate the private keys and the public keys that are to be allocated respectively to the key distribution device 100, the key issuing device 200, the terminal device 300, the content production device 500, and the recording medium device 600. Next, the control unit 209 outputs the generated key generation instruction to the key pair generation unit 201.

The control unit 209 also generates a certificate generation instruction. As described above, this certificate generation instruction indicates to generate the public key certificates for the key distribution device 100, the terminal device 300, the content production device 500, and the recording medium device 600.

The control unit 209 also instructs the revocation file generation unit 211 to generate the revocation file 242.

Furthermore, the control unit 209 instructs the communications unit 210 to transmit the root public key 232. The control unit 209 also instructs the communications unit 210 to transmit the key distribution device private key 251 and the key distribution device certificate 252, the terminal device private key 261 and the terminal device certificate 262, the recording medium device private key 271 and the recording medium device certificate 272, the production device private key 281 and the production device certificate 282, and finally the revocation file 242.

2.3 Detailed Configuration of Content Production Device 500

Figure 6:
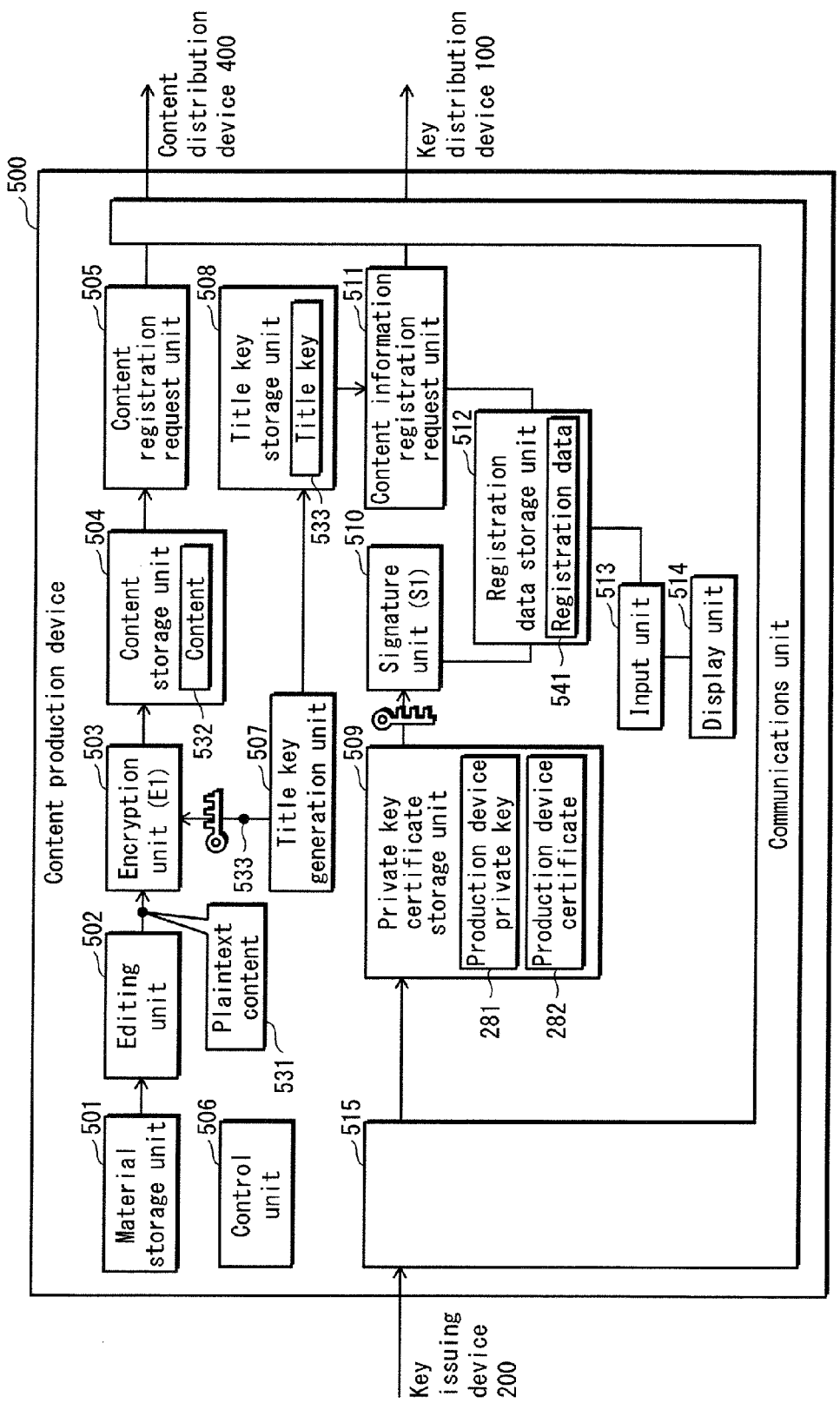
FIG. 6 is a block diagram showing the structure of a content production device 500.

As illustrated in FIG. 6, the content production device 500 includes a material storage unit 501, an editing unit 502, an encryption unit 503, a content storage unit 504, a content registration request unit 505, a control unit 506, a title key generation unit 507, a title key storage unit 508, a private key certificate storage unit 509, a signature unit 510, a content information registration request unit 511, a registration data storage unit 512, an input unit 513, a display unit 514, and a communications unit 515.

Note that the content production device 500 is a computer system constituted by a CPU, a memory, a secondary storage unit, a network connection unit, a keyboard, a liquid crystal display unit, and the like. The material storage unit 501, the content storage unit 504, the title key storage unit 508, the private key certificate storage unit 509, and the registration data storage unit 512 are each constituted by the secondary storage unit. The editing unit 502, the encryption unit 503, the content registration request unit 505, the control unit 506, the title key generation unit 507, the signature unit 510, and the content information registration request unit 511 are each constituted by the CPU and computer programs running on the CPU. The communications unit 515 is constituted by the network connection unit. The input unit 513 is constituted by the keyboard. Finally, the display unit 514 is constituted by the liquid crystal display unit.

Of course, the present invention is not limited to the above structure. For example, the encryption unit 503, the title key generation unit 507, and the signature unit 510 may alternatively be constituted by dedicated hardware circuits.

(1) Material Storage Unit 501, Content Storage Unit 504, Title Key Storage Unit 508, and Private Key Certificate Storage Unit 509

The material storage unit 501 stores one or more materials such as video and audio for a movie or the like. For each material, the video and audio are digitalized, encoded, and compressed. As production of the video and the audio is not related to the subject of the present invention, a description thereof is omitted.

The content storage unit 504 is provided with a region for storing a content 532. As described below, the content 532 is generated by encrypting a plaintext content 531.

The title key storage unit 508 is provided with a region for storing a title key 533. The title key 533 is used to encrypt the plaintext content 531.

The private key certificate storage unit 509 is provided with a region for storing the production device private key 281 and the production device certificate 282. The production device private key 281 and the production device certificate 282 are received from the key issuing device 200.

(2) Editing Unit 502

By user operation, the editing unit 502 reads the material stored in the material storage unit 501 and edits the read material to generate the plaintext content 531. The editing unit 502 outputs the generated plaintext content 531 to the encryption unit 503.

(3) Title Key Generation Unit 507

The title key generation unit 507 generates a 128-bit random number and takes the generated random number to be the title key 533. The title key generation unit 507 outputs the generated title key 533 to the encryption unit 503. The title key generation unit 507 also writes the generated title key 533 in the title key storage unit 508.

(4) Encryption Unit 503

The encryption unit 503 receives the plaintext content 531 from the editing unit 502. The encryption unit 503 also receives the title key 533 from the title key generation unit 507.

Next, the encryption unit 503 encrypts the plaintext content 531 with an encryption algorithm E1 using the title key 533, thereby generating the content 532. Unless otherwise noted, the content 532 hereinafter refers to content that has been encrypted.

The encryption algorithm E1 is an encryption algorithm that uses a private key cryptosystem. The encryption algorithm E1 is, for example, AES (Advanced Encryption Standard).

Next, the encryption unit 503 writes the content 532 in the content storage unit 504.

(5) Content Registration Request Unit 505

The content registration request unit 505 is controlled by the control unit 506 to generate a registration request that requests registration of the content 532 in the content distribution device 400. Next, the content registration request unit 505 reads the content 532 from the content storage unit 504.

The content registration request unit 505 outputs the read content 532 and the registration request generated for the content to the communications unit 515. Next, the content registration request unit 505 instructs the communications unit 515 to transmit the content 532 and the registration request for the content to the content distribution device 400.

(6) Input Unit 513 and Display Unit 514

Display Unit 514

Figure 7:
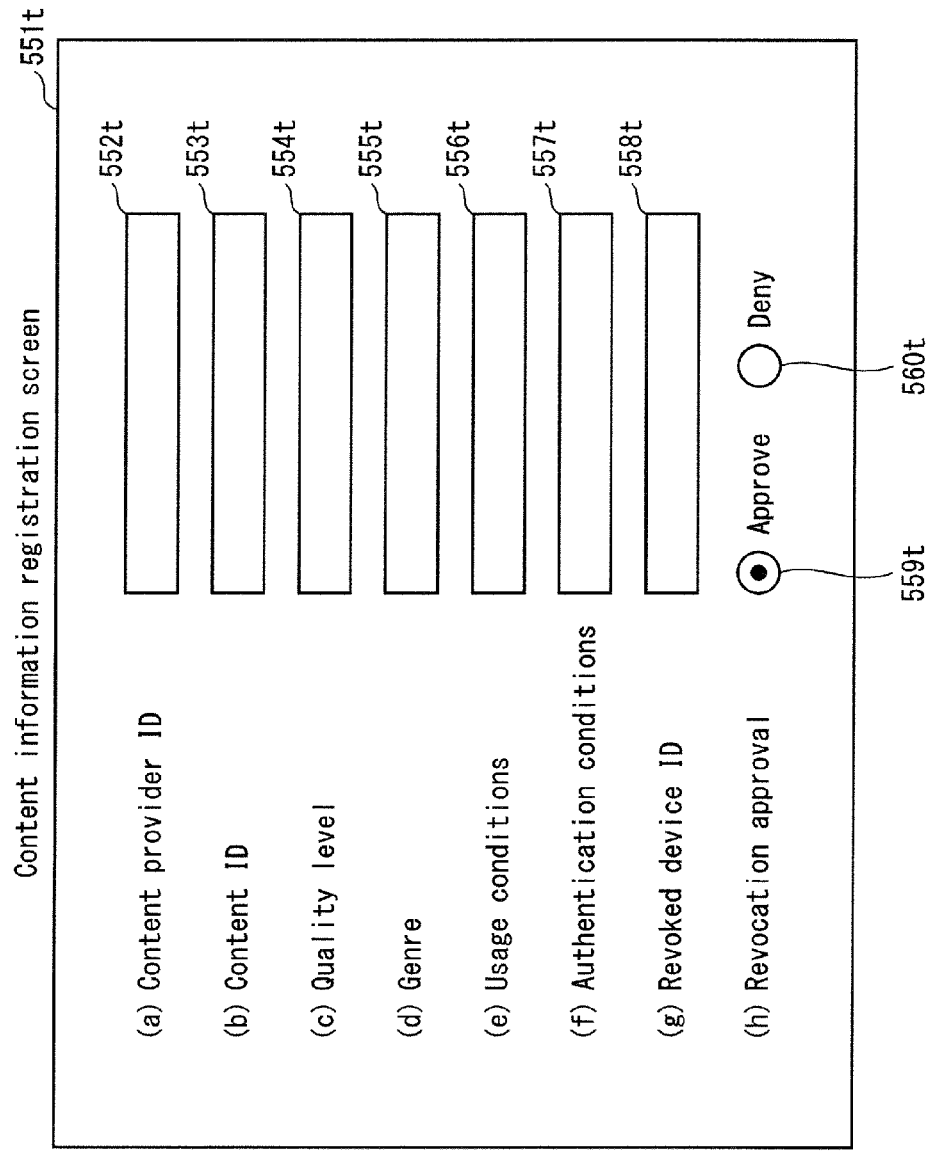
FIG. 7 shows an example of a content information registration screen 551*t*.

As illustrated in the example in FIG. 7, the display unit 514 displays a content information registration screen 551t.

The registration screen 551t includes an input field 552t, an input field 553t, an input field 554t, an input field 555t, an input field 556t, an input field 557t, an input field 558t, a button 559t, and a button 560t.

The input field 552t is a field for receiving input of the content provider ID from the producer of the content. Here, the content provider ID is identifying information that identifies the provider of the content.

The input field 553t is a field for receiving input of the content ID from the producer of the content. Here, the content ID is identifying information that identifies the content.

The input field 554t is a field for receiving input of the quality level from the producer of the content. Here, the quality level is information indicating the level of quality of the content. As an example, a quality level of "HD" indicates that the content is high quality. Specifically, "HD" indicates that the content is high resolution. A quality level of "SD" indicates that the content is standard quality. Specifically, "SD" indicates that the content is standard resolution.

The input field 555t is a field for receiving input of genre information from the producer of the content. Here, the genre information is information indicating the type or category of content and indicates the genre to which the content belongs. Examples of genre include "action", fantasy", "thriller", "comedy", and the like.

The input field 556t is a field for receiving input of usage condition information from the producer of the content. Here, the usage condition information is information indicating conditions placed on the user of the content by the producer of the content. Examples of usage condition information include limiting the period of usage of the content or the number of times the content may be used, e.g. "Usable through December 2012" or "playable up to 10 times".

The input field 557t is a field for receiving input of authentication condition information from the producer of the content. Here, the authentication condition information is information indicating conditions placed on the user of the content by the producer of the content.

An example of authentication condition information is "confirm connection once every three times". If "confirm connection once every three times" is set as the authentication condition information, authentication is performed as follows. When the content is used on the terminal device 300, the terminal device 300 requests connection to the content distribution device 400 once every three usages. After the connection is established, the content distribution device 400 confirms the authenticity of the terminal device 300, the authenticity of the content, and the authenticity of the recording medium device 600 on which the content is stored. If the authenticity of any of the above cannot be confirmed, playback of the content is not permitted. Conversely, when the authenticity of all of the above is confirmed, playback of the content is permitted.

Another example of authentication condition information is "confirm connection of the title key". If "confirm connection of the title key" is set as the authentication condition information, authentication is performed as follows. When the content is used on the terminal device 300, the terminal device 300 requests connection to the key distribution device 100. After the connection is established, the key distribution device 100 confirms the authenticity of the terminal device 300, the authenticity of the title key, and the authenticity of the recording medium device 600 on which the title key is stored. If the authenticity of any of the above cannot be confirmed, playback of the content is not permitted. Conversely, when the authenticity of all of the above is confirmed, use of the title key and playback of the content is permitted.

The input field 558t is a field for receiving input of a revoked device ID from the producer of the content. Here, the revoked device ID is identifying information that identifies a revoked device.

An example of input of a revoked device ID is "0005, 0006". The numbers "0005, 0006" indicate that the devices identified by identifying information "0005" and "0006" have been revoked.

Another example of input of a revoked device ID is "0101-0106". The range "0101-0106" indicates that the devices identified by identifying information "0101", "0102", "0103", "0104", "0105", and "0106" have been revoked.

Another example of input of a revoked device ID is "0101-0106, 0110-0120". The ranges "0101-0106, 0110-0120" indicate that the devices identified by identifying information "0101", "0102", . . . , and "0106", as well as by identifying information "0110", "0111", . . . , and "0120" have been revoked.

The buttons 559t and 560t are for receiving input of whether the producer of the content approves of revocation or not. The producer of the content selects one of the buttons 559t and 560t.

Approval of revocation indicates that the producer of the content approves of confirmation, when the terminal device 300 uses the content, of whether the terminal device 300 has been revoked based on an individual revocation list attached to the content.

In order to approve of revocation, the producer of the content selects the button 559t. In order not to approve of revocation, the producer of the content selects the button 560t.

As described above, one of the buttons 559t and 560t must be selected. When the button 559t is selected, the producer of the content must fill in the input field 558t.

Note that the registration screen is not limited to the registration screen 551t illustrated in FIG. 7.

The registration screen 551t need not include the input fields 554t, 555t, 556t, and 557t. Alternatively, the registration screen 551t need not include the input fields 553t, 554t, 556t, and 557t. Finally, the registration screen 551t need not include the input fields 553t, 555t, 556t, and 557t.

Input Unit 513

The input unit 513 receives the results of input from the producer of the content for the input fields 552t, 553t, . . . , 558t, and the buttons 559t and 560t. In other words, the input unit 513 receives, from the producer of the content, input of the content provider ID, the content ID, the quality level, the genre information, the usage condition information, the authentication condition information, the revoked device ID, and the revocation approval. Upon receiving input of the above, the input unit 513 generates content information registration data 541 that includes the content provider ID, the content ID, the quality level, the genre information, the usage condition information, the authentication condition information, the revoked device ID, and a revocation approval flag. Next, the input unit 513 writes the generated registration data 541 in the registration data storage unit 512.

Here, the revocation approval flag is set to "ON" when the button 559t is selected. Conversely, when the button 560t is selected, the revocation approval flag is set to "OFF".

Items that were not input on the registration screen 551t are not included in the registration data 541. For example, as described above, data might not be input for the input fields 554t, 555t, 556t, 557t, and 558t. Accordingly, the quality level, the genre information, the usage condition information, the authentication condition information, and the revoked device ID might not be included in the registration data 541.

(7) Signature Unit 510

The signature unit 510 receives an instruction to generate a signature from the control unit 506. Upon receipt of the instruction to generate a signature, the signature unit 510 reads the registration data 541 from the registration data storage unit 512. The signature unit 510 then determines whether the revocation approval flag included in the read registration data 541 is "ON" or "OFF".

If the revocation approval flag is "OFF", the signature unit 510 does nothing.

If the revocation approval flag is "ON", the signature unit 510 reads the production device private key 281 from the private key certificate storage unit 509. Next, the signature unit 510 generates signature data by applying a digital signature with the signature generation algorithm S1 to the read registration data 541 using the production device private key 281.

Here, the signature generation algorithm S1 is a signature generation algorithm based on a public key cryptosystem. An example of encryption technology used in a public key cryptosystem is elliptic curve cryptography. In this case, the signature generation algorithm S1 is, for example, EC-DSA (Elliptic Curve-Digital Signature Algorithm).

Next, the signature unit 510 adds the generated signature data to the registration data 541 and overwrites the registration data 541 stored in the registration data storage unit 512 with the registration data 541 to which the signature data has been added.

(8) Content Information Registration Request Unit 511

The content information registration request unit 511 is controlled by the control unit 506 to read the title key 533 from the title key storage unit 508. Next, the content information registration request unit 511 appends the read title key 533 to the registration data 541 stored in the registration data storage unit 512.

The content information registration request unit 511 is controlled by the control unit 506 to generate a registration request indicating a request to register content information registration data in the key distribution device 100. Next, the content information registration request unit 511 reads the registration data 541 from the registration data storage unit 512, outputs the registration request and the registration data 541 to the communications unit 515, and instructs the communications unit 515 to transmit these items to the key distribution device 100.

(9) Communications Unit 515

The communications unit 515 receives the production device private key 281 and the production device certificate 282 from the key issuing device 200 over the network 20. Next, the communications unit 515 writes the production device private key 281 and the production device certificate 282 in the private key certificate storage unit 509.

The communications unit 515 receives the production device private key 281 and the production device certificate 282 from the key issuing device 200 over the network 20. Next, the communications unit 515 writes the production device private key 281 and the production device certificate 282 in the private key certificate storage unit 509.

The communications unit 515 receives the content registration request and the content 532 from the content registration request unit 505. Next, the communications unit 515 transmits the received registration request and content 532 to the content distribution device 400 over the network 20.

The communications unit 515 receives the content information registration request and the registration data 541 from the content information registration request unit 511. Next, the communications unit 515 transmits the received registration request and registration data 541 to the key distribution device 100 over the network 20.

(10) Registration Data Storage Unit 512

The registration data storage unit 512 stores the content information registration data 541.

FIGS. 8 through 14 show examples of registration data. Note that in the examples of registration data shown in FIGS. 8 through 14, a title key and signature data has been added.

Registration Data 541

The registration data 541 shown in FIG. 8 includes a content provider ID (542), a content ID (543), genre information 544, a quality level (545), a title key 546, usage condition information 547, connection condition information 548, revocation information 549, and a revocation approval flag 552. The revocation information 549 includes a terminal device ID (550) and a terminal device ID (551).

Here, the revocation approval flag 552 is "ON", and therefore the registration data 541 includes the revocation information 549.

The registration data 541 thus indicates that the producer of the content approves of confirmation, when the terminal device 300 uses the content, of whether the terminal device 300 has been revoked based on an individual revocation list attached to the content.

Registration Data 541a

The registration data 541a shown in FIG. 9 includes a content provider ID (542a), a content ID (543a), genre information 544a, a quality level (545a), a title key 546a, usage condition information 547a, connection condition information 548a, and a revocation approval flag 552a.

Here, the revocation approval flag 552a is "OFF", and therefore the registration data 541a does not include revocation information.

The registration data 541a thus indicates that the producer of the content does not approve of confirmation, when the terminal device 300 uses the content, of whether the terminal device 300 has been revoked based on an individual revocation list attached to the content.

Registration Data 541b

Figure 10:
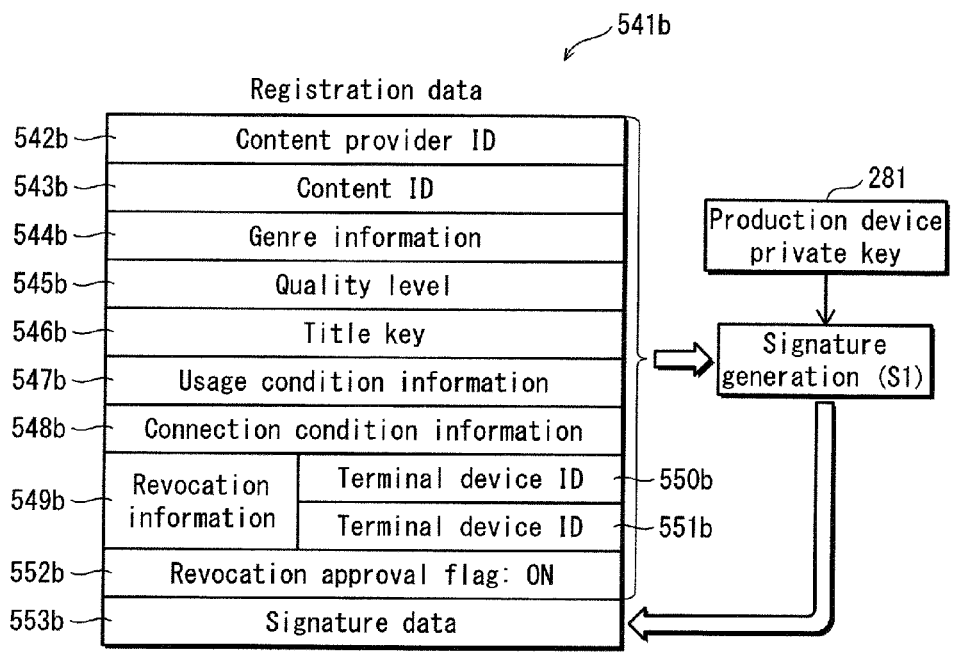
FIG. 10 shows an example of the data structure of content information registration data 541*b*.

The registration data 541b shown in FIG. 10 includes a content provider ID (542b), a content ID (543b), genre information 544b, a quality level (545b), a title key 546b, usage condition information 547b, connection condition information 548b, revocation information 549b, a revocation approval flag 552b, and signature data 553b. The revocation information 549b includes a terminal device ID (550b) and a terminal device ID (551b).

Here, the revocation approval flag 552b is "ON", and therefore the registration data 541b includes the revocation information 549b.

The signature data 553b is data generated by applying a digital signature with the signature generation algorithm S1 to a concatenated value using the production device private key 281. In this case, the concatenated value is a concatenation, in the following order, of the content provider ID (542b), the content ID (543b), the genre information 544b, the quality level (545b), the title key 546b, the usage condition information 547b, the connection condition information 548b, the revocation information 549b, and the revocation approval flag 552b.

The registration data 541b thus indicates that the producer of the content approves of confirmation, when the terminal device 300 uses the content, of whether the terminal device 300 has been revoked based on an individual revocation list attached to the content.

Registration Data 541c

Figure 11:
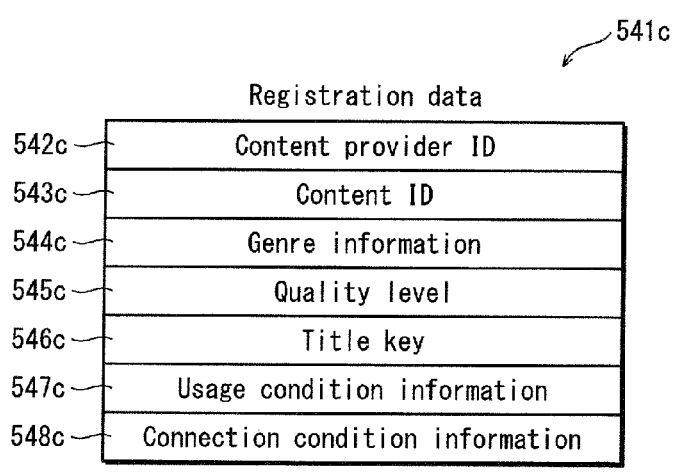
FIG. 11 shows an example of the data structure of content information registration data 541*c*.

The registration data 541c shown in FIG. 11 includes a content provider ID (542c), a content ID (543c), genre information 544c, a quality level (545c), a title key 546c, usage condition information 547c, and connection condition information 548c.

The registration data 541c includes neither a revocation approval flag nor revocation information.

The registration data 541c thus indicates that the producer of the content does not approve of confirmation, when the terminal device 300 uses the content, of whether the terminal device 300 has been revoked based on an individual revocation list attached to the content.

Registration Data 541d

Figure 12:
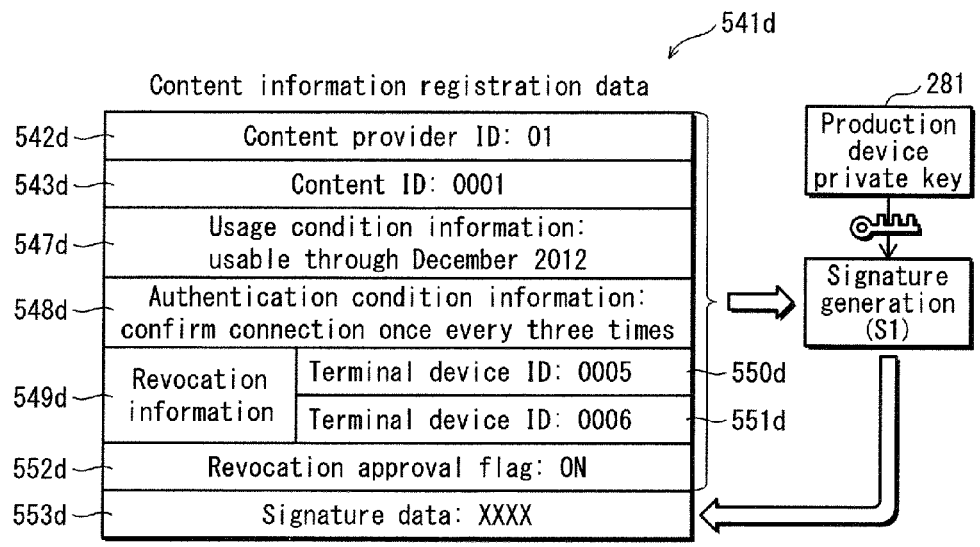
FIG. 12 shows an example of the data structure of content information registration data 541*d*.

The registration data 541d shown in FIG. 12 includes a content provider ID (542d), a content ID (543d), genre information 544d, a quality level (545d), a title key 546d, usage condition information 547d, connection condition information 548d, revocation information 549d, a revocation approval flag 552d, and signature data 553d. The revocation information 549d includes a terminal device ID (550d) and a terminal device ID (551d).

Here, the revocation approval flag 552d is "ON", and therefore the registration data 541d includes the revocation information 549d.

The signature data 553d is data generated by applying a digital signature with the signature generation algorithm S1 to a concatenated value using the production device private key 281. In this case, the concatenated value is a concatenation, in the following order, of the content provider ID (542d), the content ID (543d), the genre information 544d, the quality level (545d), the title key 546d, the usage condition information 547d, the connection condition information 548d, the revocation information 549d, and the revocation approval flag 552d.

Registration Data 541e

Figure 13:
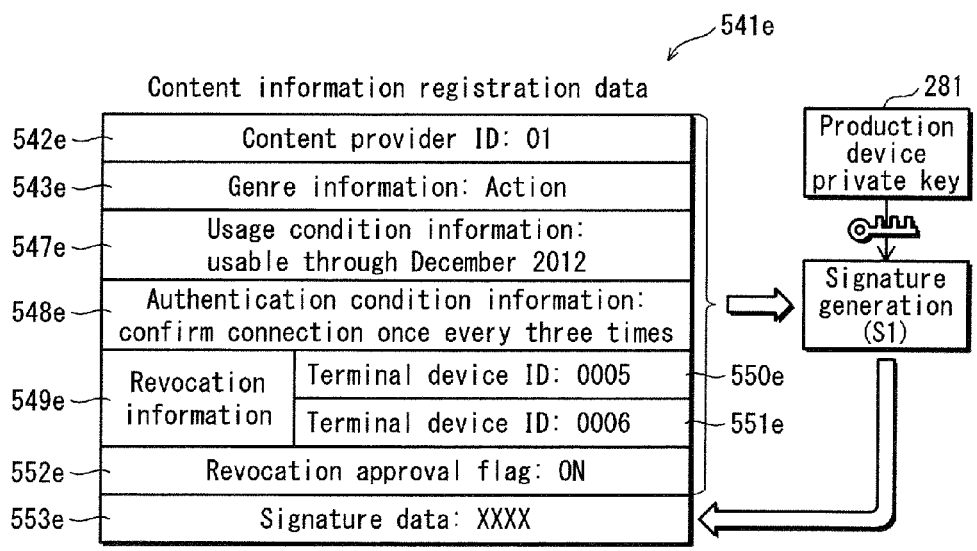
FIG. 13 shows an example of the data structure of content information registration data 541*e*.

The registration data 541e shown in FIG. 13 includes a content provider ID (542e), a content ID (543e), genre information 544e, usage condition information 547e, connection condition information 548e, revocation information 549e, a revocation approval flag 552e, and signature data 553e. The revocation information 549e includes a terminal device ID (550e) and a terminal device ID (551e).

Here, the revocation approval flag 552e is "ON", and therefore the registration data 541e includes the revocation information 549e.

The signature data 553e is data generated by applying a digital signature with the signature generation algorithm S1 to a concatenated value using the production device private key 281. In this case, the concatenated value is a concatenation, in the following order, of the content provider ID (542e), the content ID (543e), the genre information 544e, the usage condition information 547e, the connection condition information 548e, the revocation information 549e, and the revocation approval flag 552e.

Registration Data 541f

Figure 14:
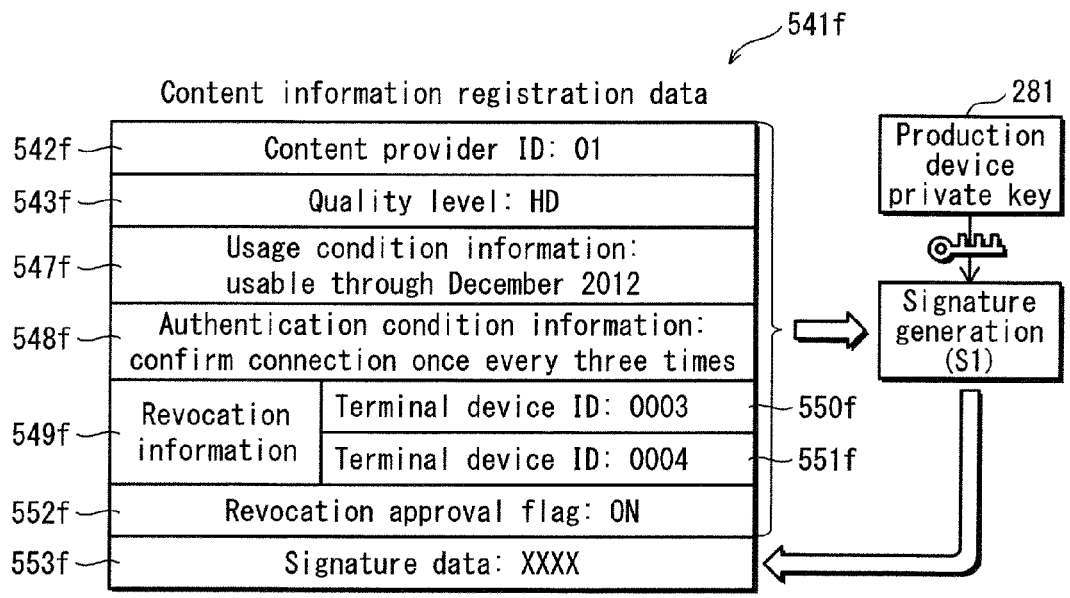
FIG. 14 shows an example of the data structure of content information registration data 541*f*.

The registration data 541f shown in FIG. 14 includes a content provider ID (542f), a quality level (545f), usage condition information 547f, connection condition information 548f, revocation information 549f, a revocation approval flag 552f, and signature data 553f. The revocation information 549f includes a terminal device ID (550f) and a terminal device ID (551f).

Here, the revocation approval flag 552f is "ON", and therefore the registration data 541f includes the revocation information 549f.

The signature data 553f is data generated by applying a digital signature with the signature generation algorithm S1 to a concatenated value using the production device private key 281. In this case, the concatenated value is a concatenation, in the following order, of the content provider ID (542f), the quality level (545f), the usage condition information 547f, the connection condition information 548f, the revocation information 549f, and the revocation approval flag 552f.

(11) Control Unit 506

The control unit 506 outputs an instruction to generate a signature to the signature unit 510.

The control unit 506 causes the content registration request unit 505 to output a content registration request.

The control unit 506 also causes the content information registration request unit 511 to output a content information registration request.

2.4 Detailed Configuration of Content Distribution Device 400

Figure 15:
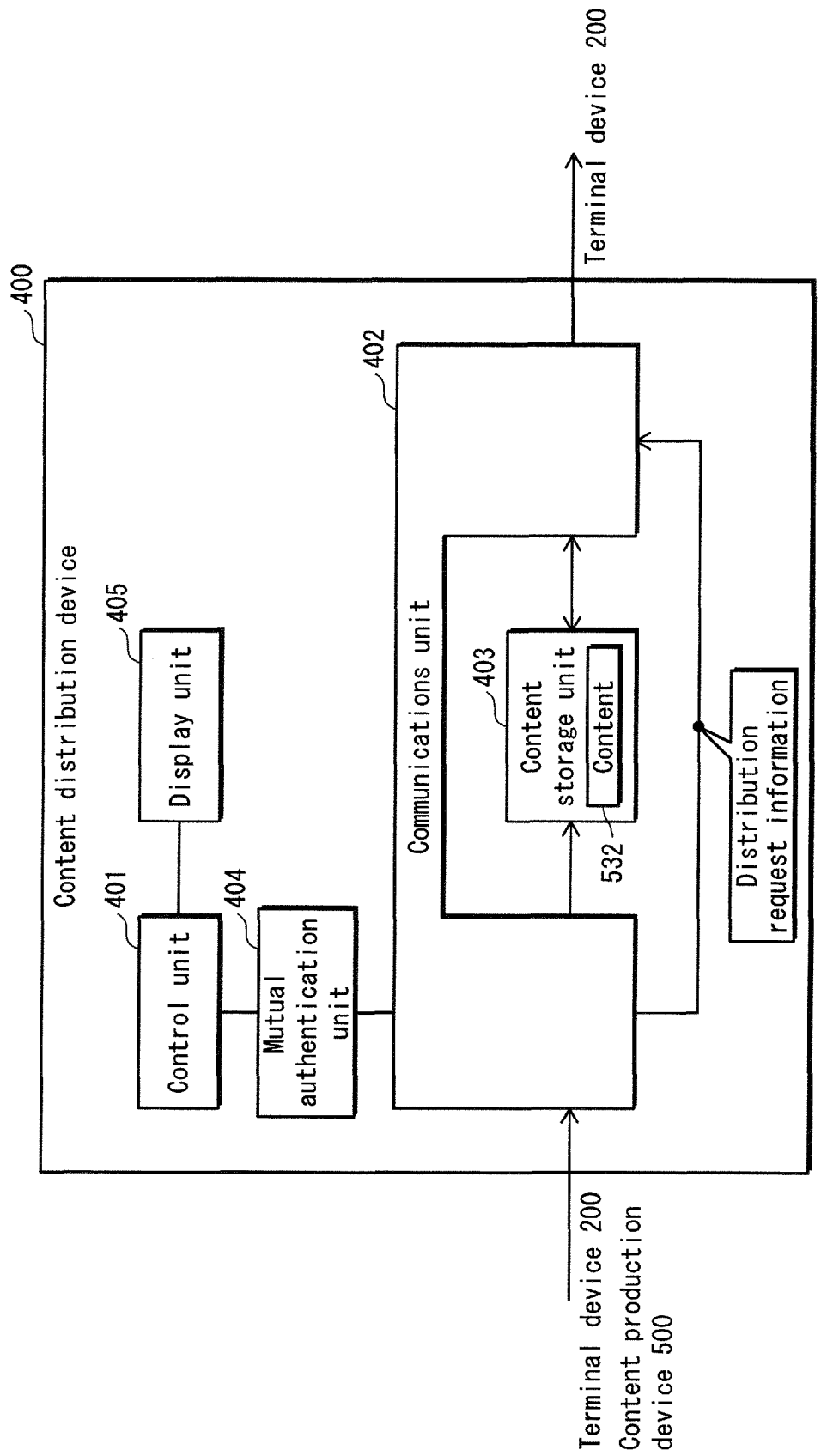
FIG. 15 is a block diagram showing the structure of a content distribution device 400.

As shown in FIG. 15, the content distribution device 400 includes a control unit 401, a communications unit 402, a content storage unit 403, a mutual authentication unit 404, and a display unit 405.

The content distribution device 400 is a computer system composed of a CPU, memory, a secondary storage unit, a network connection unit, and the like. The content storage unit 403 is constituted by the secondary storage unit. The control unit 401 is constituted by the CPU and computer programs running on the CPU. The communications unit 402 is constituted by the network connection unit.

(1) Content Storage Unit 403

The content storage unit 403 is provided with a region for storing the content 532.

(2) Communications Unit 402

The communications unit 402 receives a content registration request and the content 532 from the content production device 500 over the network 20. Next, the communications unit 402 writes the received content 532 in the content storage unit 403.

Figure 16:
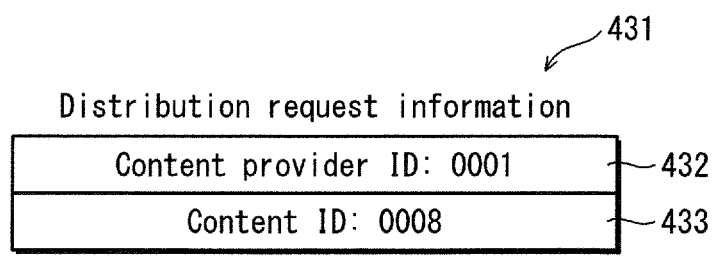
FIG. 16 shows an example of the data structure of distribution request information 431.

The communications unit 402 receives distribution request information 431, which indicates a content distribution request, from the terminal device 300 over the network 20. The distribution request information 431 includes, for example, a content provider ID (432) and a content ID (433), as shown in the example in FIG. 16. The communications unit 402 outputs the distribution request information 431 to the control unit 401.

The communications unit 402 receives a content from the control unit 401 and, based on an instruction from the control unit 401, transmits the received content to the terminal device 300 over the network 20.

(3) Control Unit 401

The control unit 401 receives the distribution request information 431 from a distribution request reception unit 430. Upon receiving the distribution request information 431, the control unit 401 searches within the content storage unit 403 for the content identified by the content ID (433) included in the distribution request information 431. Upon finding the content identified by the content ID (433), the control unit 401 reads the content from the content storage unit 403, outputs the read content to the communications unit 402, and instructs the communications unit 402 to transmit the content to the terminal device 300.

(4) Mutual Authentication Unit 404

The mutual authentication unit 404 performs mutual authentication and key sharing with a connected device. Details are omitted here, as this processing is the same as processing by a mutual authentication unit 105, described below, in the key distribution device 100.

(5) Display Unit 405

The display unit 405 is controlled by the control unit 401 to display information.

2.5 Detailed Configuration of Key Distribution Device 100

Figure 17:
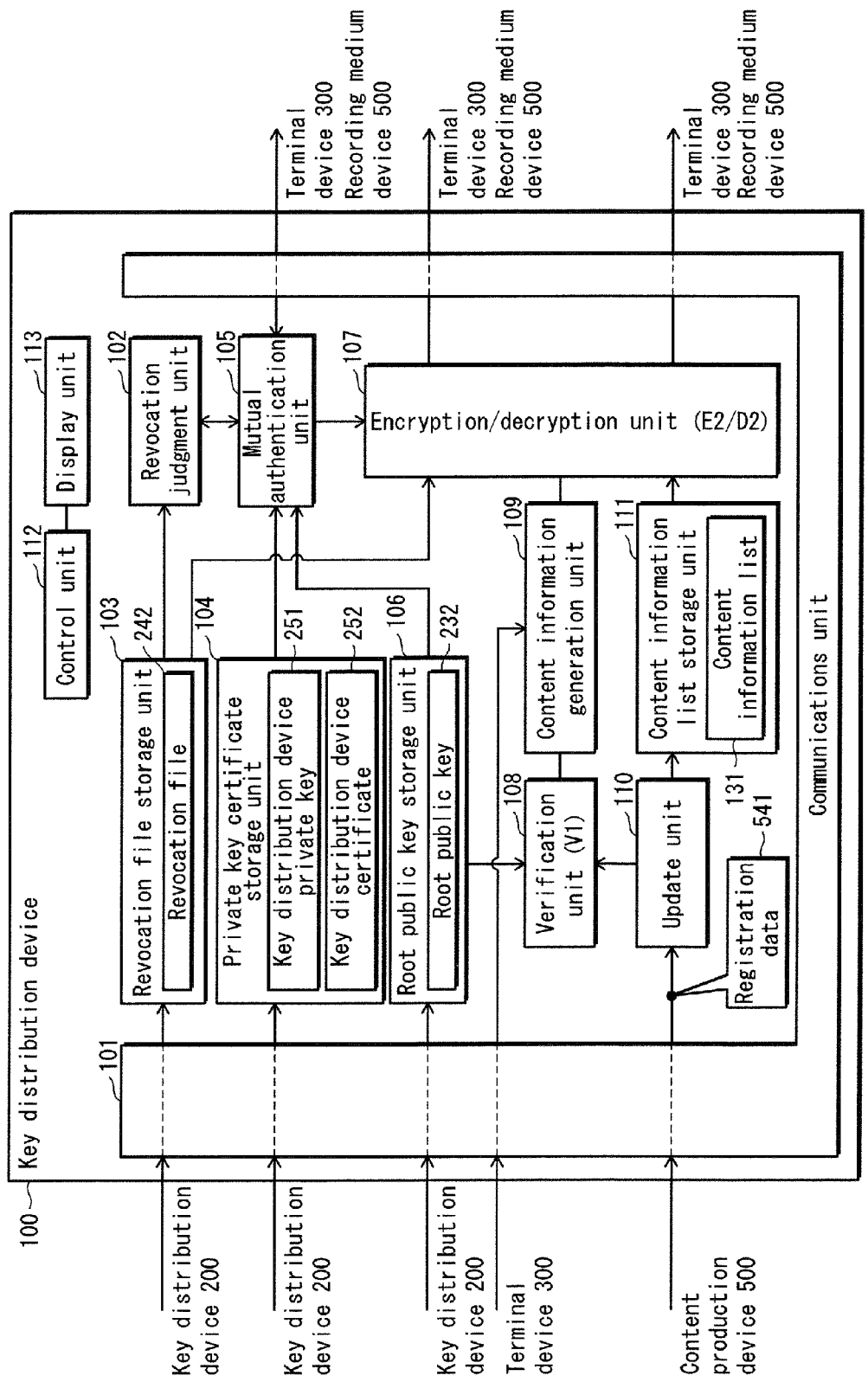
FIG. 17 is a block diagram showing the structure of a key distribution device 100.

As shown in FIG. 17, the key distribution device 100 includes a communications unit 101, a revocation judgment unit 102, a revocation file storage unit 103, a private key certificate storage unit 104, a mutual authentication unit 105, a root public key storage unit 106, an encryption/decryption unit 107, a verification unit 108, a content information generation unit 109, an update unit 110, a content information list storage unit 111, a control unit 112, and a display unit 113.

The key distribution device 100 is a computer system composed of a CPU, memory, a secondary storage unit, a network connection unit, a liquid crystal display unit, and the like. The revocation file storage unit 103, the private key certificate storage unit 104, the root public key storage unit 106, and the content information list storage unit 111 are each constituted by the secondary storage unit. The revocation judgment unit 102, the mutual authentication unit 105, the encryption/decryption unit 107, the verification unit 108, the content information generation unit 109, the update unit 110, and the control unit 112 are each constituted by the CPU and computer programs running on the CPU. The communications unit 101 is constituted by the network connection unit. Finally, the display unit 113 is constituted by the liquid crystal display unit.

Of course, the present invention is not limited to the above structure. For example, the encryption/decryption unit 107, the mutual authentication unit 105, and the verification unit 108 may alternatively be constituted by dedicated hardware circuits.

(1) Root Public Key Storage Unit 106, Revocation File Storage Unit 103, Private Key Certificate Storage Unit 104, and Content Information List Storage Unit 111

Root Public Key Storage Unit 106

The root public key storage unit 106 is provided with a region for storing the root public key 232.

Revocation File Storage Unit 103

The revocation file storage unit 103 is provided with a region for storing the revocation file 242.

Private Key Certificate Storage Unit 104

The private key certificate storage unit 104 is provided with a region for storing the key distribution device private key 251 and the key distribution device certificate 252.

Content Information List Storage Unit 111

The content information list storage unit 111 stores a content information list 131c. For example, the content information list 131c includes a plurality of pieces of content related information, as shown in the data structure of the content information list 131c in FIG. 18. Each piece of content related information includes content information, revocation information, authentication condition information, and usage condition information. The content information includes a content provider ID, a content ID, genre information, a quality level, and a title key.

The revocation information, the authentication condition information, the usage condition information, the content provider ID, the content ID, the genre information, the quality level, and the title key are as described above.

As shown in FIG. 18, the content information list 131c includes a piece of content related information 132, for example. The content information included in the content related information 132 includes a content provider ID (133) "01", a content ID (134) "0001", genre information 135 "action", a quality level 136 "SD", and a title key 137 "XXXX". The revocation information 138 does not include anything. The authentication condition information 139 indicates "confirm connection once every three times", and the usage condition information 140 indicates "playable up to 10 times". Note that the title key 137 "XXXX" does not indicate that the title key is actually "XXXX". From the perspective of content protection, it is not appropriate to display the title key as is, and therefore a value of "XXXX" is displayed.

In the content information list 131c shown in FIG. 18, the revocation information is not set within any of the pieces of content related information.

(2) Communications Unit 101

The communications unit 101 receives the root public key 232, the revocation file 242, the key distribution device private key 251, and the key distribution device certificate 252 from the key issuing device 200 over the network 20. Next, the communications unit 101 writes the received root public key 232 in the root public key storage unit 106. The communications unit 101 also writes the received revocation file 242 in the revocation file storage unit 103. Finally, the communications unit 101 writes the received key distribution device private key 251 and key distribution device certificate 252 in the private key certificate storage unit 104.

The communications unit 101 receives the content information registration data 541 from the content production device 500 over the network 20. Next, the communications unit 101 outputs the received registration data 541 to the update unit 110.

The communications unit 101 also receives a content information transmission request from the content terminal device 300 over the network 20. Next, the communications unit 101 outputs the content information transmission request to the control unit 112.

(3) Update Unit 110

The update unit 110 receives the registration data 541 from the communications unit 101. Upon receiving the registration data 541, the update unit 110 outputs the received registration data 541 to the verification unit 108 and instructs the verification unit 108 to verify the signature data. The update unit 110 receives the verification results from the verification unit 108. When the verification results indicate that verification failed, the update unit 110 does not use the registration data 541. Accordingly, the registration data 541 is not processed in this case. On the other hand, when the verification results indicate that verification succeeded, or when the verification results indicate that verification of the signature data was not performed, the update unit 110 updates the content information list 131c stored in the content information list storage unit 111 using the received registration data 541.

The update unit 110 updates the content information list 131c as follows.

The update unit 110 checks whether content related information containing the same content ID as the content ID included in the registration data 541 is included in the content information list 131c.

(a) If content related information including the same content ID as the content ID included in the registration data 541 is included in the content information list 131c, the update unit 110 adds the other items included in the registration data 541 to the content related information, or overwrites the items in the content related information with the other items included in the registration data 541.

For example, when revocation information is included in the registration data 541, the update unit 110 adds the revocation information included in the registration data 541 to the content related information, or overwrites the revocation information in the content related information with the revocation information included in the registration data 541. The same is true for other items in the registration data 541. If the content related information already includes an item that is the same as an item included in the registration data 541, it is not necessary to overwrite the item in the content related information.

(b) If content related information including the same content ID as the content ID included in the registration data 541 is not included in the content information list 131c, the update unit 110 generates content related information including the items included in the registration data 541, and adds the generated content related information to the content information list 131c.

Content Information List 131a

FIG. 19 shows a content information list 131a as an example of a content information list updated in the above way. In the content information list 131a, the revocation information 138 in the content related information 132 shown in FIG. 18 is updated to revocation information 138a in the content related information 132a. The revocation information 138a includes "terminal device ID: 0005, terminal device ID: 0006".

The difference between the content information list 131a shown in FIG. 19 and the content information list 131c is that "terminal device ID: 0005" and "terminal device ID: 0006" have been added to the content related information 132 as revocation information. As shown in this example, the content production device 500 identifies a content ID, allowing for addition of revocation information to a particular content.

Content Information List 131b

FIG. 20 shows a content information list 131b yielded by further updating the content information list 131a. In the content information list 131b, the content related information 132b and content related information 132c have been updated.

The content information list 131b is yielded by updating the content information list 131a using the registration data 541f shown in FIG. 14.

The difference from the content information list 131a is the addition, to both the content related information 132b and the content related information 132c, of "terminal device ID: 0003" and "terminal device ID: 0004" as revocation information. As shown in this example, revocation information can be added to a plurality of pieces of content related information by indicating both the content provider ID and the quality level. Here, a content provider ID of "01" and a quality level of "HD" are indicated, thereby adding revocation information of "terminal device ID: 0003" and "terminal device ID: 0004" to both the content related information 132b and the content related information 132c.

(4) Verification Unit 108

The verification unit 108 receives the registration data 541 from the update unit 110. Upon receiving the registration data 541, the verification unit 108 determines whether the revocation approval flag is included in the registration data 541. When the revocation approval flag is not included, the verification unit 108 does nothing with the registration data 541 and simply outputs, to the update unit 110, verification results indicating that the signature data was not verified.

When the revocation approval flag is included, the verification unit 108 determines whether the revocation approval flag is "ON".

When the revocation approval flag is "OFF", the verification unit 108 does nothing with the registration data 541 and outputs, to the update unit 110, verification results indicating that the signature data was not verified.

On the other hand, when the revocation approval flag is "ON", the verification unit 108 extracts data other than the signature data from the registration data 541 and then extracts the signature data. The verification unit 108 also reads the root public key 232 from the root public key storage unit 106. Next, the verification unit 108 verifies the digital signature by applying a signature verification algorithm V1 to the data other than the signature data and the verification data in the registration data 541, using the read root public key 232. The verification unit 108 generates verification results and outputs the verification results to the update unit 110. The verification results indicate whether verification of the digital signature succeeded or failed.

(5) Content Information Generation Unit 109

The content information generation unit 109 receives an instruction to generate content information from the control unit 112. Upon receiving the instruction to generate content information, the content information generation unit 109 extracts the content ID from the instruction.

The content information generation unit 109 searches for the extracted content ID within the content information list 131c stored in the content information list storage unit 111. In other words, the content information generation unit 109 determines whether content related information including the extracted content ID is located in the content information list 131c. When not finding the extracted content ID, the content information generation unit 109 generates a message indicating that the extracted content ID was not found. The content information generation unit 109 then transmits the generated message to the other device and suspends subsequent processing.

On the other hand, when finding the extracted content ID, the content information generation unit 109 performs the following processing.

Generation of Individual Revocation List 141

Figure 21:
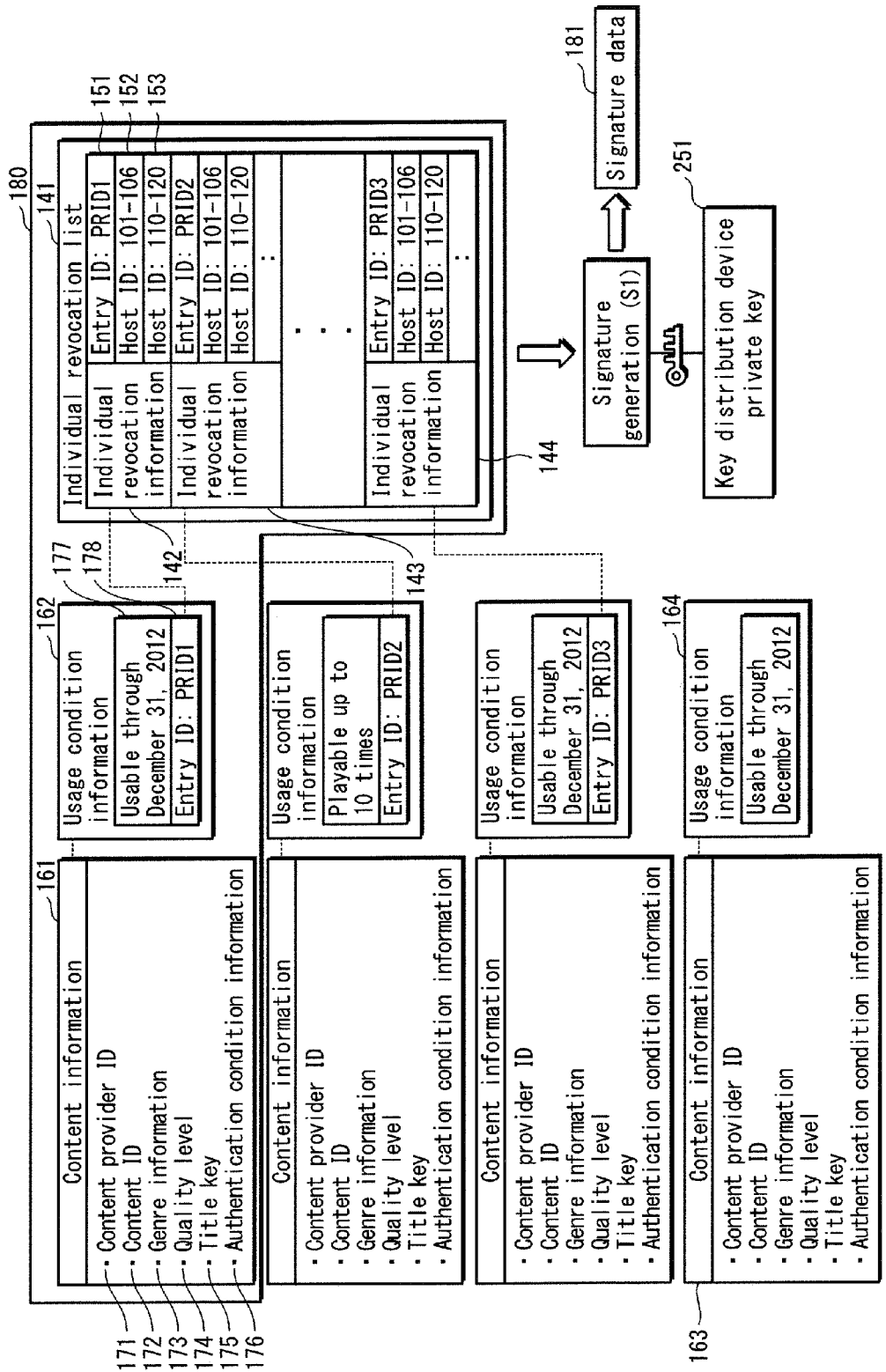
FIG. 21 shows an example of the data structure of a concatenated value 180.

When finding the extracted content ID, the content information generation unit 109 performs the following processing to generate an individual revocation list 141, an example of which is shown in FIG. 21.

The content information generation unit 109 initializes the individual revocation list 141. In this state, the individual revocation list 141 contains nothing.

Next, the content information generation unit 109 repeats steps (a) through (e) for the content related information in the content information list 131c.

(a) Read the content related information.

(b) Attempt to extract revocation information from the read content related information.

(c) When revocation information exists, generate an entry ID. The entry ID is generated by storing the most recently generated entry ID and incrementing the stored entry ID by "1".

(d) Generate individual revocation information including the generated entry ID and the revocation information.

(e) Add the generated individual revocation information to the individual revocation list 141.

Generation of Encrypted Content Information

The content information generation unit 109 reads the content related information that includes the extracted content ID from the content information list 131c. Next, the content information generation unit 109 extracts the content information, the authentication condition information, and the usage condition information from the read content related information.

As shown in FIG. 21, the content information generation unit 109 generates new content information 161 by including the extracted authentication condition information in the extracted content information. The content information generation unit 109 also extracts the entry ID corresponding to the extracted content ID from the individual revocation list 141 and generates new usage condition information 162 by including the extracted entry ID in the usage condition information, as shown in FIG. 21.

Next, the content information generation unit 109 reads the key distribution device private key 251 from the private key certificate storage unit 104. As shown in FIG. 21, the content information generation unit 109 then generates a concatenated value 180 by concatenating the content information 161, the usage condition information 162, and the individual revocation list 141. Next, the content information generation unit 109 generates signature data 181 by applying a digital signature with the signature generation algorithm S1 to the concatenated value 180 using the key distribution device private key 251.

The content information generation unit 109 then outputs the concatenated value 180 and the signature data 181 to the encryption/decryption unit 107. Next, the content information generation unit 109 instructs the encryption/decryption unit 107 to encrypt the concatenated value 180 and the signature data 181 and transmit the results to the recording medium device 600.

(6) Mutual Authentication Unit 105

As shown below, the mutual authentication unit 105 performs mutual authentication with the recording medium device 600 (or with the terminal device 300) and shares the same shared key with the recording medium device 600 (or with the terminal device 300).

Figure 22:
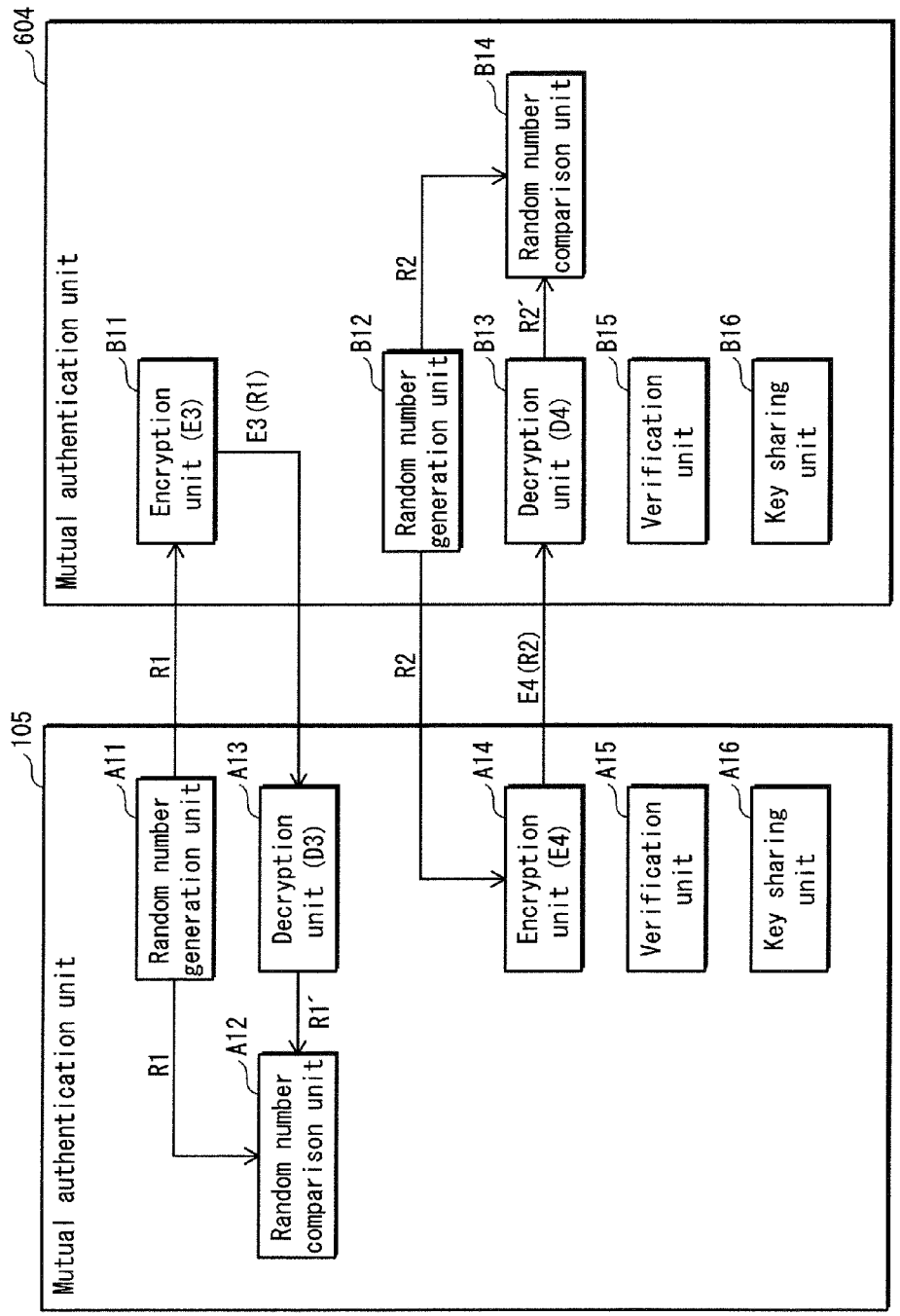
FIG. 22 is a block diagram showing the structure of a mutual authentication unit 105 and a mutual authentication unit 604.

As shown in FIG. 22, the mutual authentication unit 105 includes a random number generation unit A11, a random number comparison unit A12, a decryption unit A13, an encryption unit A14, a verification unit A15, and a key sharing unit A16.

The random number generation unit A10 generates a random number R1 and outputs the generated random number R1 to the random number comparison unit A12. The random number generation unit A11 also transmits the generated random number R1 to the other device with which mutual authentication is being performed (here, the recording medium device 600 or the terminal device 300).

The decryption unit A13 receives an encrypted random number E3(R1) from the other device with which mutual authentication is being performed. Next, the decryption unit A13 decrypts the received encrypted random number E3(R1) by applying a decryption algorithm D3, thereby generating decrypted text R1', which equals D3(E3(R1)). The decryption unit A13 then outputs the generated decrypted text R1' to the random number comparison unit A12.

The decryption algorithm D3 is a decryption algorithm that uses a secret key cryptosystem. An example of the decryption algorithm D3 is AES. E3(A) represents an encrypted text generated by applying an encryption algorithm E3 to a plaintext A. D3(B) represents a decrypted text generated by applying the decryption algorithm D3 to the encrypted text B.

The random number comparison unit A12 receives the random number R1 and the decrypted text R1'. The random number comparison unit A12 then compares the random number R1 and the decrypted text R1'. If the random number R1 and the decrypted text R1' match, the mutual authentication unit 105 determines that the other device is authentic. If the random number R1 and the decrypted text R1' do not match, the mutual authentication unit 105 determines that the other device with which mutual authentication is being performed is not authentic.

The encryption unit A14 receives the random number R2 from the other device. Upon receiving the random number R2, the encryption unit A14 encrypts the random number R2 by applying an encryption algorithm E4 to generate an encrypted random number E4(R2) and transmits the generated encrypted random number E4(R2) to the other device.

The encryption algorithm E4 is an encryption algorithm that uses a secret key cryptosystem. An example of the encryption algorithm E4 is AES. E4(A) represents an encrypted text generated by applying the encryption algorithm E4 to a plaintext A.

When mutual authentication is successful, the verification unit A15 reads the key distribution device certificate 252 from the private key certificate storage unit 104. Next, the verification unit A15 transmits the read key distribution device certificate 252 to the other device. From the other device, the verification unit A15 receives the public key certificate of the other device. When the other device is the recording medium device 600 (or the terminal device 300), the public key certificate is the recording medium device certificate 272 (or the terminal device certificate 262).

The verification unit A15 then reads the root public key 232 from the root public key storage unit 106 and verifies the public key certificate of the other device using the read root public key 232.

When verification fails, the following processing is not performed. When verification is successful, the key sharing unit A16 calculates a shared key k by performing key sharing processing.

When mutual authentication with the other device is successful, the mutual authentication unit 105 outputs verification results to the control unit 112 indicating that mutual authentication was successful.

(7) Revocation Judgment Unit 102

The revocation judgment unit 102 receives the identifying information of the other device with which mutual authentication is performed from the mutual authentication unit 105. The identifying information of the other device is included in the public key certificate of the other device. Here, the other device with which mutual authentication is being performed is the recording medium device 600 or the terminal device 300. The identifying information of the other device is either the terminal device ID identifying the terminal device 300 or the recording medium device ID identifying the recording medium device 600. The identifying information of the other device may instead be the model ID of the terminal device 300 or the recording medium device 600. Alternatively, the identifying information of the other device may be identifying information identifying the public key certificate allocated to the device.

The revocation judgment unit 102 judges whether the identifying information of the other device is included in the revocation file 242 stored in the revocation file storage unit 103.

When judging that the identifying information of the other device is included in the revocation file 242 stored in the revocation file storage unit 103, the revocation judgment unit 102 considers the other device to be malicious, generates a message indicating that the other device is malicious, and outputs the generated message to the control unit 112, which suspends processing and transmission with the other device.

(8) Encryption/Decryption Unit 107

When the mutual authentication unit 105 successfully performs mutual authentication with the other device, the encryption/decryption unit 107 receives the shared key k from the mutual authentication unit 105.

When transmitting plaintext data to the other device, the encryption/decryption unit 107 encrypts the plaintext data to generate encrypted data by applying an encryption algorithm E2 using the shared key k. Next, the encryption/decryption unit 107 outputs the encrypted data to the communications unit 101 and instructs the communications unit 101 to transmit the encrypted data to the other device.

When receiving encrypted data from the other device, the encryption/decryption unit 107 decrypts the encrypted data to generate the original plaintext data by applying a decryption algorithm D2 using the shared key k. Next, the encryption/ decryption unit 107 outputs the plaintext data to a constituent element of the key distribution device 100.

The encryption algorithm E2 is an encryption algorithm that uses a secret key cryptosystem. An example of the encryption algorithm E2 is AES. The decryption algorithm D2 is a decryption algorithm that uses a secret key cryptosystem. An example of the decryption algorithm D2 is AES. The decryption algorithm D2 decrypts encrypted text that was encrypted with the encryption algorithm E2.

The encryption/decryption unit 107 can thus protect data over the communications channel.

For example, the encryption/decryption unit 107 receives the concatenated value 180 and the signature data 181 from the content information generation unit 109. Next, the encryption/decryption unit 107 encrypts the concatenated value 180 and the signature data 181 to generate an encrypted content information concatenated value by applying the encryption algorithm E2 using the shared key k. The encryption/decryption unit 107 then instructs the communications unit 101 to transmit the generated encrypted content information concatenated value to the recording medium device 600.

(9) Control Unit 112

The control unit 112 receives a content information transmission request from the content terminal device 300 over the network 20 via the communications unit 101. Upon receiving the content information transmission request, the control unit 112 instructs the mutual authentication unit 105 to perform mutual authentication with the recording medium device 600. When mutual authentication is successful, the control unit 112 instructs the revocation judgment unit 102 to confirm whether the terminal device 300 or the recording medium device 600 has been revoked.

The control unit 112 receives authentication results, indicating success of mutual authentication with the other device, from the mutual authentication unit 105. Upon receiving the authentication results, the control unit 112 instructs the content information generation unit 109 to generate content information.

The control unit 112 controls each of the constituent elements in the key distribution device 100.

(10) Display Unit 113

The display unit 113 is controlled by the control unit 112 to display information.

2.6 Detailed Configuration of Recording Medium Device 600

Figure 23:
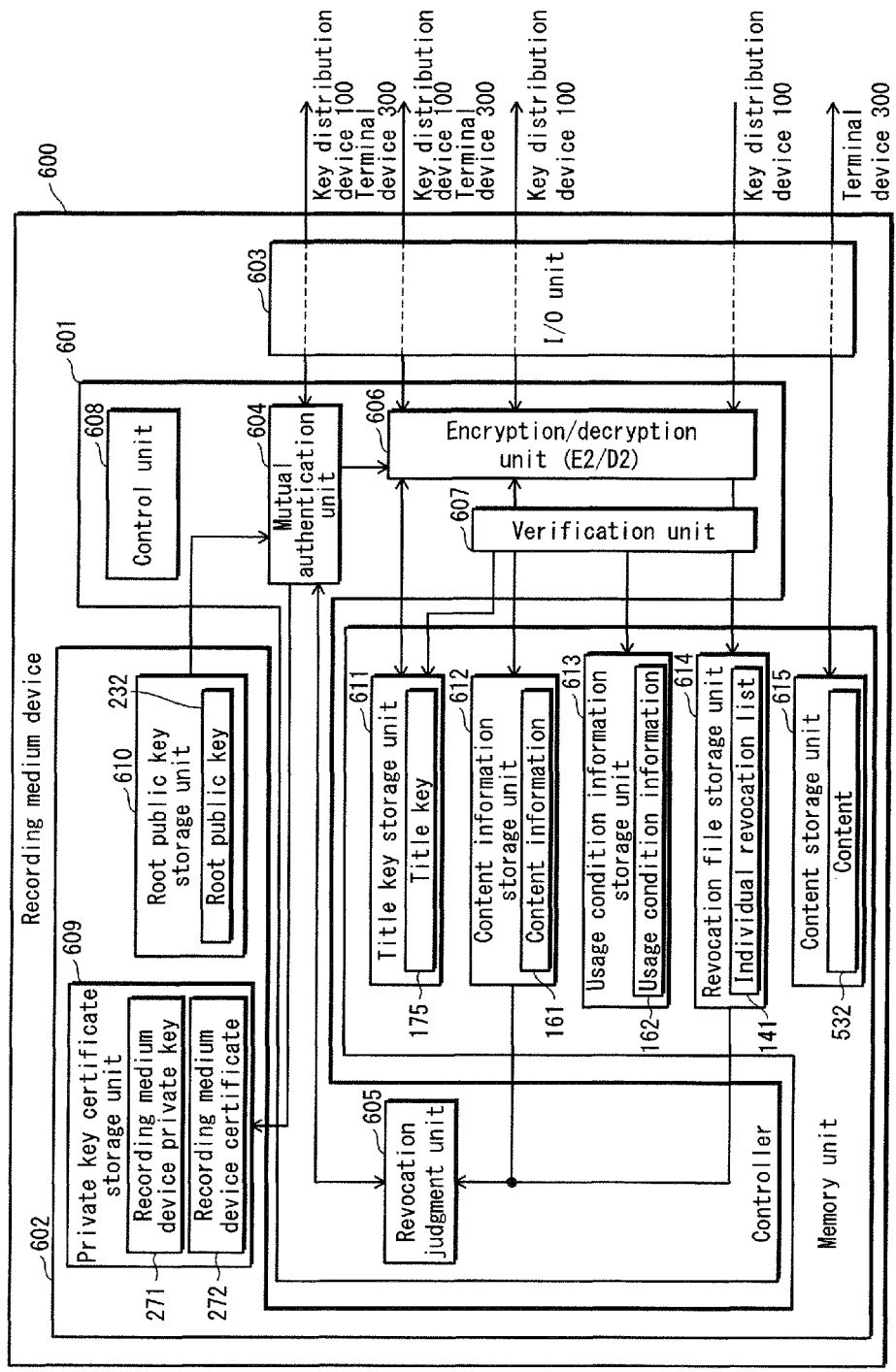
FIG. 23 is a block diagram showing the structure of a recording medium device 600.
Figure 24:
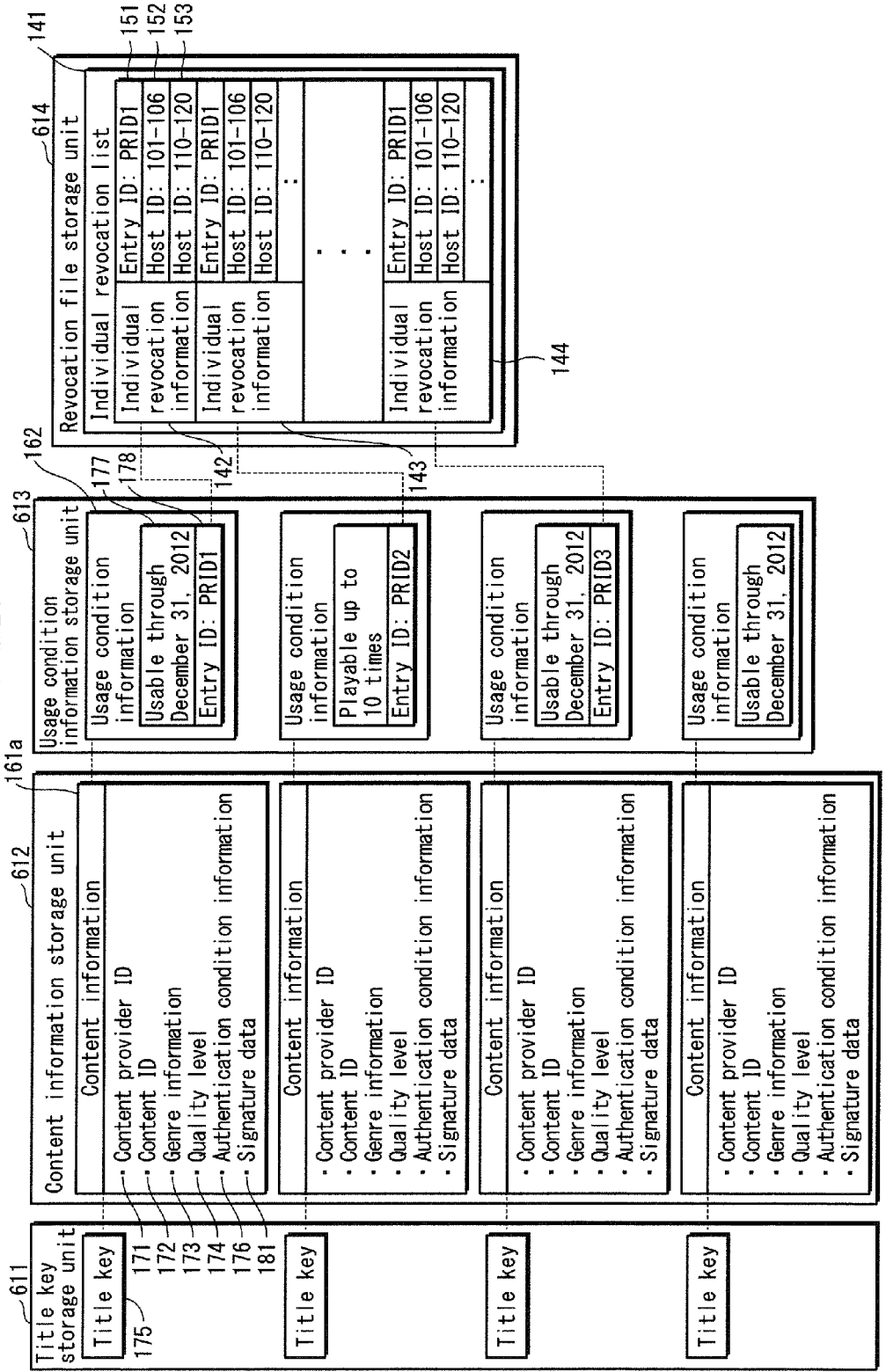
FIG. 24 shows an example of the data structure of data stored in a title key storage unit 611, a content information storage unit 612, a usage condition information storage unit 613, and a revocation file storage unit 614.

As shown in FIG. 23, the recording medium device 600 includes a controller 601, a memory 602, and an I/O unit 603.

The controller 601 is tamper resistant and includes a mutual authentication unit 604, a revocation judgment unit 605, an encryption/decryption unit 606, a verification unit 607, and a control unit 608. The memory 602 includes a private key certificate storage unit 609, a root public key storage unit 610, a title key storage unit 611, a content information storage unit 612, a usage condition information storage unit 613, a revocation file storage unit 614, and a content storage unit 615.

The controller 601 is a computer system composed of a CPU, memory, an I/O unit, and the like. The mutual authentication unit 604, the revocation judgment unit 605, the encryption/decryption unit 606, the verification unit 607, and the control unit 608 are each constituted by the CPU and computer programs running on the CPU. Of course, the present invention is not limited to the above structure. For example, the mutual authentication unit 604, the revocation judgment unit 605, the encryption/decryption unit 606, and the verification unit 607 may alternatively be constituted by dedicated hardware circuits within the controller 601.

(1) Memory 602

Private Key Certificate Storage Unit 609

The private key certificate storage unit 906 is provided with a region for storing the recording medium device private key 271 and the recording medium device certificate 272.

The recording medium device private key 271 and the recording medium device certificate 272 are written into the private key certificate storage unit 609 by the manufacturing device (not shown in the figures) that manufacturers the recording medium device 600.

Root Public Key Storage Unit 610

The root public key storage unit 610 is provided with a region for storing the root public key 232. The root public key 232 is written into the root public key storage unit 610 by the manufacturing device (not shown in the figures) that manufacturers the recording medium device 600.

Title Key Storage Unit 611

The title key storage unit 611 is provided with a region for storing a title key 175. The title key 175 is received from the key distribution device 100.

Content Information Storage Unit 612

The content information storage unit 612 is provided with a region for storing the content information 161. The content information 161 is received from the key distribution device 100.

The content information storage unit 612 receives content information from the key distribution device 100. When signature verification is successful, the content information storage unit 612 stores the content information or uses the content information for updating.

Usage Condition Information Storage Unit 613

The usage condition information storage unit 613 is provided with a region for storing the usage condition information 162. The usage condition information 162 is received from the key distribution device 100.

Revocation File Storage Unit 614

The revocation file storage unit 614 is provided with a region for storing the individual revocation list 141. The individual revocation list 141 is received from the key distribution device 100.

When signature verification is successful upon receipt of the individual revocation list 141 from the key distribution device 100, the revocation file of the individual revocation list 141 in the revocation file storage unit 614 is updated, or the individual revocation list 141 is stored in the revocation file storage unit 614.

Content Storage Unit 615

The content storage unit 615 receives a content from the terminal device 300 and stores the content. The content storage unit 615 also receives a read request from the terminal device 300 and transmits the content to the terminal device 300.

(2) I/O Unit 603

The I/O unit 603 receives an acquisition request from the terminal device 300 and transmits the title key to the terminal device 300.

The I/O unit 603 receives the encrypted content information concatenated value and outputs the received encrypted content information concatenated value to the encryption/decryption unit 606.

(3) Verification Unit 607

The verification unit 607 receives the concatenated value 180 and the signature data 181 from the encryption/decryption unit 606. Upon receiving the concatenated value 180 and the signature data 181, the verification unit 607 verifies the digital signature by applying a signature verification algorithm V1 to the concatenated value 180 and the signature data 181 using the key distribution device public key 254 included in the key distribution device certificate 252.

When verification fails, the verification unit 607 generates a message indicating that verification failed, and processing terminates.

When verification is successful, the verification unit 607 generates a message indicating that verification succeeded. Next, the verification unit 607 extracts the title key from the concatenated value 180 and writes the extracted title key in the title key storage unit 611. The verification unit 607 also extracts content information other than the title key from the concatenated value 180 and writes the extracted content information in the content information storage unit 612. Furthermore, the verification unit 607 extracts the usage condition information from the concatenated value 180 and writes the extracted usage condition information in the usage condition information storage unit 613. Finally, the verification unit 607 then extracts the individual revocation list from the concatenated value 180 and writes the extracted individual revocation list in the revocation file storage unit 614.

(4) Mutual Authentication Unit 604

The mutual authentication unit 604 performs mutual authentication with the key distribution device 100 (or with the content distribution device 400) and shares a shared key with the key distribution device 100 (or with the content distribution device 400).

As shown in FIG. 22, the mutual authentication unit 604 includes an encryption unit B11, a random number generation unit B12, a decryption unit B13, a random number comparison unit B14, a verification unit B15, and a key sharing unit B16.

The encryption unit B11 receives the random number R1 from the other device (key distribution device 100). Upon receiving the random number R1, the encryption unit B11 encrypts the random number R1 by applying the encryption algorithm E3 to generate the encrypted random number E3(R1) and transmits the generated encrypted random number E3(R1) to the other device.

The encryption algorithm E3 is an encryption algorithm that uses a secret key cryptosystem. An example of the encryption algorithm E3 is AES. E3(A) represents an encrypted text generated by applying the encryption algorithm E3 to a plaintext A.

The random number generation unit B10 generates a random number R2. The random number generation unit B10 then outputs the generated random number R2 to the random number comparison unit B14. The random number generation unit B10 also transmits the generated random number R2 to the other device with which mutual authentication is being performed (the key distribution device 100).

The decryption unit B13 receives the encrypted random number E4(R2) from the other device with which mutual authentication is being performed. Next, the decryption unit B13 decrypts the received encrypted random number E4(R2) by applying a decryption algorithm D4, thereby generating decrypted text R2', which equals D4(E4(R2)). The decryption unit B13 then outputs the generated decrypted text R2' to the random number comparison unit B14.

The decryption algorithm D4 is an encryption algorithm that uses a secret key cryptosystem. An example of the decryption algorithm D4 is AES. E4(A) represents a decrypted text generated by applying the decryption algorithm D4 to the encrypted text A. D4(B) represents a decrypted text generated by applying the decryption algorithm D4 to the encrypted text B.

The random number comparison unit B14 receives the random number R2 and the decrypted text R2'. The random number comparison unit B14 then compares the random number R2 and the decrypted text R2'. If the random number R2 and the decrypted text R2' match, the mutual authentication unit 604 determines that the other device is authentic. If the random number R2 and the decrypted text R2' do not match, the mutual authentication unit 604 determines that the other device with which mutual authentication is being performed is not authentic.

When mutual authentication is successful, the verification unit B15 reads the recording medium device certificate 272 from the private key certificate storage unit 609. Next, the verification unit B15 transmits the read recording medium device certificate 272 to the other device. From the other device, the verification unit B15 receives the public key certificate of the other device. When the other device is the key distribution device 100, the public key certificate is the key distribution device certificate 252. The verification unit B15 then reads the root public key 232 from the root public key storage unit 610 and verifies the public key certificate of the other device using the read root public key 232.

When verification fails, the following processing is not performed. When verification is successful, the key sharing unit B16 calculates a shared key k' by performing key sharing processing.

When mutual authentication with the other device is successful, the mutual authentication unit 604 outputs verification results to the control unit 608 indicating that mutual authentication was successful.

(5) Revocation Judgment Unit 605

The revocation judgment unit 605 receives the identifying information of the other device with which mutual authentication is performed from the mutual authentication unit 604. The identifying information of the other device is included in the public key certificate of the other device. In this case, the other device with which mutual authentication is performed is the terminal device 300. The identifying information of the other device is the terminal device ID identifying the terminal device 300. The identifying information of the other device may instead be the model ID of the terminal device 300. Alternatively, the identifying information of the other device may be identifying information identifying the public key certificate allocated to the device.

The revocation judgment unit 605 judges whether the identifying information of the other device is included in the individual revocation information that (i) corresponds to the content ID identifying the content that is to be played back and (ii) is listed in the individual revocation list 141 stored in the revocation file storage unit 103.

When the identifying information of the other device is included in the individual revocation information, the revocation judgment unit 605 considers the terminal device 300 to be malicious and generates a message indicating that the terminal device 300 is malicious. Next, the revocation judgment unit 605 outputs the generated message to the control unit 112, which suspends processing and transmission with the terminal device 300.

(6) Encryption/Decryption Unit 606

When data is transmitted during communication for mutual authentication between the recording medium device 600 and the key distribution device 100, or between the recording medium device 600 and the terminal device 300, the encryption/decryption unit 606 encrypts the data using the shared key k' generated by the mutual authentication unit 604. When data is received, the encryption/decryption unit 606 decrypts the data using the shared key k'. Data is thus protected over the communications channel.

For example, the encryption/decryption unit 606 receives the encrypted content information concatenated value from the I/O unit 603. Upon receiving the encrypted content information concatenated value, the encryption/decryption unit 606 decrypts the encrypted content information concatenated value by applying the decryption algorithm D2 using the shared key k'. As a result, the encryption/decryption unit 606 generates the concatenated value 180 and the signature data 181 shown in FIG. 21. Next, the encryption/decryption unit 606 outputs the concatenated value 180 and the signature data 181 to the verification unit 607.

2.7 Detailed Configuration of Terminal Device 300

Figure 25:
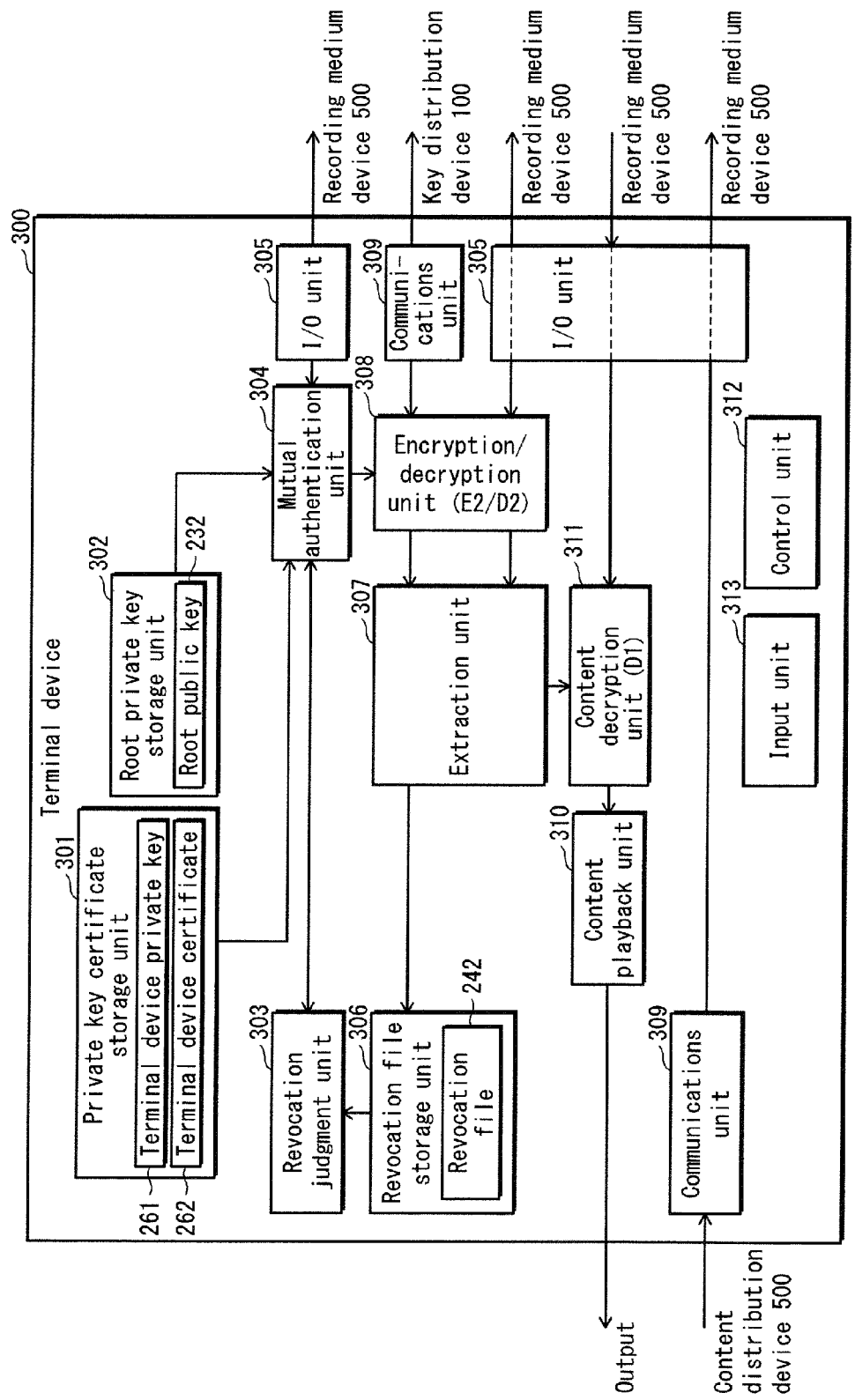
FIG. 25 is a block diagram showing the structure of a terminal device 300.

As shown in FIG. 25, the terminal device 300 includes a private key certificate storage unit 301, root public key storage unit 302, revocation judgment unit 303, a mutual authentication unit 304, an I/O unit 305, a revocation file storage unit 306, a extraction unit 307, an encryption/decryption unit 308, a communications unit 309, a content playback unit 310, a content decryption unit 311, a control unit 312, an input unit 313, and a display unit 314.

The terminal device 300 is a computer system composed of a CPU, memory, a secondary storage unit, a network connection unit, a memory card connection unit, and the like. The private key certificate storage unit 301, the root public key storage unit 302, and the revocation file storage unit 306 are each constituted by the secondary storage unit. The revocation judgment unit 303, the mutual authentication unit 304, the extraction unit 307, the encryption/decryption unit 308, the content playback unit 310, the content decryption unit 311, and the control unit 312 are each constituted by the CPU and computer programs running on the CPU. The communications unit 210 is constituted by the network connection unit. Finally, the I/O unit 305 is constituted by the memory card connection unit.

Of course, the present invention is not limited to the above structure. For example, the mutual authentication unit 304, the encryption/decryption unit 308, the content playback unit 310, and the content decryption unit 311 may alternatively be constituted by dedicated hardware circuits.

(1) Private Key Certificate Storage Unit 301, Root Public Key Storage Unit 302, and Revocation File Storage Unit 306

Private Key Certificate Storage Unit 301

The private key certificate storage unit 301 is provided with a region for storing the terminal device private key 261 and the terminal device certificate 262. The terminal device private key 261 and the terminal device certificate 262 are written into the private key certificate storage unit 301 by the manufacturing device that manufacturers the terminal device 300.

Root Public Key Storage Unit 302

The root public key storage unit 302 is provided with a region for storing the root public key 232. The root public key 232 is written into the root public key storage unit 302 by the manufacturing device (not shown in the figures) that manufacturers the terminal device 300.

Revocation File Storage Unit 306

The revocation file storage unit 306 is provided with a region for storing the revocation file 242.

The revocation file 242 is written in the revocation file storage unit 306 when verification of the signature data attached to the revocation file 242 is successful.

(2) Mutual Authentication Unit 304

The mutual authentication unit 304 performs mutual authentication with the key distribution device 100 or with the recording medium device 600 and shares a shared key with the key distribution device 100 or with the recording medium device 600. Note that the mutual authentication unit 304 has the same configuration as the mutual authentication units 105 and 604 shown in FIG. 22, and thus a description thereof is omitted.

(3) Revocation Judgment Unit 303

The revocation judgment unit 303 judges whether the ID of the recording medium device 600 specified during mutual authentication, i.e. the recording medium device ID, matches information listed in the revocation file stored in the revocation file storage unit 306. If so, the revocation judgment unit 303 considers the recording medium device 600 that is attempting to communicate to be malicious and suspends processing and communication by the mutual authentication unit 304. If the IDs do not match, processing continues.

(4) Encryption/Decryption Unit 308

During communication between the terminal device 300 and the key distribution device 100, or between the terminal device 300 and the recording medium device 600, the encryption/decryption unit 308 encrypts data upon transmission and decrypts data upon reception using the shared key shared by the mutual authentication unit 304. Data is thus protected over the communications channel.

The encryption/decryption unit 308 receives the revocation file in an encrypted state from the communications unit 309. Upon receiving the revocation file in an encrypted state, the encryption/decryption unit 308 generates the revocation file by decrypting the revocation file in an encrypted state. Next, the encryption/decryption unit 308 outputs the generated revocation file to the extraction unit 307.

(5) Extraction Unit 307

The extraction unit 307 receives the title key from the recording medium device 600 via the encryption/decryption unit 340.

The extraction unit 307 receives the revocation file from the key distribution device 100 over the network 20 via the communications unit 309 and the encryption/decryption unit 308. The extraction unit 307 performs signature verification using the signature data included in the received revocation file. When verification is successful, the extraction unit 307 writes the received revocation file in the revocation file storage unit 306. When verification fails, the extraction unit 307 prohibits the writing of the received revocation file in the revocation file storage unit 306.

(6) I/O Unit 305

The I/O unit 305 reads the content from the recording medium device 600. The I/O unit 305 then outputs the read content to the content decryption unit 311.

The I/O unit 305 receives the content from the communications unit 309. Upon receiving the content, the I/O unit 305 writes the received content in the recording medium device 600.

(7) Content Decryption Unit 311

The content decryption unit 311 receives the content from the I/O unit 305. The content decryption unit 311 also receives the title key from the extraction unit 307. Upon receiving the content and the title key, the content decryption unit 311 decrypts the content by applying the decryption algorithm D1 using the title key. As a result, the content decryption unit 311 generates decrypted content and outputs the decrypted content to the content playback unit 310.

(8) Content Playback Unit 310

The content playback unit 310 receives the decrypted content from the content decryption unit 311. Upon receiving the decrypted content, the content playback unit 310 plays the decrypted content back, outputting the result to the display unit 314. Note that alternatively, the content playback unit 310 may direct output to a television receiver or to a monitor or other form of display device connected to the terminal device 300.

(9) Communications Unit 309

The communications unit 309 receives a content from the content distribution device 400.

The communications unit 309 receives the revocation file from the key distribution device 100 in an encrypted state. Upon receiving the revocation file in an encrypted state, the communications unit 309 outputs the revocation file in an encrypted state to the encryption/decryption unit 340.

(10) Control Unit 312

The control unit 312 controls each of the constituent elements in the terminal device 300.

(11) Input Unit 313 and Display Unit 314

The input unit 313 receives input of operations and data from the user. Next, the input unit 313 outputs operation information indicating the received operations to the control unit 312. The input unit 313 also outputs data for which input has been received to the control unit 312.

The display unit 314 is controlled by the control unit 312 to display information.

2.8 Operations of Content Management System 10a

The following describes operations of the content management system 10a.

(1) Key Issuing Operations

Figure 26:
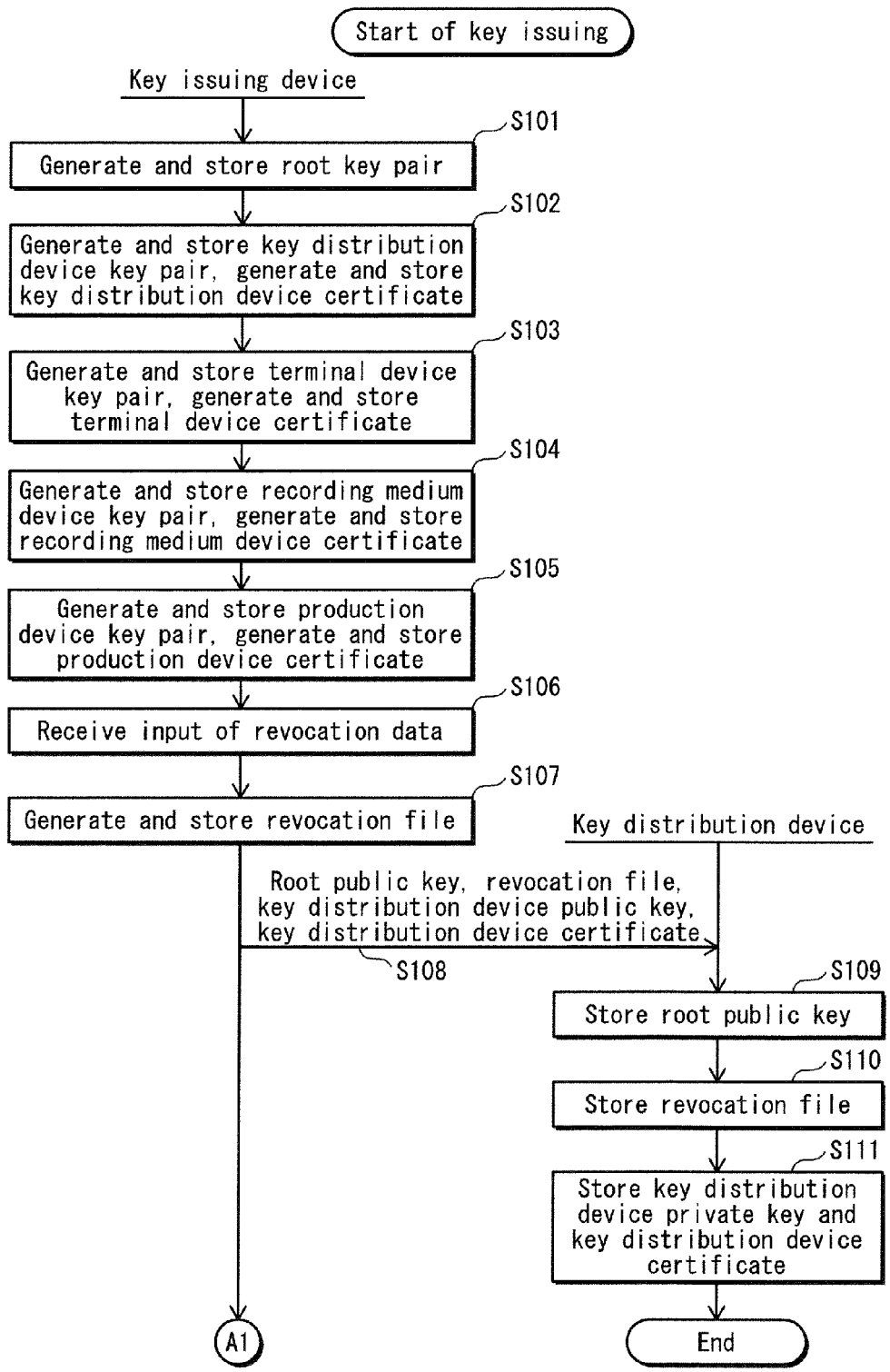
FIG. 26 is a sequence diagram showing the sequence for key issuing and is continued in FIG. 27.
Figure 27:
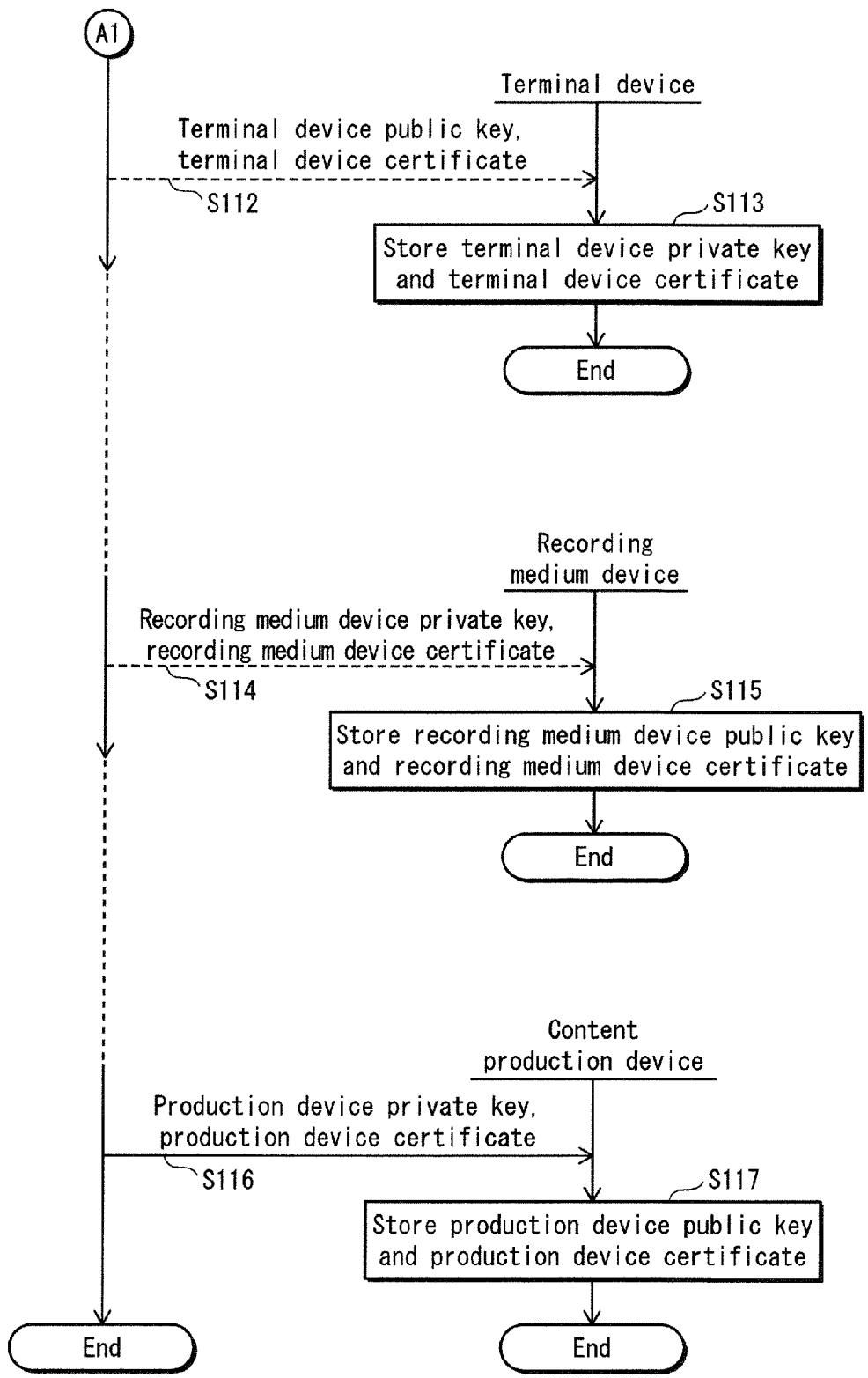
FIG. 27 is a sequence diagram showing the sequence for key issuing and is continued in FIG. 28.

The following describes key issuing operations within the content management system 10a with reference to the sequence diagrams in FIGS. 26 and 27.

The key pair generation unit 201 in the key issuing device 200 generates a root key pair composed of the root private key 231 and the root public key 232. Next, the key pair generation unit 201 writes the generated root key pair in the root key pair storage unit 202 (step S101).

Next, the key pair generation unit 201 generates a key distribution device key pair composed of the key distribution device private key 251 and the key distribution device public key 254. The key pair generation unit 201 then writes the key distribution device key pair in the private key certificate storage unit 204. The certificate generation unit 203 generates the key distribution device certificate 252 and writes the key distribution device certificate 252 in the private key certificate storage unit 204 (step S102).

Next, the key pair generation unit 201 generates a terminal device key pair composed of the terminal device private key 261 and the terminal device public key 264. The key pair generation unit 201 then writes the terminal device key pair in the private key certificate storage unit 204. The certificate generation unit 203 generates the terminal device certificate 262 and writes the terminal device certificate 262 in the private key certificate storage unit 204 (step S103).

Next, the key pair generation unit 201 generates a recording medium device key pair composed of the recording medium device private key 271 and the recording medium device public key 274. The key pair generation unit 201 then writes the recording medium device key pair in the private key certificate storage unit 204. The certificate generation unit 203 generates the recording medium device certificate 272 and writes the recording medium device certificate 272 in the private key certificate storage unit 204 (step S104).

Next, the key pair generation unit 201 generates a production device key pair composed of the production device private key 281 and the production device public key 284. The key pair generation unit 201 then writes the production device key pair in the private key certificate storage unit 204. The certificate generation unit 203 generates the production device certificate 282 and writes the production device certificate 282 in the private key certificate storage unit 204 (step S105).

By user operation, the input unit 205 receives input of revocation data, i.e. a terminal device ID that identifies a revoked terminal device and a recording medium device ID that identifies a revoked recording medium device (step S106).

The revocation file generation unit 211 generates the revocation file 242 from the revocation data 241 stored in the revocation data storage unit 206. The revocation file generation unit 211 then writes the generated revocation file 242 in the revocation file storage unit 208 (step S107).

The communications unit 210 transmits the root public key 232, the revocation file 242, the key distribution device private key 251, and the key distribution device certificate 252 to the key distribution device 100 (step S108). The communications unit 101 in the key distribution device 100 writes the root public key 232 in the root public key storage unit 106 (step S109), writes the revocation file 242 in the revocation file storage unit 103 (step S110), and writes the key distribution device private key 251 and the key distribution device certificate 252 in the private key certificate storage unit 104 (step S111).

The manufacturing device (not shown in the figures) that manufactures the terminal device 300 receives the terminal device private key 261 and the terminal device certificate 262 from the key issuing device 200 (step S112) and writes the terminal device private key 261 and the terminal device certificate 262 in the private key certificate storage unit 301 in the terminal device 300 (step S113).

The manufacturing device (not shown in the figures) that manufactures the recording medium device 600 receives the recording medium device private key 271 and the recording medium device certificate 272 from the key issuing device 200 (step S114) and writes the recording medium device private key 271 and the recording medium device certificate 272 in the private key certificate storage unit 609 in the recording medium device 600 (step S115).

The communications unit 210 in the key issuing device 200 transmits the production device private key 281 and the production device certificate 282 to the content production device 500 (step S116).

The communications unit 515 in the content production device 500 writes the production device private key 281 and the production device certificate 282 in the private key certificate storage unit 509 (step S117).

(2) Operations for Content Production and Content Registration

Figure 28:
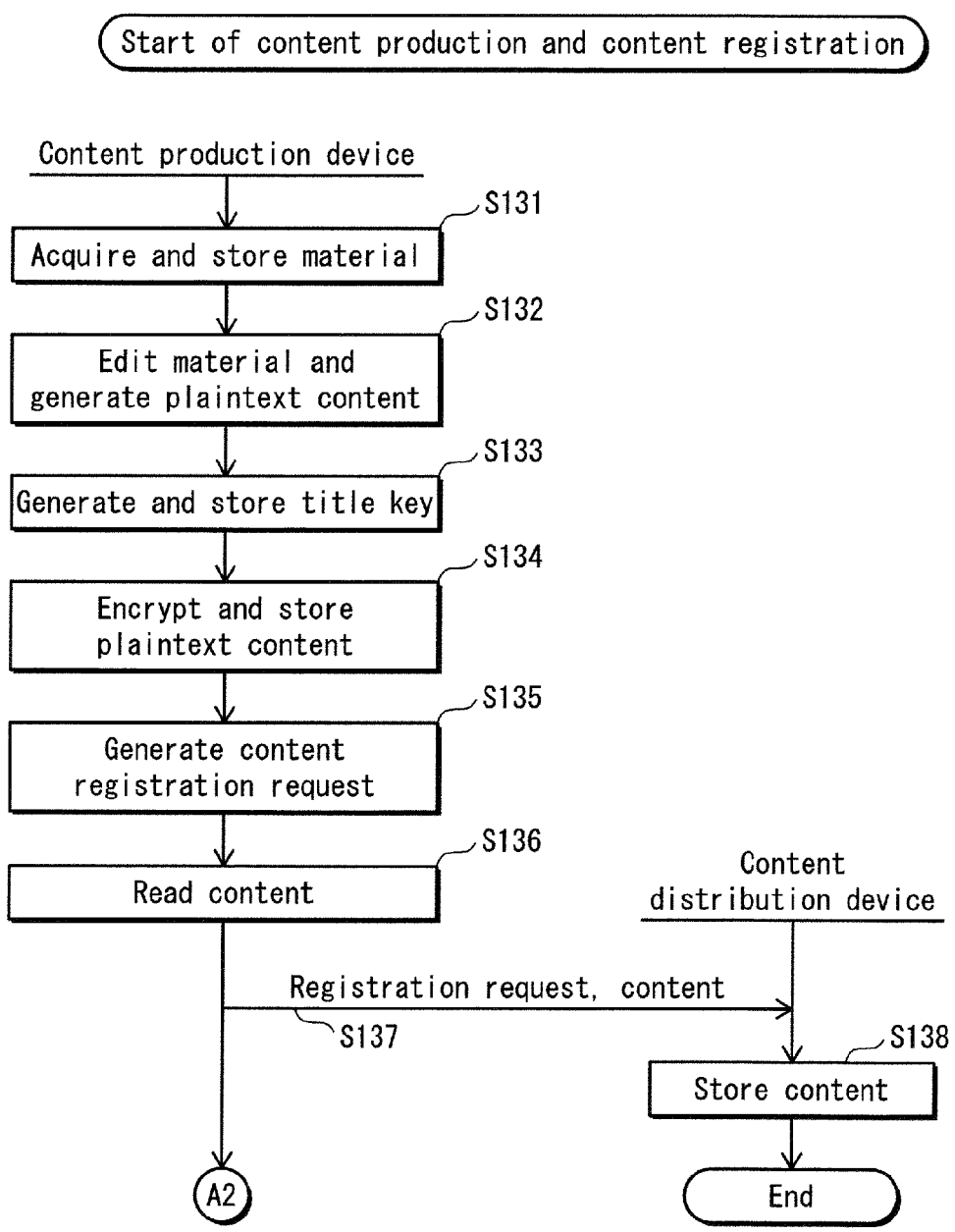
FIG. 28 is a sequence diagram showing the sequence for content production and content registration and is continued in FIG. 29.
Figure 29:
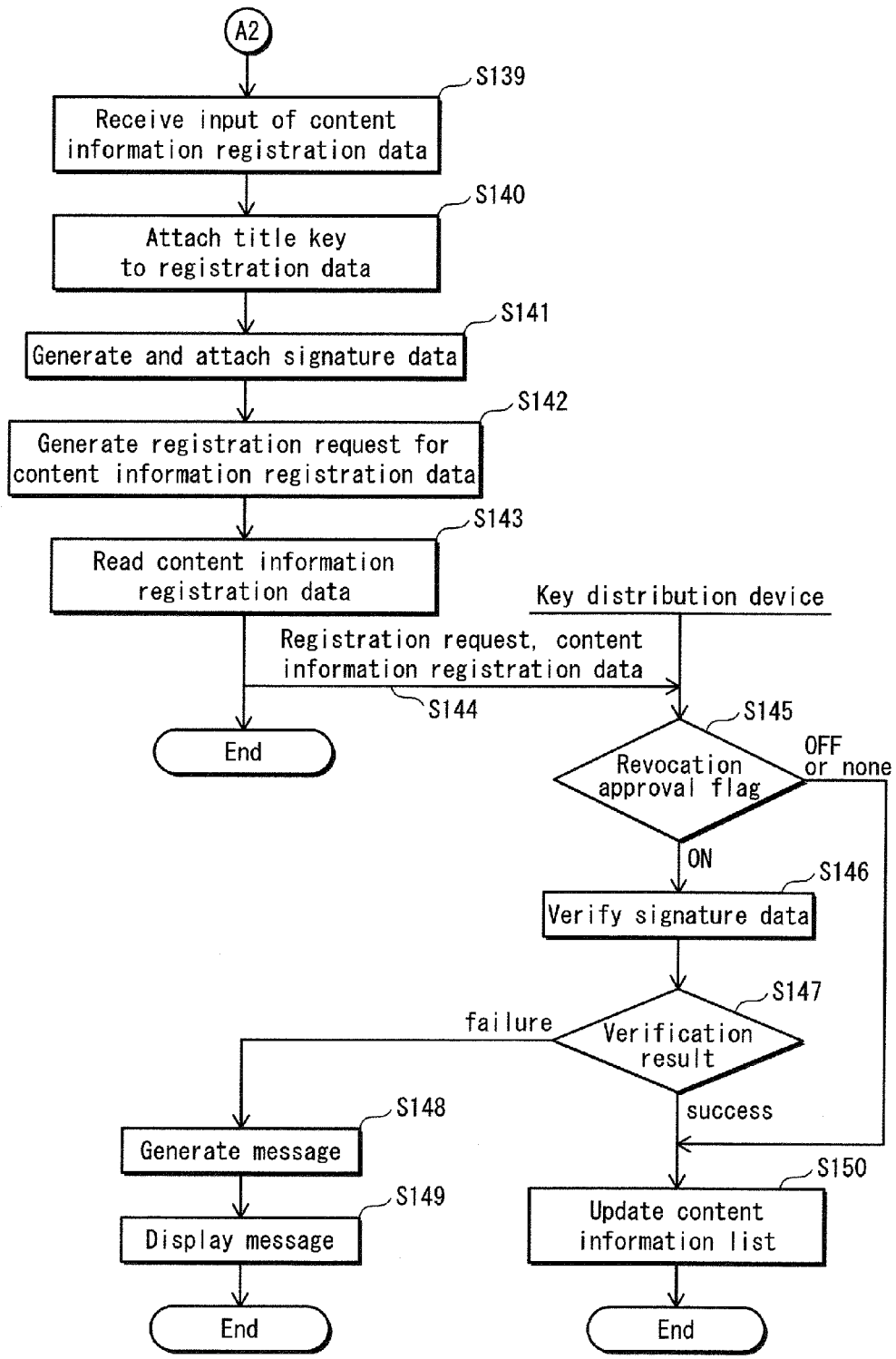
FIG. 29 is a sequence diagram showing the sequence for content production and content registration and is continued from FIG. 28.
Figure 30:
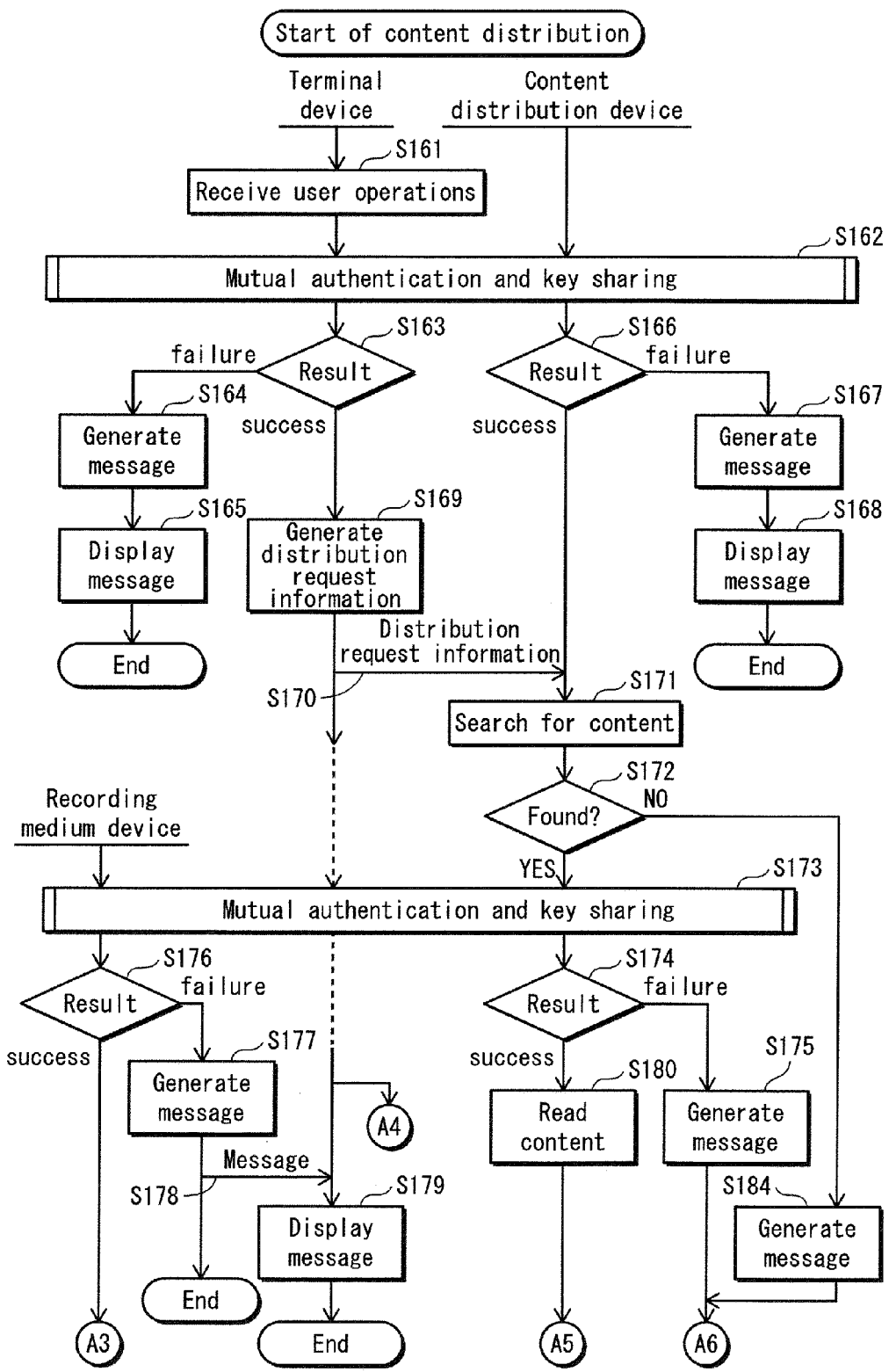
FIG. 30 is a sequence diagram showing the sequence for content distribution and is continued in FIG. 31.
Figure 31:
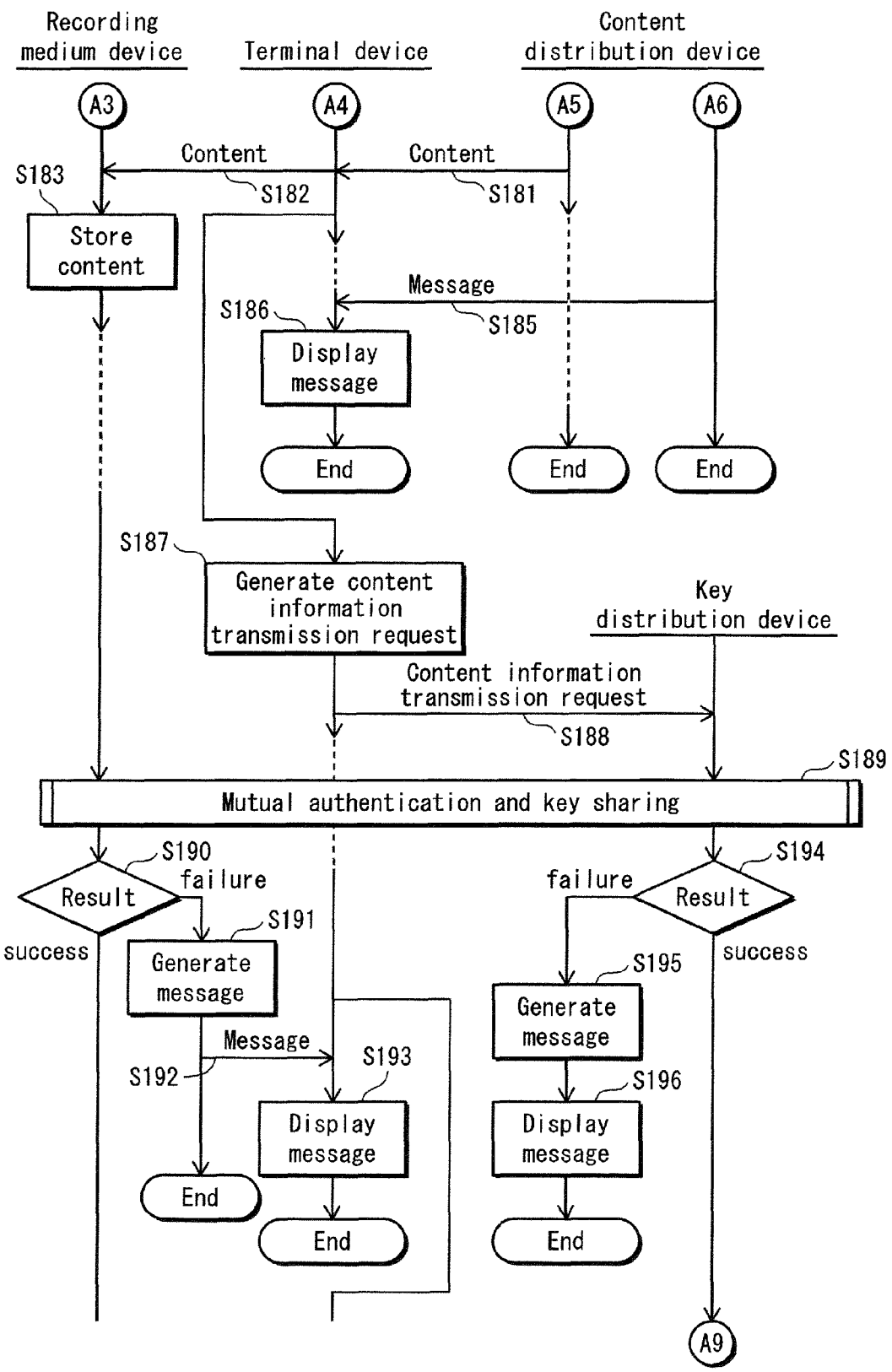
FIG. 31 is a sequence diagram showing the sequence for content distribution and is continued in FIG. 32.
Figure 32:
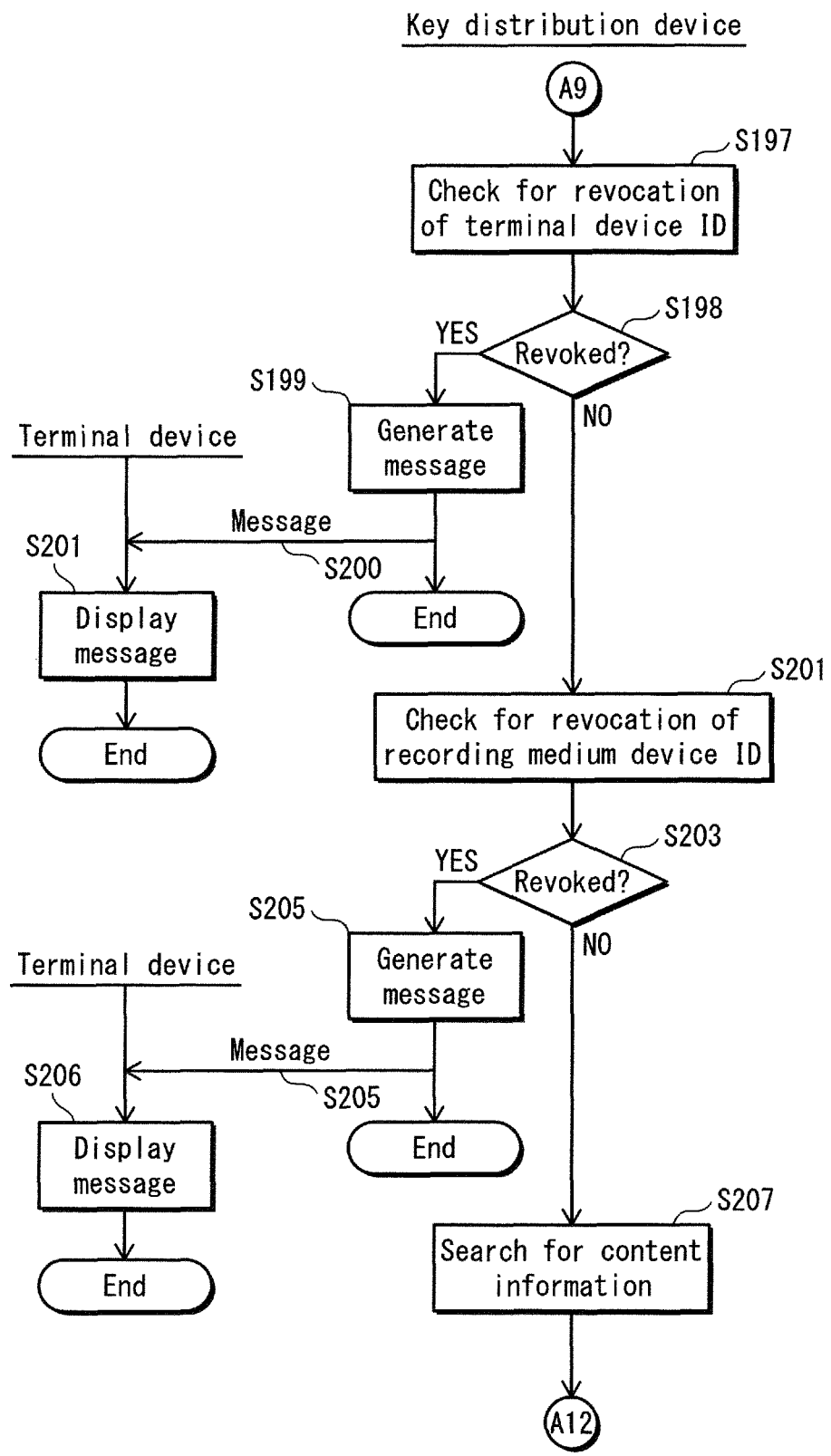
FIG. 32 is a sequence diagram showing the sequence for content distribution and is continued in FIG. 33.
Figure 33:
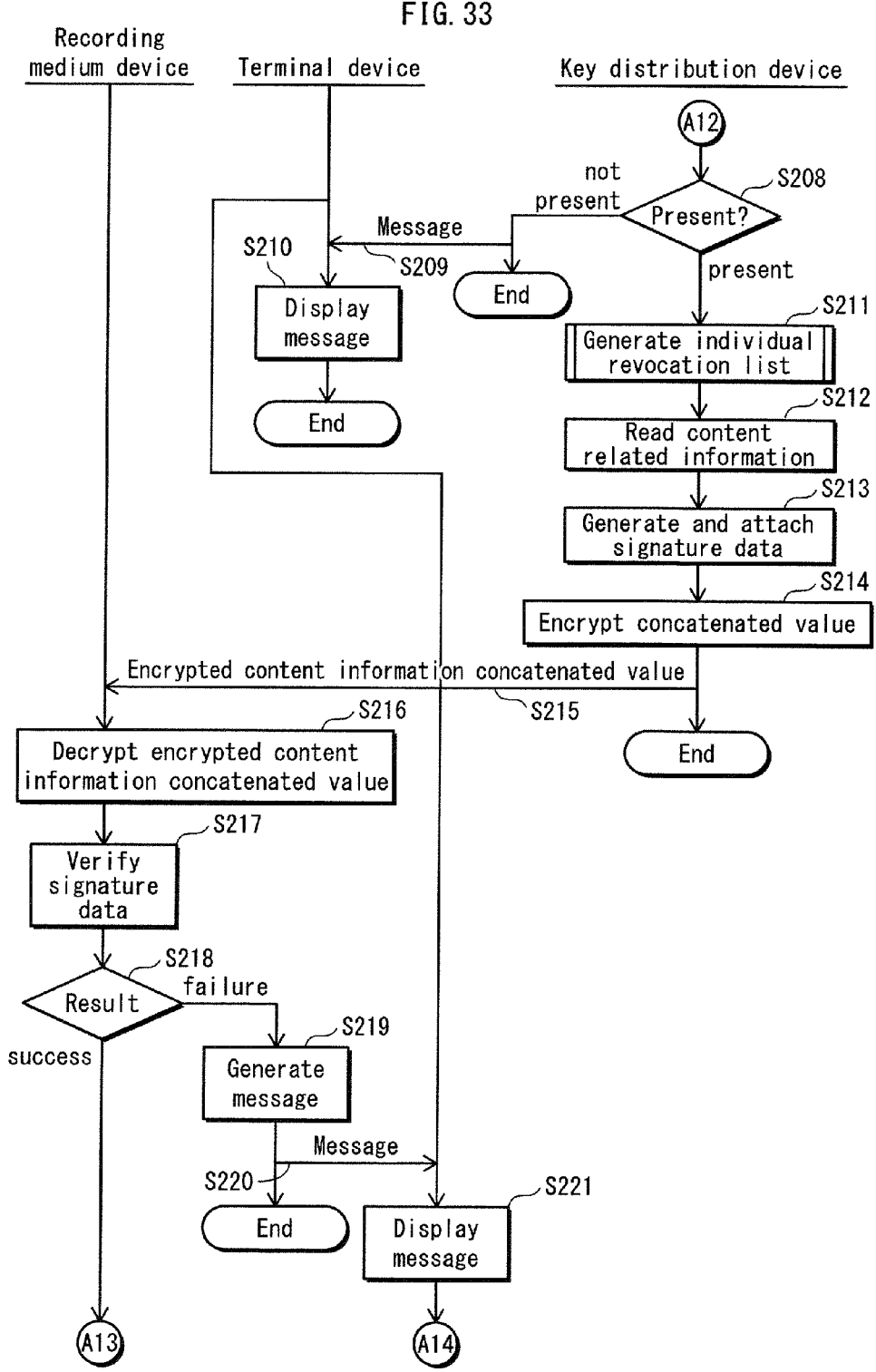
FIG. 33 is a sequence diagram showing the sequence for content distribution and is continued in FIG. 34.
Figure 34:
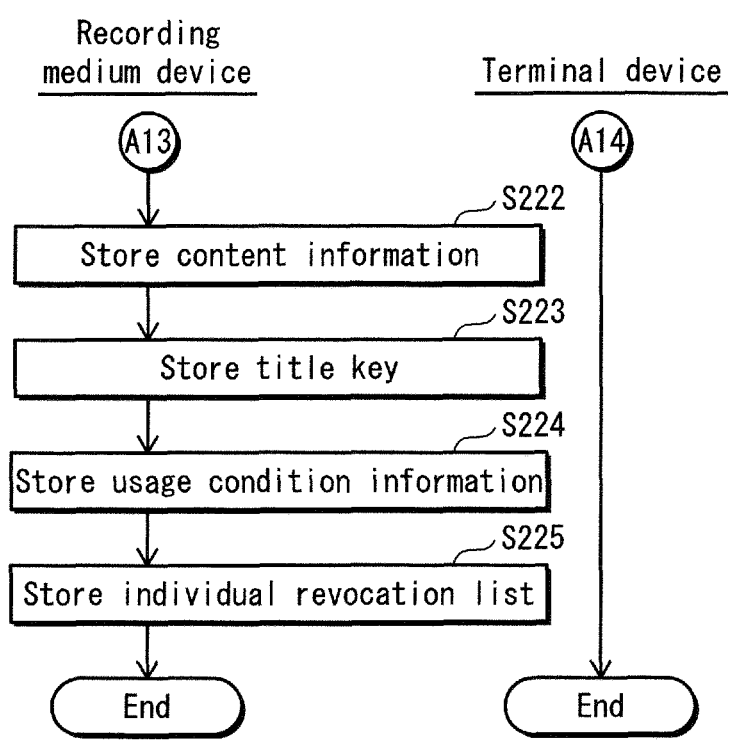
FIG. 34 is a sequence diagram showing the sequence for content distribution and is continued from FIG. 33.

The following describes operations for content production and content registration within the content management system 10a with reference to the sequence diagrams in FIGS. 28 and 29.

The content production device 500 acquires material such as video and audio for a movie or the like and stores the acquired material in the material storage unit 501 (step S131).

By user operation, the editing unit 502 reads the material stored in the material storage unit 501 and edits the read material to generate the plaintext content 531 (step S132).

The title key generation unit 507 generates the title key 533 and writes the generated title key 533 in the title key storage unit 508 (step S133).

The encryption unit 503 encrypts the plaintext content 531 using the title key 533 to generate the content 532 and writes the content 532 in the content storage unit 504 (step S134).

The content registration request unit 505 generates the content registration request (step S135) and then reads the content 532 from the content storage unit 504 (step S136).

The communications unit 515 transmits the content registration request and the content 532 to the content distribution device 400 over the network 20 (step S137).

The communications unit 402 in the content distribution device 400 receives the content registration request and the content 532 from the content production device 500 over the network 20 (step S137). Next, the communications unit 402 writes the received content 532 in the content storage unit 403 (step S138).

Subsequently, the input unit 513 in the content production device 500 receives input of a content provider ID, a content ID, a quality level, genre information, usage condition information, authentication condition information, one or more revoked device IDs, and revocation approval and generates the content information registration data 541 that includes the content provider ID, the content ID, the quality level, the genre information, the usage condition information, the authentication condition information, the one or more revoked device IDs, and a revocation approval flag (step S139).

The content information registration request unit 511 adds the title key 533 to the registration data 541 (step S140).

The signature unit 510 generates signature data by applying a digital signature to the registration data 541 using the production device private key 281. Next, the signature unit 510 adds the generated signature data to the registration data 541 (step S141).

The content information registration request unit 511 generates a registration request to register registration data for the content information (step S142). Next, the content information registration request unit 511 reads the registration data 541 from the registration data storage unit 512 (step S143), and the communications unit 515 transmits the registration request and the registration data 541 to the key distribution device 100 (step S144). Processing then terminates.

When the revocation approval flag is not included in the registration data 541, or the revocation approval flag is "OFF" (step S145), the verification unit 108 in the key distribution device 100 shifts control to step S150.

On the other hand, when the revocation approval flag is "ON" (step S145), the verification unit 108 verifies the signature data in the registration data 541 (step S146). When verification fails ("failure" in step S147), the verification unit 108 generates a message indicating failure of verification (step S148) and displays the generated message (step S149). Processing then terminates.

On the other hand, when verification is successful ("success" in step S147), or when the verification results indicate that verification of the signature data was not performed ("OFF" or "none" in step S145), the update unit 110 updates the content information list 131c stored in the content information list storage unit 111 using the registration data 541 (step S150). Processing then terminates.

(3) Content Distribution Operations

The following describes content distribution operations within the content management system 10a with reference to the sequence diagrams in FIGS. 30 through 34.

The input unit 313 in the terminal device 300 receives a content ID identifying a content and an operation indicating acquisition of a content from the user (step S161).

Next, the mutual authentication unit 304 in the terminal device 300 and the mutual authentication unit 404 in the content distribution device 400 perform mutual authentication and key sharing (step S162). The mutual authentication and key sharing between the terminal device 300 and the content distribution device 400 is the same as the mutual authentication and key sharing between the key distribution device 100 and the recording medium device 600 described below, and thus a description thereof is omitted.

When authentication by the mutual authentication unit 304 fails ("failure" in step S163), the control unit 312 generates a message indicating failure of authentication (step S164), the display unit 314 displays the generated message (step S165), and processing by the terminal device 300 terminates.

When authentication by the mutual authentication unit 404 fails ("failure" in step S166), the control unit 401 generates a message indicating failure of authentication (step S167), the display unit 405 displays the generated message (step S168), and processing by the content distribution device 400 terminates.

When authentication by the mutual authentication unit 304 succeeds ("success" in step S163), the control unit 312 generates distribution request information (step S169). Next, the control unit 312 transmits the distribution request information to the content distribution device 400 over the network 20 via the communications unit 309 (step S170).

When authentication by the mutual authentication unit 404 succeeds ("success" in step S166), the control unit 401 receives the distribution request information over the network 20 via the communications unit 402 (step S170).

The control unit 401 searches in the content storage unit 403 for the content identified by the content ID (step S171). Upon not finding the content (step S172; "NO"), the control unit 401 generates a message indicating that the content was not found (step S184). Next, the control unit 401 transmits the generated message to the terminal device 300 over the network 20 via the communications unit 402 (step S185) and then terminates processing. The display unit 405 in the terminal device 300 displays the message (step S186) and then terminates processing.

When finding the content (step S172: "YES"), the mutual authentication unit 604 in the recording medium device 600 and the mutual authentication unit 404 in the content distribution device 400 perform mutual authentication and key sharing (step S173). The mutual authentication and key sharing between the recording medium device 600 and the content distribution device 400 is the same as the mutual authentication and key sharing between the key distribution device 100 and the recording medium device 600 described below, and thus a description thereof is omitted.

When authentication by the mutual authentication unit 604 fails ("failure" in step S176), the control unit 608 generates a message indicating failure of authentication (step S177). Next, the control unit 608 outputs the message to the terminal device 300 via the I/O unit 603 (step S178) and then terminates processing. The display unit 314 in the terminal device 300 displays the message (step S179) and then terminates processing.

When authentication by the mutual authentication unit 404 fails ("failure" in step S174), the control unit 401 generates a message indicating failure of authentication (step S175). Next, the control unit 401 transmits the generated message to the terminal device 300 over the network 20 via the communications unit 402 (step S185) and then terminates processing. The display unit 314 in the terminal device 300 displays the message (step S186) and then terminates processing.

When authentication by the mutual authentication unit 404 succeeds ("success" in step S174), the control unit 401 reads the content 532 from the content storage unit 403 (step S180). Next, the control unit 401 transmits the read content 532 to the recording medium device 600 over the network 20 via the communications unit 402 and the terminal device 300 (steps S181 and 182).

When authentication by the mutual authentication unit 604 succeeds ("success" in step S176), the I/O unit 603 writes the received content 532 in the content storage unit 615 (step S183).

Next, the control unit 312 in the terminal device 300 generates a content information transmission request (step S187). The control unit 312 then transmits the generated content information transmission request to the key distribution device 100 over the network 20 via the communications unit 309 (step S188).

The mutual authentication unit 604 in the recording medium device 600 and the mutual authentication unit 105 in the key distribution device 100 then perform mutual authentication and key sharing (step S189).

When authentication by the mutual authentication unit 604 fails ("failure" in step S190), the control unit 608 generates a message indicating failure of authentication (step S191). Next, the control unit 608 outputs the message to the terminal device 300 via the I/O unit 603 (step S192) and then terminates processing. The display unit 314 in the terminal device 300 displays the message (step S193) and then terminates processing.

When authentication by the mutual authentication unit 105 fails ("failure" in step S194), the control unit 112 generates a message indicating failure of authentication (step S195), performs control for display of the generated message (step S196), and then terminates processing.

When authentication by the mutual authentication unit 105 succeeds ("success" in step S194), the revocation judgment unit 102 checks whether the terminal device ID has been revoked (step S197). When the terminal device ID exists in the revocation file 242, i.e. when the terminal device ID has been revoked ("YES" in step S198), the control unit 112 generates a message indicating that the terminal device ID has been revoked (step S199). Next, the control unit 112 transmits the generated message to the terminal device 300 over the network 20 via the communications unit 101 (step S200). The control unit 112 then terminates processing. The display unit 314 in the terminal device 300 displays the message (step S201), and the terminal device 300 then terminates processing.

When the terminal device ID is not located in the revocation file 242, i.e. when the terminal device ID has not been revoked ("NO" in step S198), the revocation judgment unit 102 checks whether the recording medium device ID has been revoked (step S201). When the recording medium device ID is located in the revocation file 242, i.e. when the recording medium device ID has been revoked ("YES" in step S203), the control unit 112 generates a message indicating that the recording medium device ID has been revoked (step S205). Next, the control unit 112 transmits the generated message to the terminal device 300 over the network 20 via the communications unit 101 (step S205). The control unit 112 then terminates processing. The display unit 314 in the terminal device 300 displays the message (step S206), and the terminal device 300 then terminates processing.

When the recording medium device ID is not located in the revocation file 242, i.e. when the recording medium device ID has not been revoked ("NO" in step S203), the content information generation unit 109 searches for the requested content related information in the content information list 131c stored in the content information list storage unit 111 (step S207).

When the content related information is not located in the content information list 131c ("not present" in step S208), the content information generation unit 109 transmits a message indicating that the content related information was not found to the terminal device 300 over the network 20 via the communications unit 101 (step S209). Processing then terminates. The display unit 314 in the terminal device 300 displays the message (step S210) and then terminates processing.

When the content related information is located in the content information list 131c ("present" in step S208), the content information generation unit 109 generates the individual revocation list 141 (step S211), reads the content related information (step S212), and generates and attaches signature data (step S213). The encryption/decryption unit 107 encrypts the concatenated value and the signature data (step S214) and transmits the encrypted content information concatenated value to the recording medium device 600 over the network 20 via the communications unit 101 and the terminal device 300 (step S215).

The encryption/decryption unit 606 in the recording medium device 600 decrypts the encrypted content information concatenated value (step S216).

The verification unit 607 verifies the signature data (step S217). When verification fails ("failure" in step S218), the control unit 608 generates a message indicating failure (step S219). Next, the control unit 608 outputs the generated message to the terminal device 300 via the I/O unit 603 (step S220) and then terminates processing. The display unit 314 in the terminal device 300 displays the message (step S221) and then terminates processing.

When verification is successful ("success" in step S218), the verification unit 607 writes the content information in the content information storage unit 612 (step S222). Next, the verification unit 607 writes the title key in the title key storage unit 611 (step S223). The verification unit 607 then writes the usage condition information in the usage condition information storage unit 613 (step S224) and writes the individual revocation list 141 in the revocation file storage unit 614 (step S225). The verification unit 607 then terminates processing.

(4) Mutual Authentication and Key Sharing Operations

Figure 35:
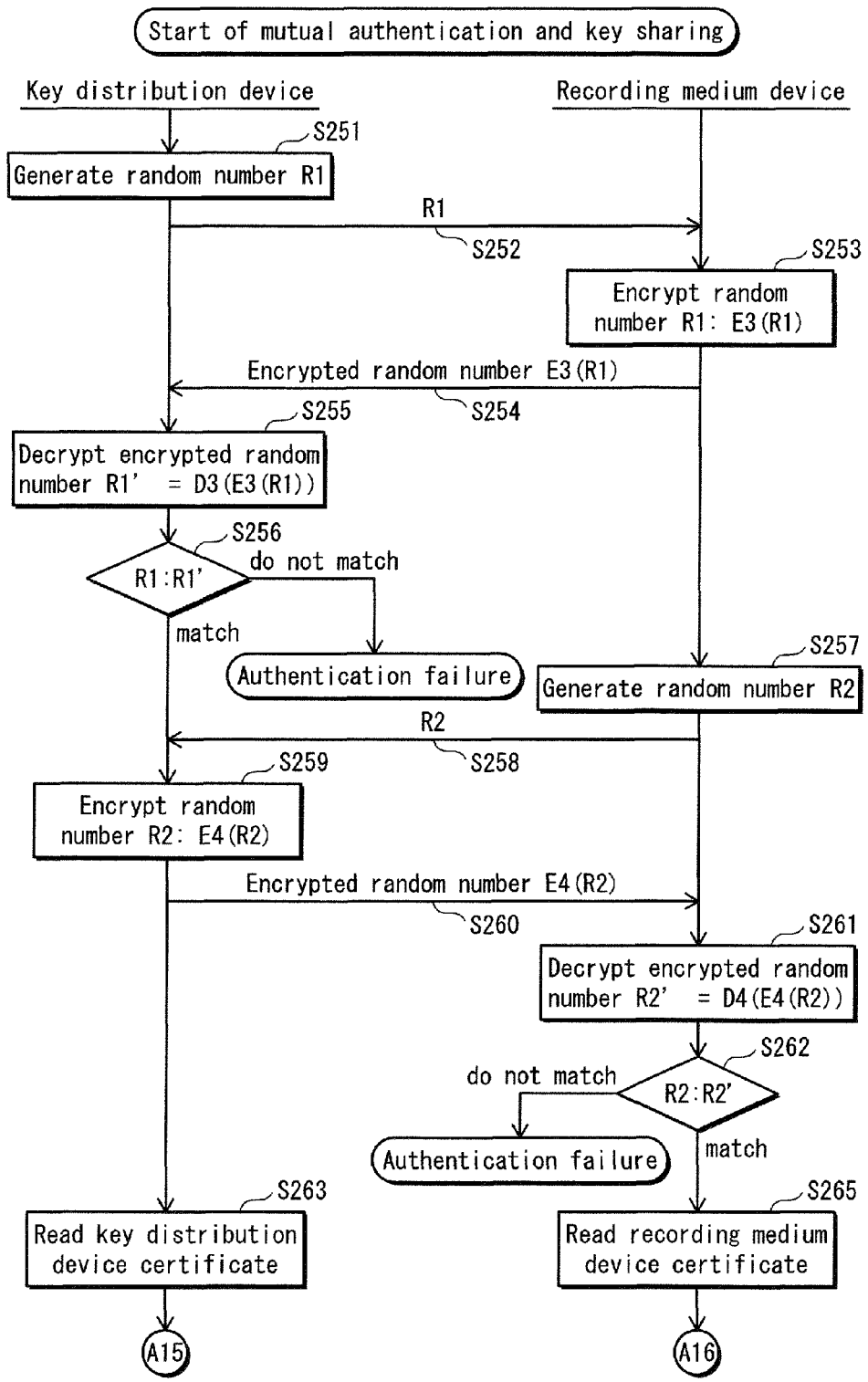
FIG. 35 is a sequence diagram showing the sequence for mutual authentication and key sharing and is continued in FIG. 36.
Figure 36:
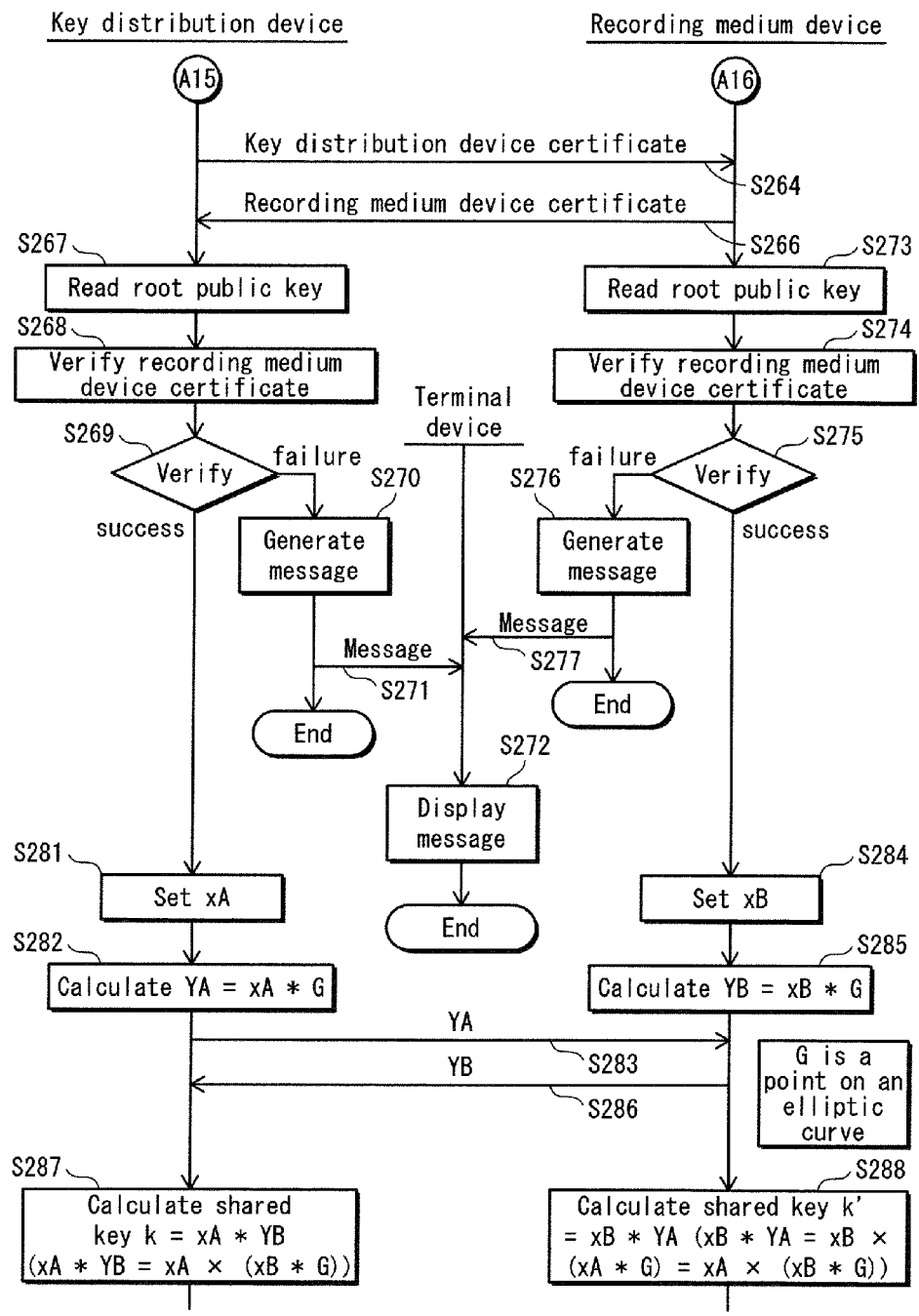
FIG. 36 is a sequence diagram showing the sequence for mutual authentication and key sharing and is continued from FIG. 35.

The following describes mutual authentication and key sharing operations between the key distribution device 100 and the recording medium device 600 within the content management system 10a with reference to the sequence diagrams in FIGS. 35 and 36.

The random number generation unit A10 generates the random number R1 (step S251). The random number generation unit A10 then transmits the generated random number R1 to the recording medium device 600 (step S252).

The encryption unit B11 receives the random number R1 from the key distribution device 100 (step S252). Next, the encryption unit B11 encrypts the random number R1 by applying the encryption algorithm E3 to generate the encrypted random number E3(R1) (step S253) and transmits the generated encrypted random number E3(R1) to the key distribution device 100 (step S254).

The decryption unit A13 receives the encrypted random number E3(R1) from the recording medium device 600 (step S254). Next, the decryption unit A13 decrypts the received encrypted random number E3(R1) by applying a decryption algorithm D3, thereby generating decrypted text R1', which equals D3(E3(R1)) (step S255).

The random number comparison unit A12 compares the random number R1 and the decrypted text R1' (step S256). When the random number R1 and the decrypted text R1' do not match ("do not match" in step S256), the mutual authentication unit 105 determines that the recording medium device 600 is not authentic, outputs the results of authentication, and terminates authentication processing.

The random number generation unit B10 generates the random number R2 (step S257). The random number generation unit B10 then transmits the generated random number R2 to the key distribution device 100 (step S258).

On the other hand, if the random number R1 and the decrypted text R1' match ("match" in step S256), the mutual authentication unit 105 determines that the other device is authentic. The encryption unit A14 receives the random number R2 from the other device (step S258). The encryption unit A14 encrypts the random number R2 by applying the encryption algorithm E4 to generate the encrypted random number E4(R2) (step S259) and transmits the generated encrypted random number E4(R2) to the recording medium device 600 (step S260).

The decryption unit B13 receives the encrypted random number E4(R2) from the key distribution device 100 (step S260). Next, the decryption unit B13 decrypts the received encrypted random number E4(R2) by applying the decryption algorithm D4, thereby generating decrypted text R2', which equals D4(E4(R2)) (step S261).

The random number comparison unit B14 compares the random number R2 and the decrypted text R2' (step S261). If the random number R2 and the decrypted text R2' do not match ("do not match" in step S262), the mutual authentication unit 604 determines that the key distribution device 100 is not authentic and outputs results indicating that authentication failed.

On the other hand, if the random number R2 and the decrypted text R2' match ("match" in step S262), the mutual authentication unit 604 determines that the other device is authentic and outputs results indicating that authentication was successful.

When mutual authentication is successful, the verification unit A15 reads the key distribution device certificate 252 from the private key certificate storage unit 104 (step S263). Next, the verification unit A15 transmits the read key distribution device certificate 252 to the recording medium device 600 (step S264).

When mutual authentication is successful, the verification unit B15 reads the recording medium device certificate 272 from the private key certificate storage unit 609 (step S265). Next, the verification unit B15 transmits the read recording medium device certificate 272 to the key distribution device 100 (step S266).

Next, the verification unit B15 reads the root public key 232 from the root public key storage unit 610 (step S273) and verifies the key distribution device certificate using the read root public key 232 (step S274).

When verification fails ("failure" in step S275), the verification unit B15 generates a message indicating failure (step S276). Next, the verification unit B15 outputs the generated message to the terminal device 300 (step S277) and terminates processing. The display unit 314 in the terminal device 300 displays the message (step S272) and terminates processing.

Next, the verification unit A15 reads the root public key 232 from the root public key storage unit 106 (step S267). The verification unit A15 then verifies the recording medium device certificate using the read root public key 232 (step S268).

When verification fails ("failure" in step S269), the verification unit A15 generates a message indicating failure (step S270). Next, the verification unit A15 transmits the generated message to the terminal device 300 (step S271) and terminates processing. The display unit 314 in the terminal device 300 displays the message (step S272) and terminates processing.

When verification is successful ("success" in step S269), the key sharing unit A16 sets xA (step S281). Next, the key sharing unit A16 calculates YA=xA*G (step S282). Here, G is a point on an elliptic curve. The key sharing unit A16 then transmits YA to the recording medium device 600 (step S283).

When verification is successful ("success" in step S275), the key sharing unit B16 sets xB (step S284). Next, the key sharing unit B16 calculates YB=xB*G (step S285). The key sharing unit B16 then transmits YB to the key distribution device 100 (step S286).

The key sharing unit A16 calculates the shared key k=xA*YB (step S287).

The key sharing unit B16 calculates the shared key k'=xB*YA (step S288).

Here, the shared key $$k = xA * YB$$
$$= xA \times (xB * G)$$
$$= xB \times (xA * G)$$
$$= xB * YA$$
$$= \text{shared key } k'$$

(5) Operations for Generation of Individual Revocation List 141

Figure 37:
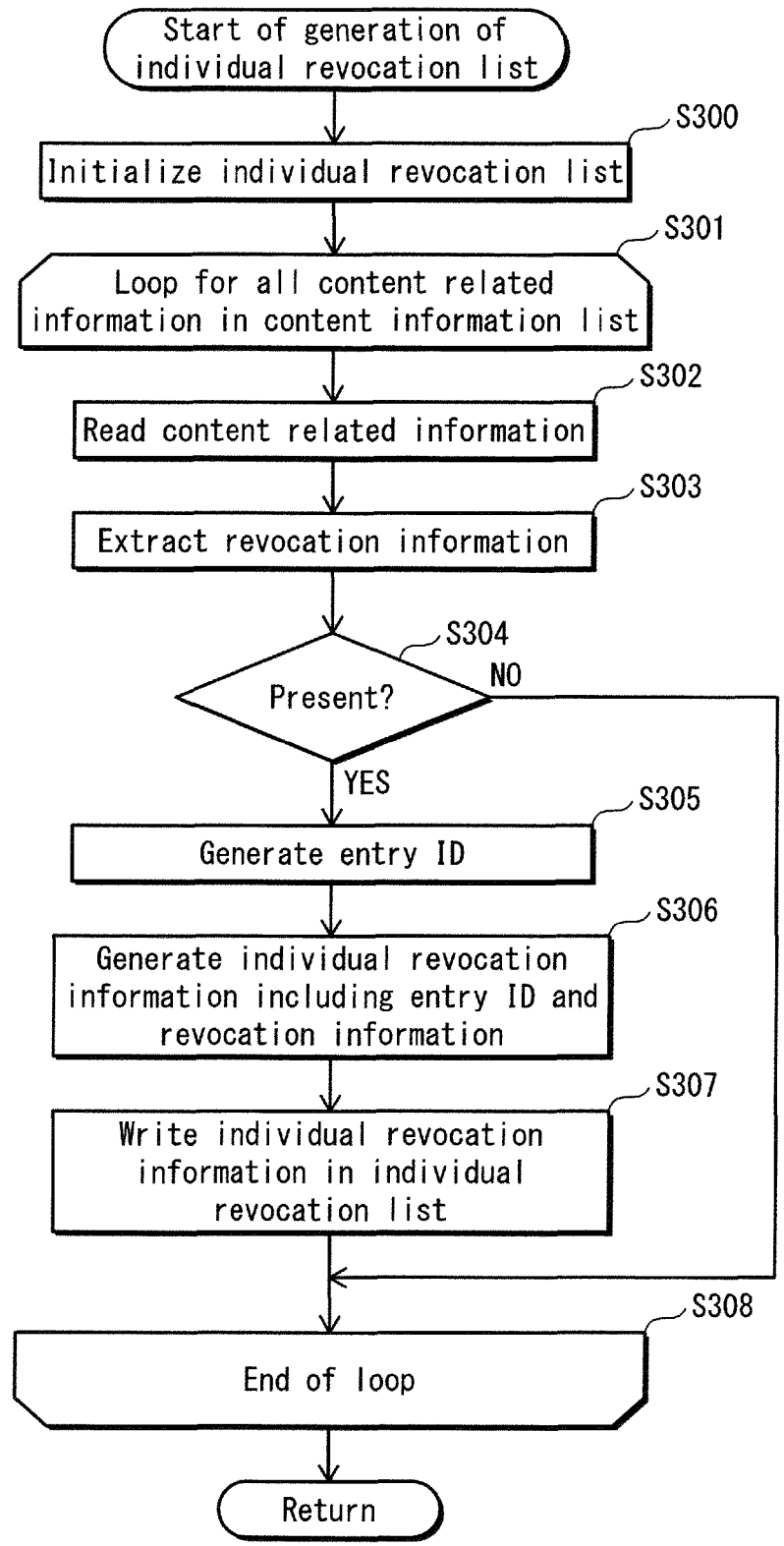
FIG. 37 is a flowchart showing operations for generation of an individual revocation list.

The following describes operations of the key distribution device 100 for generation of the individual revocation list 141 with reference to the flowchart in FIG. 37.

The content information generation unit 109 initializes the individual revocation list 141 (step S300).

Next, the content information generation unit 109 repeats steps S302 through S307 for every piece of content related information in the content information list 131c (steps S301 through S308).

The content information generation unit 109 reads the content related information (step S302). Next, the content information generation unit 109 attempts to extract revocation information from the read content related information (step S303). When revocation information exists (YES in step S304), the content information generation unit 109 generates an entry ID (step S305). Next, the content information generation unit 109 generates individual revocation information including the generated ID and the revocation information (step S306) and adds the generated individual revocation information to the individual revocation list 141 (step S307).

(6) Content Playback Operations

Figure 38:
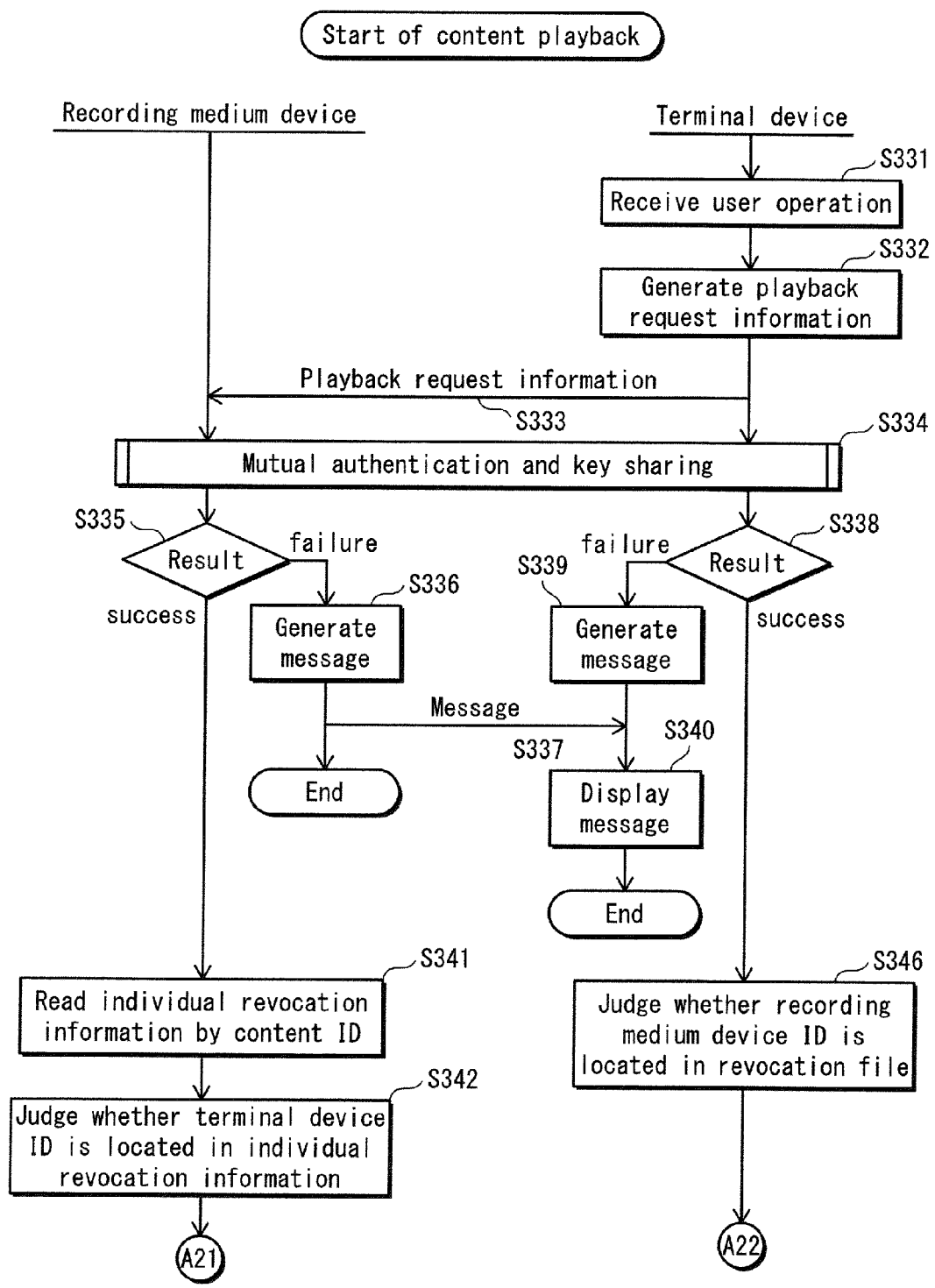
FIG. 38 is a sequence diagram showing the sequence for content playback and is continued in FIG. 39.
Figure 39:
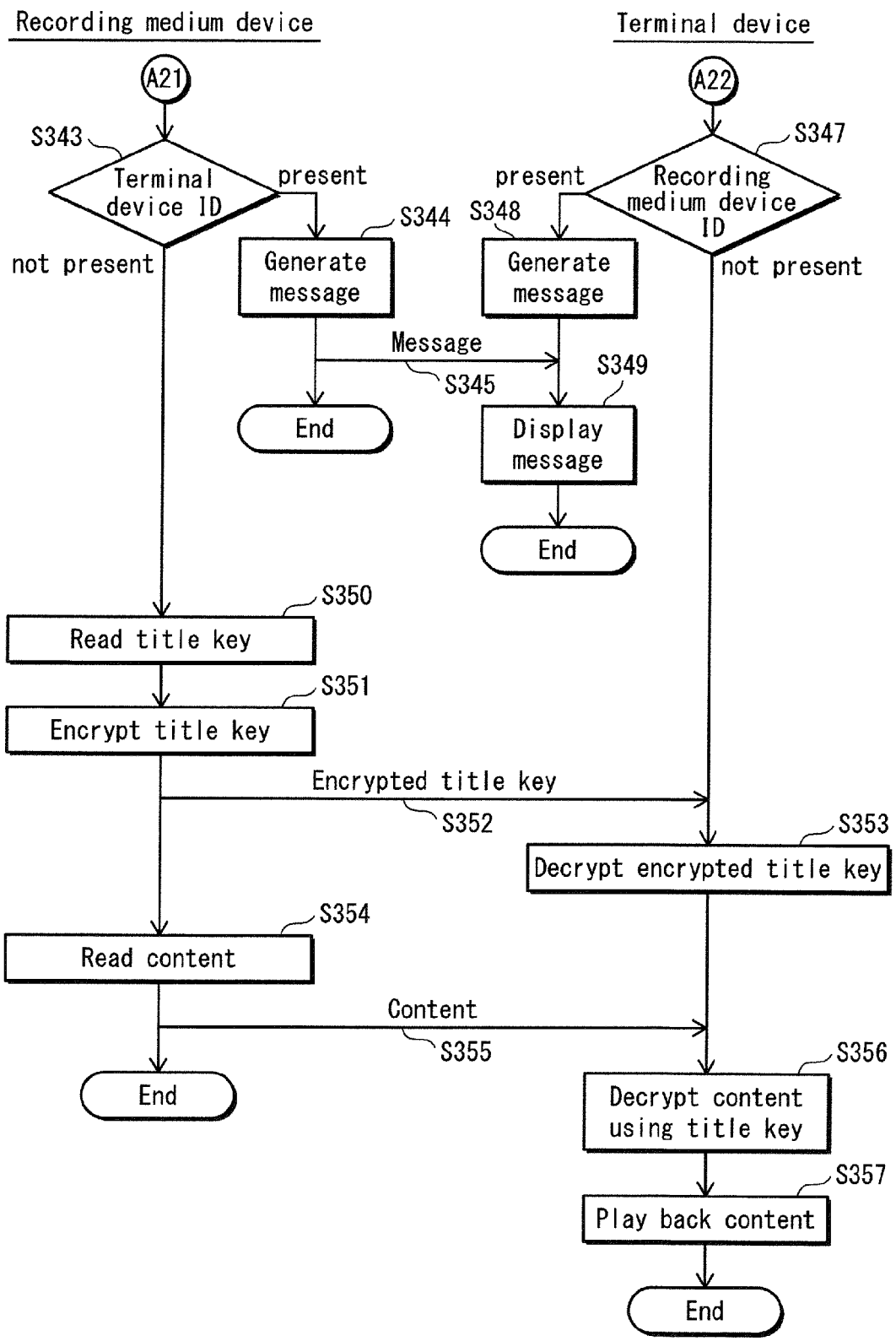
FIG. 39 is a sequence diagram showing the sequence for content playback and is continued from FIG. 38.

The following describes content playback operations within the content management system 10a with reference to the sequence diagrams in FIGS. 38 through 39.

The input unit 313 in the terminal device 300 receives a content ID identifying a content and an operation indicating playback of a content from the user (step S331).

The control unit 312 generates playback request information that indicates a request to play back content and includes the content ID (step S332). Next, the control unit 312 outputs the playback request information to the recording medium device 600 via the I/O unit 305 (step S333).

The mutual authentication unit 604 in the recording medium device 600 and the mutual authentication unit 304 in the terminal device 300 then perform mutual authentication and key sharing (step S334). The mutual authentication and key sharing between the recording medium device 600 and the terminal device 300 is the same as the mutual authentication and key sharing between the key distribution device 100 and the recording medium device 600 described above, and thus a description thereof is omitted.

When authentication by the mutual authentication unit 604 fails ("failure" in step S335), the control unit 608 generates a message indicating failure of authentication (step S336) and outputs the message to the terminal device 300 (step S337), and the recording medium device 600 terminates processing. The display unit 314 in the terminal device 300 displays the message (step S340), and processing in the terminal device 300 terminates.

When authentication by the mutual authentication unit 304 fails ("failure" in step S338), the control unit 312 generates a message indicating failure of authentication (step S339), the display unit 314 displays the generated message (step S340), and processing by the terminal device 300 terminates.

When authentication by the mutual authentication unit 604 is successful ("success" in step S335), the revocation judgment unit 605 reads the individual revocation information corresponding to the content ID (step S341) and judges whether the terminal device ID is located within the read individual revocation information (step S342). When the terminal device ID is located within the read individual revocation information ("present" in step S343), the control unit 608 generates a message indicating the presence of the terminal device ID (step S344) and outputs the message to the terminal device 300 (step S345), and the recording medium device 600 terminates processing. The display unit 314 in the terminal device 300 displays the message (step S349), and processing in the terminal device 300 terminates.

When authentication by the mutual authentication unit 304 succeeds ("success" in step S338), the revocation judgment unit 303 checks whether the recording medium device ID is located within the revocation file 242 (step S346). When the recording medium device ID is located within the revocation file 242 ("present" in step S347), the control unit 312 generates a message indicating the presence of the recording medium device ID (step S348), the display unit 314 displays the generated message (step S349), and processing by the terminal device 300 terminates.

When the terminal device ID is not located in the individual revocation information ("not present" in step S343), the encryption/decryption unit 308 reads the title key (step S350), encrypts the read title key (step S351), and outputs the encrypted title key to the terminal device 300 via the I/O unit 603 (step S352).

When the recording medium device ID is not located in the revocation file 242 ("not present" in step S347), the I/O unit 305 receives the encrypted title key (step S352), and the encryption/decryption unit 308 decrypts the encrypted title key (step S353).

Next, the I/O unit 603 reads the content 532 from the content storage unit 615 (step S354) and outputs the read content 532 to the terminal device 300 (step S355).

The I/O unit 305 receives the content 532 (step S355), the content decryption unit 311 decrypts the content using the title key (step S356), and the content playback unit 310 plays back the decrypted content (step S357). Processing then terminates.

2.9 Modification to Key Issuing Device 200

The key issuing device 200 may also be structured as follows. The following describes a key issuing device 200a as a modification to the key issuing device 200.

Figure 40:
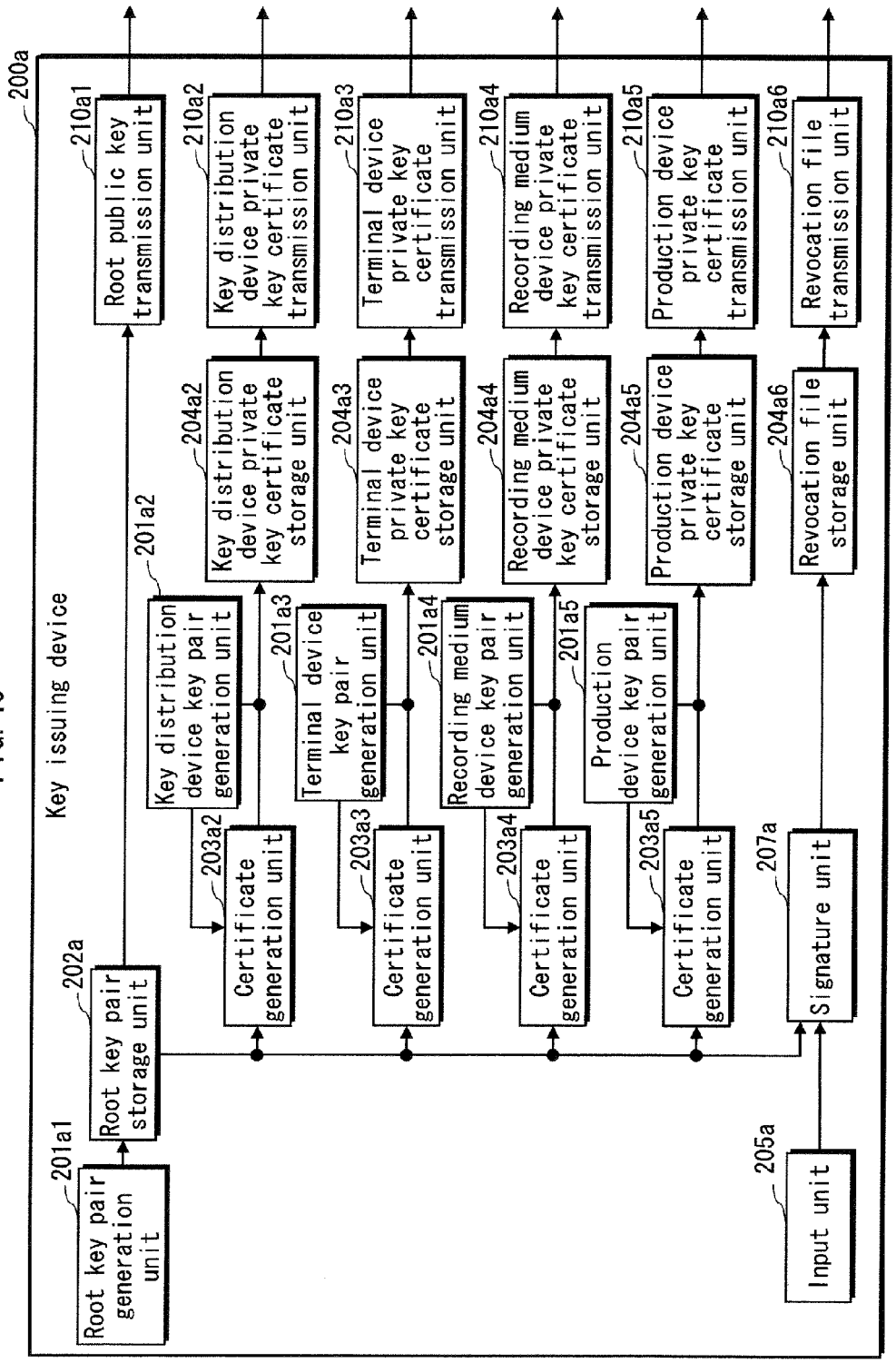
FIG. 40 is a block diagram showing the structure of a key issuing device 200*a* according to a modification.

As shown in FIG. 40, the key issuing device 200a includes a root key pair generation unit 201a1, a root key pair storage unit 202a, a root public key transmission unit 210a1, a key distribution device key pair generation unit 201a2, a certificate generation unit 203a2, a key distribution device private key certificate storage unit 204a2, a key distribution device private key certificate transmission unit 210a2, a terminal device key pair generation unit 201a3, a certificate generation unit 203a3, a terminal device private key certificate storage unit 204a3, a terminal device private key certificate transmission unit 210a3, a recording medium device key pair generation unit 201a4, a certificate generation unit 203a4, a recording medium device private key certificate storage unit 204a4, a recording medium device private key certificate transmission unit 210a4, a production device key pair generation unit 201a5, a certificate generation unit 203a5, a production device private key certificate storage unit 204a5, a production device private key certificate transmission unit 210a5, an input unit 205a, a signature unit 207a, a revocation file storage unit 204a6, and a revocation file transmission unit 210a6.

The root key pair generation unit 201a1 generates a key pair composed of the root private key 231 and the root public key 232 of the key issuing device 200.

The root key pair storage unit 202a stores the key pair composed of the root private key 231 and the root public key 232 generated by the root key pair generation unit 201a1.

The root public key transmission unit 210a1 transmits the root public key 232 stored by the root key pair storage unit 202a to the key distribution device 100, the terminal device 300, and the recording medium device 600.

The key distribution device key pair generation unit 201a2 generates a key distribution device key pair composed of the key distribution device private key 251 and the key distribution device public key 254 allocated to the key distribution device 100.

The certificate generation unit 203a2 generates signature data for the key distribution device public key 254, generated by the key distribution device key pair generation unit 201a2, using the root private key 231 stored in the root key pair storage unit 202a. Next, the certificate generation unit 203a2 generates the key distribution device certificate 252 by attaching the generated signature data.

The key distribution device private key certificate storage unit 204a2 stores the pair of the key distribution device private key 251 generated by the key distribution device key pair generation unit 201a2 and the key distribution device certificate 252 generated by the certificate generation unit 203a2.

The key distribution device private key certificate transmission unit 210a2 transmits the pair of the key distribution device private key 251 and the key distribution device certificate 252 stored in the key distribution device private key certificate storage unit 204a2 to the key distribution device 100.

The terminal device key pair generation unit 201a3 generates a terminal device key pair composed of the terminal device private key 261 and the terminal device public key 264 allocated to the terminal device 300.

The certificate generation unit 203a3 generates signature data for the terminal device public key 264, generated by the terminal device key pair generation unit 201a3, using the root private key 231 stored in the root key pair storage unit 202a. Next, the certificate generation unit 203a3 generates the terminal device certificate 262 by attaching the generated signature data.

The terminal device private key certificate storage unit 204a3 stores the pair of the terminal device private key 261 generated by the terminal device key pair generation unit 201a3 and the terminal device certificate 262 generated by the certificate generation unit 203a3.

The terminal device private key certificate transmission unit 210a3 transmits the pair of the terminal device private key 261 and the terminal device certificate 262 stored in the terminal device private key certificate storage unit 204a3 to the terminal device 300.

The recording medium device key pair generation unit 201a4 generates a recording medium device key pair composed of the recording medium device private key 271 and the recording medium device public key 274 allocated to the recording medium device 600.

The certificate generation unit 203a4 generates signature data for the recording medium device public key 274, generated by the recording medium device key pair generation unit 201a4, using the root private key 231 stored in the root key pair storage unit 202a. Next, the certificate generation unit 203a4 generates the recording medium device certificate 272 by attaching the generated signature data.

The recording medium device private key certificate storage unit 204a4 stores the pair of the recording medium device private key 271 generated by the recording device key pair generation unit 201a4 and the recording medium device certificate 272 generated by the certificate generation unit 203a4.

The recording medium device private key certificate transmission unit 210a4 transmits the pair of the recording medium device private key 271 and the recording medium device certificate 272 stored in the recording medium device private key certificate storage unit 204a4 to the recording medium device 600.

The production device key pair generation unit 201a5 generates a production device key pair composed of the production device private key 281 and the production device public key 284 allocated to the content production device 500.

The certificate generation unit 203a5 generates signature data for the production device public key 284, generated by the production device key pair generation unit 201a5, using the root private key 231 stored in the root key pair storage unit 202a. Next, the certificate generation unit 203a5 generates the production device certificate 282 by attaching the generated signature data.

The production device private key certificate storage unit 204a5 stores the pair of the production device private key 281 generated by the production device key pair generation unit 201a5 and the production device certificate 282 generated by the certificate generation unit 203a5.

The production device private key certificate transmission unit 210a5 transmits the pair of the production device private key 281 and the production device certificate 282 stored in the production device private key certificate storage unit 204a5 to the content production device 500.

The input unit 205a accepts input of revocation data 241 that includes a terminal device ID and a recording medium device ID that are to be revoked.

The signature unit 207a generates signature data for the revocation data 241 which includes the terminal device ID and the recording medium device ID input into the input unit 205a. Next, the signature unit 207a generates the revocation file 242 by attaching the generated signature data.

The revocation file storage unit 204a6 stores the revocation file 242.

The revocation file transmission unit 210a6 transmits the revocation file 242 stored in the revocation file storage unit 204a6 to the key distribution device 100.

3. Other Modifications

While embodiments of the present invention have been described, aspects of the present invention are of course not limited to these embodiments. The present invention also includes cases such as the following:

(1) In Embodiment 2, it is assumed that key information is a key pair formed by the private key and the public key, and authentication is based on the private key and the public key. Authentication is not limited in this way, however, and may instead be based on Media Key Block (MKB) technology. Alternatively, authentication technology based on a different encryption scheme may be used.

(2) In Embodiment 2, the recording medium device is assumed to be a memory card such as an SD card, but aspects of the present invention are not limited in this way. A device that incorporates a control LSI into a storage device, such as an HDD, may be used instead. Furthermore, instead of a removable component such as a memory card, a control LSI may be incorporated into an internal memory device in a cellular phone, eBook, NetBook, or the like.

(3) In the above embodiments and modifications, one device has a plurality of functions (constituent elements). The present invention is not, however, limited to the structure. The same functions and advantageous effects may be achieved by distributing the plurality of functions (constituent elements) among a plurality of devices that operate in coordination.

(4) The following structure may be adopted.

An aspect of the present invention is a distribution apparatus for managing content information, the distribution apparatus holding a content/device correspondence list that can manage, for each content, a list of one or more devices to be revoked, and when being accessed by one of the devices that attempts to access any of the contents, checking whether the device that attempts access is revoked or not by referring to the content/device correspondence list.

Another aspect the present invention is a recording medium for storing content therein, the recording medium holding a content/device correspondence list that can manage, for each content, a list of one or more devices to be revoked, and when being accessed by one of the devices that attempts to access any of the contents, checking whether the device that attempts access is revoked or not by referring to the content/device correspondence list.

The distribution apparatus may further transmit the content/device correspondence list to the recording medium.

Another aspect of the present invention is a distribution system comprising a distribution apparatus, a device, and a recording medium. The distribution system holds a content/device correspondence list that can manage, for each content, a list of one or more devices to be revoked, upon receiving an access request for accessing any of the contents from one of the devices, checks whether the device that has accessed is revoked or not by referring to the content/device correspondence list, and transmits the list to the recording medium. The recording medium stores the content/device correspondence list and, when being accessed by one of the devices that attempts to access any of the contents, checks whether the device that attempts access is revoked or not by referring to the content/device correspondence list.

(5) The following structure may be adopted.

An aspect of the present invention is a revocation list generation device for generating a revocation list, comprising an acquisition circuit configured to acquire, for a content, a revocation identifier identifying a revoked public key certificate allocated to an apparatus related to use of the content; a revocation list generation circuit configured to generate a revocation list including the acquired revocation identifier associated with the content; and an output circuit configured to output the revocation list.

Another aspect of the present invention is an integrated circuit implementing a revocation list generation device for generating a revocation list, comprising an acquisition circuit configured to acquire, for a content, a revocation identifier identifying a revoked public key certificate allocated to an apparatus related to use of the content; a revocation list generation circuit configured to generate a revocation list including the acquired revocation identifier associated with the content; and an output circuit configured to output the revocation list.

Another aspect of the present invention is a revocation list generation device for generating a revocation list, comprising a memory unit storing a computer program composed of a combination of a plurality of computer instructions and a processor configured to fetch the computer instructions one at a time from the computer program stored in the memory unit, decode each computer instruction, and operate in accordance with the result of decoding. The revocation list generation device is a computer, and the computer program causes the computer to perform the steps of acquiring, for a content, a revocation identifier identifying a revoked public key certificate allocated to an apparatus related to use of the content; generating a revocation list including the acquired revocation identifier associated with the content; and outputting the revocation list.

(6) In the above embodiments and modification, a portion or all of the structural elements composing each device may be constituted by an IC card, or an individual module, that is removable from the device. The IC card or the module is a computer system that includes a microprocessor, ROM, RAM, etc. The IC card or the module may include an ultra-multifunctional LSI. The microprocessor operates according to computer programs, and the IC card or the module thereby accomplishes its functions. The IC card or the module may be tamper resistant.

(7) Aspects of the present invention may be control methods for controlling the devices in the above embodiments and modifications thereto. An aspect of the present invention may also be a computer program that achieves the control methods with a computer or may be a digital signal comprising the computer program.

An aspect of the present invention may also be a computer-readable recording medium, such as a flexible disk, hard disk, CD-ROM, MO, DVD, DVD-ROM, DVD-RAM, BD (Blu-ray Disc), or semiconductor memory, on which the above computer program or digital signal is recorded. An aspect of the present invention may also be the digital signal recorded on such a recording medium.

An aspect of the present invention may also be the computer program or digital signal to be transmitted via networks, of which telecommunications networks, wire/wireless communications networks, and the Internet are representative, or via data broadcasting, for example.

An aspect of the present invention may also be a computer system provided with a microprocessor and memory, the memory storing the computer program, and the microprocessor operating in accordance with the computer program.

Also, another independent computer system may execute the computer program or digital signal after the computer program or digital signal is transferred by being recorded on the recording medium or by being transferred over a network or the like.

(8) The above embodiments and modifications may be combined with one another.

INDUSTRIAL APPLICABILITY

The revocation list generation device according to the present invention achieves the advantageous effect of suppressing an increase in the amount of data of the revocation list and is useful as technology for generating a revocation list that can identify revoked public certificates.

REFERENCE SIGNS LIST 10g content management system
300g apparatus
500g revocation list generation device
600g recording medium device
10a content management system
100 key distribution device
200 key issuing device
300 terminal device
400 content distribution device
500 content production device
600 recording medium device

The invention claimed is:

1. A revocation list generation device for generating a revocation list, the revocation list generation device comprising:
a non-transitory memory device that stores a program; and
a processing device that executes the program to cause the revocation list generation device to perform:
receiving, for a content, (i) a content identifier identifying the content, (ii) a revocation identifier identifying a revoked apparatus related to the content, and (iii) usage condition information including first entry information and a usage condition of the content;
generating a revocation list including a plurality of pieces of individual revocation information, each of the pieces of individual revocation information including second entry information and one or more revocation identifiers, the plurality of pieces of individual revocation information including individual revocation information for the content and individual revocation information for another content, and the individual revocation information for the content being separate from the individual revocation information for the other content; and
outputting the revocation list, wherein in the revocation list, the content and the other content are each associated with a revoked apparatus, and
the individual revocation information for the content including second entry information having a same value as the first entry information included in the usage condition information.

2. The revocation list generation device of claim 1, wherein the received revocation identifier received identifies a revoked public key certificate allocated to the revoked apparatus, the revoked apparatus being a playback device playing back the content.

3. The revocation list generation device of claim 1, wherein the revocation list generation device is a content production device for producing the content by editing material, and
the produced content is output along with the revocation list.

4. The revocation list generation device of claim 3,
wherein the executable instructions, when executed, further cause the processor to perform
generating content information including a title key used to encrypt the content, and
the generated content information is output along with the produced content and the revocation list.

5. The revocation list generation device of claim 4,
wherein the executable instructions, when executed, further cause the processor to perform
generating signature data by applying a digital signature to the title key and the revocation list, and
the content information is generated by including the generated signature data.

6. The revocation list generation device of claim 4,
wherein the executable instructions, when executed, further cause the processor to perform
receiving one of (i) genre information indicating a genre into which the content is categorized and (ii) quality information indicating quality of the content, and
the content information is generated by including the content identifier identifying the content and the one of the genre information and the quality information.

7. The revocation list generation device of claim 3, wherein the usage condition information is output along with the content and the revocation list.

8. A content management system comprising a revocation list generation device, a recording medium device, and an apparatus into which the recording medium device is loaded,
wherein the revocation list generation device is configured to:
receive, for a content, (i) a content identifier identifying the content, (ii) a revocation identifier identifying a revoked apparatus related to the content, and (iii) usage condition information including first entry information and a usage condition of the content;
generate a revocation list including a plurality of pieces of individual revocation information, each of the pieces of individual revocation information including second entry information and one or more revocation identifiers, the plurality of pieces of individual revocation information including individual revocation information for the content and individual revocation information for another content, and the individual revocation information for the content being separate from the individual revocation information for the other content; and
output the revocation list,
wherein the recording medium device includes a tamper-resistant controller,
wherein the recording medium device stores a content and a revocation list including a revocation identifier identifying a revoked apparatus related to the content,
wherein the recording medium device includes a controller configured to (i) acquire an acquisition request specifying the content from the apparatus into which the recording medium device is loaded and to acquire an apparatus identifier identifying the apparatus, (ii) judge whether the acquired apparatus identifier matches the revocation identifier of the revoked apparatus related to the content specified by the acquisition request, and (iii) prohibit output of the content to the apparatus when the apparatus identifier and the revocation identifier are judged to match,
wherein in the revocation list, the content and the other content are each associated with a revoked apparatus, and
wherein the individual revocation information for the content including second entry information having a same value as the first entry information included in the usage condition information.

9. A revocation list generation method used in a revocation list generation device for generating a revocation list, the revocation list generation method comprising:
receiving, for a content, (i) content identifier identifying the content, (ii) a revocation identifier identifying a revoked apparatus related to the content, and (iii) usage condition information including first entry information and a usage condition of the content;
generating a revocation list including a plurality of pieces of individual revocation information, each of the pieces of individual revocation information including second entry information and one or more revocation identifiers, the plurality of pieces of individual revocation information including individual revocation information for the content and individual revocation information for another content, and the individual revocation information for the content being separate from the individual revocation information for the other content; and
outputting the revocation list, wherein
in the revocation list, the content and the other content are each associated with a revoked apparatus, and
the individual revocation information for the content including second entry information having a same value as the first entry information included in the usage condition information.

10. A non-transitory computer-readable recording medium having recorded thereon a computer program for revocation list generation used in a revocation list generation device for generating a revocation list, the computer program causing the revocation list generated device to perform a method comprising:
receiving, for a content,(i) content identifier identifying the content, (ii) a revocation identifier identifying a revoked apparatus related to the content, and (iii) usage condition information including first entry information and a usage condition of the content;
generating a revocation list including a plurality of pieces of individual revocation information, each of the pieces of individual revocation information each including second entry information and one or more revocation identifiers, the plurality of pieces of individual revocation information including individual revocation information for the content and individual revocation information for another content, and the individual revocation information for the content being separate from the individual revocation information for the other content; and
outputting the revocation list, wherein
in the revocation list, the content and the other content are each associated with a revoked apparatus, and
the individual revocation information for the content including second entry information having a same value as the first entry information included in the usage condition information.

11. An integrated circuit implementing a revocation list generation device for generating a revocation list, the integrated circuit comprising:
a non-transitory memory device that stores a program; and
a processing device that executes the program to cause the revocation list generation device to perform:
receiving, for a content, (i) content identifier identifying the content, (ii) a revocation identifier identifying a revoked apparatus related to the content, and (iii) usage condition information including first entry information and a usage condition of the content;
generating a revocation list including a plurality of pieces of individual revocation information, each of the pieces of individual revocation information including second entry information and one or more revocation identifiers, the plurality of pieces of individual revocation information including individual revocation information for the content and individual revocation information for another content, and the individual revocation information for the content being separate from the individual revocation information for the other content; and an output unit configured to output outputting the revocation list, wherein in the revocation list, the content and the other content are each associated with a revoked apparatus, and the individual revocation information for the content including second entry information having a same value as the first entry information included in the usage condition information.

* * * * *